United States Patent
Lee et al.

(10) Patent No.: US 12,534,436 B2
(45) Date of Patent: Jan. 27, 2026

(54) DISUBSTITUTED ADAMANTYL DERIVATIVE OR PHARMACEUTICALLY ACCEPTABLE SALT THEREOF, AND PHARMACEUTICAL COMPOSITION FOR SUPPRESSING CANCER GROWTH COMPRISING SAME AS ACTIVE INGREDIENT

(71) Applicant: ONECUREGEN CO., LTD., Daejeon (KR)

(72) Inventors: Kyeong Lee, Ilsan (KR); Mi Sun Won, Daejeon (KR); Hyun-Seung Ban, Daejeon (KR); Min Kyoung Kim, Suwon (KR); Bo-Kyung Kim, Daejeon (KR)

(73) Assignee: ONECUREGEN CO., LTD., Daejeon (KR)

( * ) Notice: Subject to any disclaimer, the term of this patent is extended or adjusted under 35 U.S.C. 154(b) by 764 days.

(21) Appl. No.: 17/794,810

(22) PCT Filed: Nov. 16, 2020

(86) PCT No.: PCT/KR2020/016110
§ 371 (c)(1),
(2) Date: Jul. 22, 2022

(87) PCT Pub. No.: WO2021/149900
PCT Pub. Date: Jul. 29, 2021

(65) Prior Publication Data
US 2023/0219894 A1    Jul. 13, 2023

(30) Foreign Application Priority Data
Jan. 23, 2020  (KR) .................. 10-2020-0009445

(51) Int. Cl.
C07D 217/06    (2006.01)
A61P 35/00     (2006.01)

(52) U.S. Cl.
CPC ............ *C07D 217/06* (2013.01); *A61P 35/00* (2018.01)

(58) Field of Classification Search
CPC .... C07D 217/06; A61P 35/00; C07C 2603/74
See application file for complete search history.

(56) References Cited

U.S. PATENT DOCUMENTS

| | | | |
|---|---|---|---|
| 9,447,063 B2 * | 9/2016 | Won ..................... | C07D 307/42 |
| 2015/0159312 A1 | 6/2015 | Liu et al. | |
| 2015/0259312 A1 | 9/2015 | Won et al. | |

FOREIGN PATENT DOCUMENTS

| | | | | |
|---|---|---|---|---|
| KR | 10-2011-0012127 A | 2/2011 | | |
| KR | 10-2013-0074298 A | 7/2013 | | |
| KR | 10-2014-0072309 A | 6/2014 | | |
| WO | WO-2011014009 A2 * | 2/2011 | ......... | C07C 255/60 |
| WO | 2013/048164 A1 | 4/2013 | | |

OTHER PUBLICATIONS

Gadhe, et al.; Bulletin of the Korean Chemical Society, v32, pp. 1604-1612; 2011 (Year: 2011).*
Min, et al.; Bioorganic & Medicinal Chemistry Letters, v19, pp. 5376-5379; 2009 (Year: 2009).*
Kyung Hoon Min et al., "A novel class of highly potent multidrug resistance reversal agents: Disubstituted adamantyl derivatives", Bioorganic & Medicinal Chemistry Letters 19 (2009) 5376-5379.
Changdev G. Gadhe et al., "Various Partial Charge Schemes on 3D-QSAR Models for P-gp Inhibiting Adamantyl Derivatives", Bull. Korean Chem. Soc. 2011, vol. 32, No. 5.
Naik, R. et al., "Synthesis and Structure-Activity Relationship Study of Chemical Probes as Hypoxia Induced Factor-1α/Malate Dehydrogenase 2 Inhibitors", Journal of Medicinal Chemistry, 2014, pp. 9522-9538, vol. 57, No. 22.
Xia, Yan et al., "Design, synthesis and structure-activity relationship studies of novel 4 (1-adamantyl) phenyl analogues as HIF-1a inhibitors", Medicinal Chemistry, 2016, vol. 12, No. 4, pp. 338-346.
Min, Kyung Hoon et al., "A novel class of highly potent multidrug resistance reversal agents: Disubstituted adamantyl derivatives", Bioorganic & Medicinal Chemistry Letters, 2009, vol. 19, No. 18, 5376-5379.
Ando, Michiyo, "Notice of Reasons for Refusal", Office Action for Japanese Patent Application No. 2022-545033 issued on Aug. 8, 2023.

* cited by examiner

*Primary Examiner* — Jeffrey S Lundgren
*Assistant Examiner* — W. Justin Youngblood
(74) *Attorney, Agent, or Firm* — Bridgeway IP Law Group, PLLC; Sang Ho Lee; Hyun Woo Shin

(57) ABSTRACT

The present invention relates to: a disubstituted adamantyl derivative or a pharmaceutically acceptable salt thereof, and an anticancer pharmaceutical composition and a kit containing same as an active ingredient. The disubstituted adamantyl derivative according to the present invention suppresses the growth of cancer cells by targeting mitochondria ETC complex I and damaging the metabolism of cancer cells, and thus can be useful as an anticancer pharmaceutical composition that is a powerful therapeutic agent for cancer dependent on oxidative phosphorylation for producing ATP.

14 Claims, 17 Drawing Sheets
Specification includes a Sequence Listing.

LW1564

| | Cell Type | Cell line | GI$_{50}$ (µM) |
|---|---|---|---|
| Cancer | Breast | MCF7 | 1.2 ± 0.1 |
| | Cervical | HeLa | 13.8 ± 2.6 |
| | Colorectal | WiDr | 1.1 ± 0.1 |
| | | HCT116 | 7.1 ± 0.1 |
| | | HCT15 | 1.4 ± 0.1 |
| | | LoVo | 2.6 ± 0.1 |
| | | SW480 | 0.3 ± 0.1 |
| | | SW620 | 2.5 ± 0.1 |
| | Fibrosarcoma | HT1080 | 1.0 ± 0.3 |
| | Gastric | NCI-N87 | 2.4 ± 1.1 |
| | | NUGC | 12.3 ± 0.3 |
| | | SNU 484 | 0.9 ± 0.1 |
| | Hepatic | HepG2 | 0.4 ± 0.1 |
| | | HT17 | 1.0 ± 0.2 |
| | | Huh7 | 2.7 ± 0.8 |
| | | SHJ1 | 1.6 ± 0.5 |
| | | SK-Hep-1 | 4.6 ± 0.8 |
| | Lung | A549 | 0.8 ± 0.1 |
| | | H1299 | 1.0 ± 0.3 |
| | Pancreatic | AsPC1 | 2.7 ± 0.1 |
| | | MIA paca2 | 1.3 ± 0.3 |
| Normal | Lung | CCD34lu | >20 |
| | Fibroblast | WI38 | >20 |

SEQUENCE LISTING

<160> NUMBER OF SEQ ID NOS: 8

<210> SEQ ID NO 1
<211> LENGTH: 21
<212> TYPE: DNA
<213> ORGANISM: Artificial Sequence
<220> FEATURE:
<223> OTHER INFORMATION: GLUT1 fwd primer

<400> SEQUENCE: 1
tttggctaca acactggagt c                                          21

<210> SEQ ID NO 2
<211> LENGTH: 21
<212> TYPE: DNA
<213> ORGANISM: Artificial Sequence
<220> FEATURE:
<223> OTHER INFORMATION: GLUT1 rev primer

<400> SEQUENCE: 2
catgccccca acagaaaaga t                                          21

<210> SEQ ID NO 3
<211> LENGTH: 21
<212> TYPE: DNA
<213> ORGANISM: Artificial Sequence
<220> FEATURE:
<223> OTHER INFORMATION: PDK1 fwd primer

<400> SEQUENCE: 3
caggacagcc aatacaagtg g                                          21

<210> SEQ ID NO 4
<211> LENGTH: 21
<212> TYPE: DNA
<213> ORGANISM: Artificial Sequence
<220> FEATURE:
<223> OTHER INFORMATION: PDK1 rev primer

<400> SEQUENCE: 4
cattacccag cgtgacatga a                                          21

<210> SEQ ID NO 5
<211> LENGTH: 20
<212> TYPE: DNA
<213> ORGANISM: Artificial Sequence
<220> FEATURE:
<223> OTHER INFORMATION: VEGFA fwd primer

<400> SEQUENCE: 5
ccttgctgct ctacctccac                                            20

<210> SEQ ID NO 6
<211> LENGTH: 20
<212> TYPE: DNA
<213> ORGANISM: Artificial Sequence
<220> FEATURE:
<223> OTHER INFORMATION: VEGFA rev primer

```
<400> SEQUENCE: 6
atgattctgc cctcctcctt                                          20

<210> SEQ ID NO 7
<211> LENGTH: 20
<212> TYPE: DNA
<213> ORGANISM: Artificial Sequence
<220> FEATURE:
<223> OTHER INFORMATION: RPL13A fwd primer

<400> SEQUENCE: 7
cataggaagc tgggagcaag                                          20

<210> SEQ ID NO 8
<211> LENGTH: 20
<212> TYPE: DNA
<213> ORGANISM: Artificial Sequence
<220> FEATURE:
<223> OTHER INFORMATION: RPL13A rev primer

<400> SEQUENCE: 8
gccctccaat cagtcttctg                                          20
```

DISUBSTITUTED ADAMANTYL DERIVATIVE OR PHARMACEUTICALLY ACCEPTABLE SALT THEREOF, AND PHARMACEUTICAL COMPOSITION FOR SUPPRESSING CANCER GROWTH COMPRISING SAME AS ACTIVE INGREDIENT

TECHNICAL FIELD

The present invention relates to a disubstituted adamantyl derivative or a pharmaceutically acceptable salt thereof, and a pharmaceutical composition for suppressing cancer growth and a kit containing the same as an active ingredient.

This application claims priority based on Korean Patent Application No. 10-2020-0009445 filed on Jan. 23, 2020, and all contents disclosed in the specification and drawings of the application are incorporated herein by reference.

BACKGROUND ART

Cancer cells have increased aerobic glycolysis, glutaminolytic flux, amino acid and lipid metabolism for rapid growth. Cancer cells that compete for limited nutrients with adjacent normal cells consume more glucose. In addition, the hypoxic tumor microenvironment of cancer cells makes cancer cells malignant by inducing the expression of genes involved in metabolism, angiogenesis, metastasis and resistance to apoptosis.

Transcription factor HIF-1 (Hypoxia-inducible factor-1), whose expression is increased under hypoxic conditions, is composed of HIF-1α and HIF-1β, and plays a key role in metabolic reprogramming of cancer cells as a major regulator of tumor hypoxia. Under hypoxic conditions, HIF-1α increases the expression of glucose transporters (GLUT) and glycolic enzymes, such as hexokinases (HK) and phosphoglycerate kinase 1 (PGK1), resulting in glycolysis activation. HIF-1 also increases the expression of pyruvate dehydrogenase kinase isozyme 1 (PDK1), which phosphorylates serine residues and suppresses pyruvate dehydrogenase (PDH) activity. High expression of PDK1 blocks the conversion of pyruvate to acetyl-CoA, thereby suppressing ATP production through tricarboxylic acid (TCA) cycle and oxidative phosphorylation in mitochondria. Indeed, hypoxic cancer cells display these metabolic properties through HIF-1-dependent reprogramming. Accordingly, suppression of HIF-1 expression or function may impair cancer metabolism and cause apoptosis by suppressing the expression of genes involved in metabolic adaptation of cancer cells.

Several studies have attempted to develop HIF-1 inhibitors. For example, BAY 87-2243, a mitochondrial complex I inhibitor, reduced hypoxia-induced HIF-1α accumulation and exhibited a significant antitumor effect in the H460 cancer cell line xenograft model. KCN-1, a benzopyran analogue, suppressed HIF-1 activity by interfering with the interaction between the transcription factor p300 and HIF-1α in glioma cells. The present inventors focused on the development of a small molecule compound targeting the HIF-1α protein in solid tumors, and LW6, an (aryloxy acetyl amino)benzoic acid analog (disclosed in Korean Patent Application Publication No. 10-2012-0041071) suppressed hypoxia-induced HIF-1α protein accumulation, and its direct target was found to be malate dehydrogenase 2 (MDH2). A clinical candidate substance, IDF-11774, was also developed as an HIF-1 inhibitor targeting cancer metabolism. In addition, moracin O (moracin O) and its benzofuran analogues have been reported as powerful inhibitors of HIF-1α protein accumulation. However, to date, no drug has been approved by the FDA as an HIF-1 inhibitor.

Hepatocellular carcinoma (HCC) is a complex heterogeneous tumor type with multiple genetic and epigenetic modifications. Sorafenib has been approved as the first-line treatment for patients with advanced HCC, but the survival rate is very low. Sorafenib is an oral multi-kinase inhibitor that suppresses tumor proliferation by inhibiting angiogenesis and proliferation by targeting vascular endothelial growth factor (VEGF) receptors and platelet-derived growth factor receptors. Recently, regorafenib and nivolumab have been approved as second-line treatments for patients who do not respond to sorafenib, but there is an urgent need for effective liver cancer therapy.

DISCLOSURE

Technical Problem

As mentioned above, targeting cancer metabolism has emerged as an important cancer treatment strategy. Accordingly, an aspect of the present invention is directed to providing the results of synthesis of a disubstituted amandatyl derivative, as a HIF-1α inhibitor, which is a factor capable of inducing hypoxia, and the results of biological evaluation thereof.

More specifically, the present inventors found that a disubstituted amandatyl derivative including LW1564 (Compound 21-3) suppresses mitochondrial respiration by suppressing electron transport chain (ETC) complex I, thereby reducing ATP production and stimulating HIF-la degradation in HCC cells. These results suggest that a disubstituted amandatyl derivative including LW1564 (Compound 21-3) impairs cancer metabolism by inhibiting HIF-1α accumulation and fatty acid synthesis, thereby suppressing the growth of cancer cells in vitro and in vivo. Accordingly, an aspect of the present invention is directed to providing an anticancer pharmaceutical composition containing a disubstituted adamantyl derivative or a pharmaceutical acceptable salt thereof as an active ingredient.

Technical Solution

In order to solve the above problems,
an embodiment of the present invention provides a disubstituted adamantyl derivative represented by Chemical Formula 1 below or a pharmaceutically acceptable salt thereof.

[Chemical Formula 1]

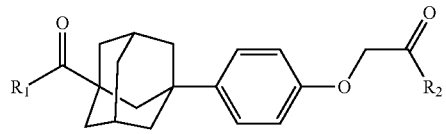

(In Chemical Formula 1, $R^1$ and $R^2$ are the same as defined herein.)

In addition, an embodiment of the present invention provides an anticancer pharmaceutical composition containing a disubstituted adamantyl derivative represented by Chemical Formula 1 above or a pharmaceutical acceptable salt thereof as an active ingredient.

In addition, an embodiment of the present invention provides a cancer treatment method including administering a disubstituted adamantyl derivative represented by Chemical Formula 1 above or a pharmaceutical acceptable salt thereof in a therapeutically effective amount to a patient in need of anticancer treatment.

In addition, there is provided a use of a disubstituted adamantyl derivative represented by Chemical Formula 1 above or a pharmaceutical acceptable salt thereof in the preparation of a cancer treatment preparation.

In addition, an embodiment of the present invention provides a use of a disubstituted adamantyl derivative represented by Chemical Formula 1 above or a pharmaceutically acceptable salt thereof for treating cancer.

In one embodiment of the present invention, the pharmaceutical composition may be an anticancer pharmaceutical composition for solid cancer, but is not limited thereto.

In another embodiment of the present invention, the solid cancer may be selected from the group consisting of breast cancer, cervical cancer, rectal cancer, fibrosarcoma, gastric cancer, liver cancer, lung cancer and pancreatic cancer, but is not limited thereto.

Advantageous Effects

The disubstituted adamantyl derivative including LW1564 (Compound 21-3) according to an embodiment of the present invention significantly suppressed HIF-1α accumulation and suppressed the growth of various cancer cell lines including HepG2 and A549. As a result of measurement of oxygen consumption rate (OCR) and ATP production rate, it was shown that LW1564 (Compound 21-3) stimulated HIF-1α degradation in HepG2 cells by increasing intracellular oxygen concentration by inhibiting mitochondrial respiration. LW1564 (Compound 21-3) also increased phosphorylation of AMP-activated protein kinase (AMPK) by inhibiting rapamycin animal target (mTOR) signaling by increasing mitochondrial electron transport chain (ETC) complex I and AMP/ATP ratio, thereby significantly reducing a total ATP production amount. Consequently, LW1564 (Compound 21-3) suppressed lipid synthesis by promoting phosphorylation of acetyl-CoA carboxylase, and significantly suppressed tumor growth in the HepG2 mouse xenograft model. In summary, the disubstituted adamantyl derivative including LW1564 (Compound 21-3) according to an embodiment of the present invention targets mitochondrial ETC complex I and impairs cancer cell metabolism to suppress HepG2 cell proliferation, and thus can be usefully used as a powerful therapeutic agent for cancer dependent on oxidative phosphorylation for producing ATP in mitochondria.

DESCRIPTION OF DRAWINGS

(FIG. 1A) illustrates the structure of LW1564 (Compound 21-3), (FIG. 1B) illustrates the proliferation inhibitory efficacy of LW1564 (Compound 21-3) in various cancer cell lines, and (FIG. 1C) illustrates the investigation of the antiproliferative efficacy of HepG2 and A549 cells of LW1564 (Compound 21-3) with an IncuCyte ZOOM system for observing live cell imaging.

(FIG. 2A) illustrates the suppression effect of LW1564 (Compound 21-3) on HRE-luciferase activity in HepG2 cells. (FIG. 2B) is a diagram illustrating that LW1564 (Compound 21-3) suppresses the accumulation of HIF-1α through proteasome-dependent degradation. (FIG. 2C) illustrates the mRNA expression level of HIF-1α. (FIG. 2D) illustrates the suppression effect of LW1564 (Compound 21-3) on HIF-1α accumulation in various cancer cell lines under hypoxic conditions. (FIG. 2E) illustrates the mRNA expression levels of HIF-1α target genes, GLUT1, PDK1 and VEGFA by qPCR.

(FIG. 3A) illustrates the effect of LW1564 (Compound 21-3) on the reduction of oxygen consumption rate in HepG2 cells. (FIG. 3B) illustrates a measurement of the rate of ATP production in cancer cells upon treatment with LW1564 (Compound 21-3). (FIG. 3C) illustrates the effect of LW1564 (Compound 21-3) on reducing the total amount of ATP in cells. (FIG. 3D) illustrates changes in intracellular oxygen partial pressure by LW1564 (Compound 21-3) using MAR, a probe that detects hypoxia.

(FIG. 4C) illustrates the effect of LW1564 (compound 21-3) on Complex II/III. After addition of Complex II substrate succinate, LW1564 (compound 21-3) was added to the cells. (FIG. 4D) illustrates the effect of LW1564 (Compound 21-3) on Complex IV. After addition of Complex IV substrate TMPD and ascorbate, LW1564 (compound 21-3) was added to the cells.

(FIG. 5A) is a diagram illustrating the activation of AMPK by LW1564 (Compound 21-3). (FIG. 5B) illustrates the inhibition of fatty acid accumulation in the presence of LW1564 (Compound 21-3). (FIG. 5C) illustrates the effect of LW1564 (Compound 21-3) and glucose concentration on the proliferation of cancer cells. HepG2 cells cultured at different glucose concentrations were treated with LW1564 (Compound 21-3). Graphs represent % cell proliferation. (FIG. 5D) illustrates the combination index (CI) of 2-DG (2-deoxy-D-glucose) and LW1564 (Compound 21-3) in HepG2 cells.

BEST MODE FOR CARRYING OUT INVENTION

Figures 1A, 1B:
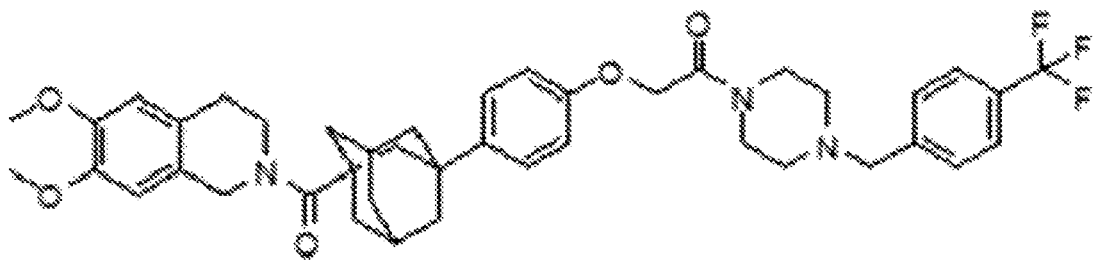
FIGS. 1A to 1C illustrate the effects of LW1564 (Compound 21-3) on the growth of cancer cells.

Hereinafter, the present invention will be described in detail.

An embodiment of the present invention provides a disubstituted adamantyl derivative represented by Chemical Formula 1 below or a pharmaceutically acceptable salt thereof.

[Chemical Formula 1]

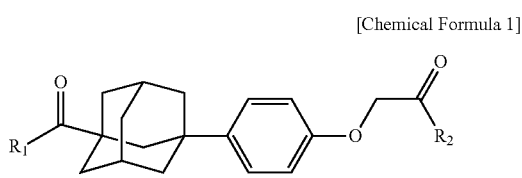

In Chemical Formula 1 above, $R^1$ is —(X)—(CH$_2$)$_n$—R$^3$ or

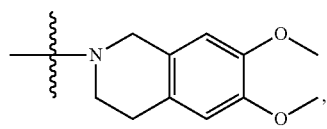 [SMILES: *N1CCc2cc(OC)c(OC)cc2C1]

$R^2$ is —(Y)—(CH$_3$)$_m$ or —(Y)—(CH$_2$)$_m$—R$^4$, in which the X is O, NH, or

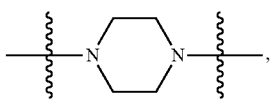 [SMILES: *N1CCN(*)CC1]

the Y is NH,

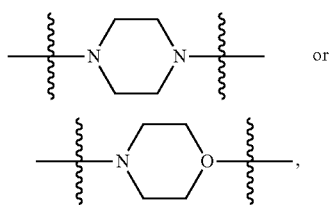

the n is 0, 1 or 2, and the m is 0 or 1, and $R^3$ or $R^4$ is each independently $C_1$ to $C_6$ straight or branched chain alkyl, unsubstituted or substituted $C_5$ to $C_{10}$ aryl, or unsubstituted or substituted $C_5$ to $C_9$ heteroaryl, in which the heteroaryl is 5 or 6-membered heteroaryl including one or more heteroatoms of N or O, and the substituted aryl or substituted heteroaryl may be substituted with one or more halogens, $C_1$ to $C_6$ straight or branched chain alkyl; $C_1$ to $C_6$ straight or branched chain haloalkyl (alkyl halide); hydroxy; or $C_1$ to $C_6$ straight or branched chain alkoxy, in which, in the $R^2$,

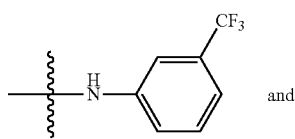

and

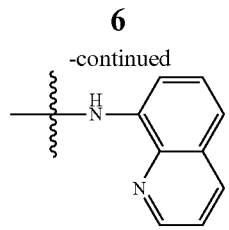

may be excluded.

Preferably, the $R^1$ is —(X)—(CH$_2$)n-R$^3$ or

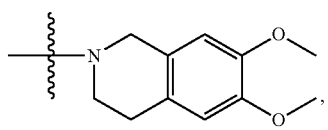 [SMILES: *N1CCc2cc(OC)c(OC)cc2C1]

$R^2$ is —(Y)—(CH$_3$)m or —(Y)—(CH$_2$)m-R$^4$, in which the X is O, NH, or

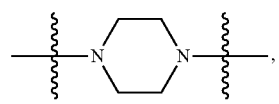 [SMILES: *N1CCN(*)CC1]

the Y is NH,

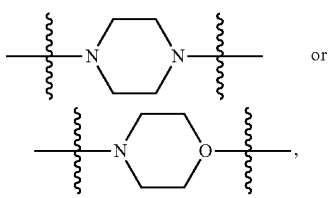

the n is 0, 1 or 2, and the m is 0 or 1, the $R^3$ is methyl, substituted or unsubstituted phenyl, or unsubstituted $C_5$ to $C_9$ heteroaryl, in which the heteroaryl is 5 or 6 membered heteroaryl including heteroatoms of N or O, and the substituted phenyl may be substituted with one or more halogens, $C_1$ to $C_6$ straight or branched chain alkyl; $C_1$ to $C_6$ straight or branched chain haloalkyl; hydroxy; or $C_1$ to $C_6$ straight or branched chain alkoxy, and the $R^4$ is substituted phenyl, or substituted or unsubstituted $C_5$ to $C_9$ heteroaryl, in which the heteroaryl is 5 or 6-membered heteroaryl including heteroatoms of N or O, and the substituted phenyl or heteroaryl may be substituted with $C_1$ to $C_6$ straight or branched chain haloalkyl, in which, in the $R^2$,

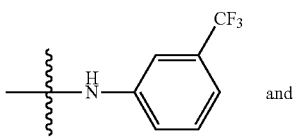

and

-continued

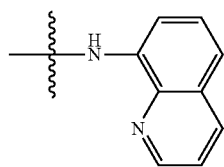

may be excluded.
More preferably,
the $R^1$ is

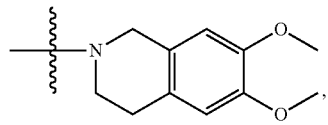

$R^2$ is —(Y)—$(CH_3)$m or —(Y)—$(CH_2)$m-$R^4$,
in which the Y is

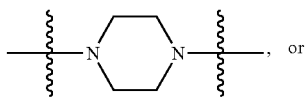, or

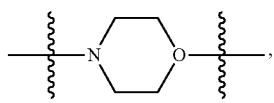, the m is 1, and
the $R^4$ is substituted phenyl, in which the substituted phenyl may be substituted with $C_1$ to $C_6$ straight or branched chain haloalkyl,
in which, in the $R^2$,

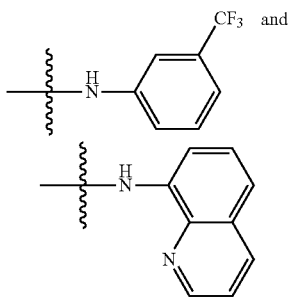

may be excluded.
Preferably,
a disubstituted adamantyl derivative or a pharmaceutically acceptable salt thereof may be a disubstituted adamantyl derivative represented by Chemical Formula 2 below or a pharmaceutically acceptable salt thereof.

[Chemical Formula 2]

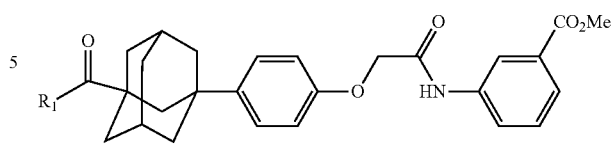

In Chemical Formula 2 above,
$R^1$ is —(X)—$(CH_2)$n-$R^3$ or

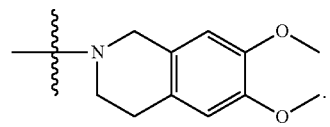

in which the X is O, NH, or

and
the n is 0, 1 or 2, and
$R^3$ is each independently C to $C_6$ straight or branched chain alkyl, unsubstituted or substituted $C_5$ to $C_{10}$ aryl, or unsubstituted or substituted $C_5$ to $C_9$ heteroaryl,
in which the heteroaryl is 5 or 6-membered heteroaryl including one or more heteroatoms of N or O, and
the substituted aryl or substituted heteroaryl may be substituted with one or more halogens, $C_1$ to $C_6$ straight or branched chain alkyl; $C_1$ to $C_6$ straight or branched chain haloalkyl; hydroxy; or $C_1$ to $C_6$ straight or branched chain alkoxy.

More preferably, in Chemical Formula 2 above, the $R^1$ may be a disubstituted adamantyl derivative or a pharmaceutically acceptable salt thereof selected from the group consisting of:

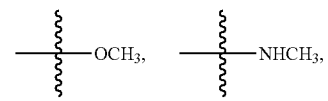

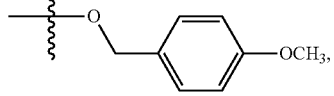

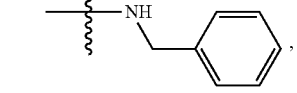

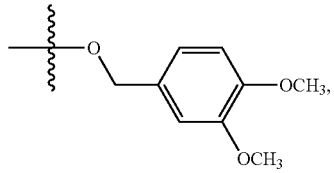

-continued

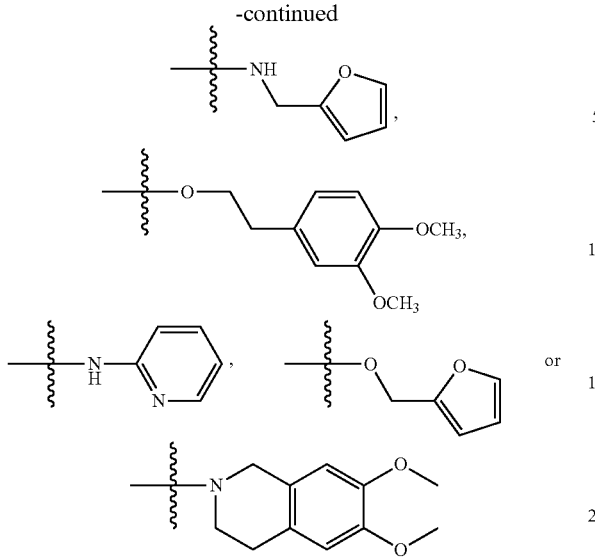

Preferably, a disubstituted adamantyl derivative or a pharmaceutically acceptable salt thereof may be a disubstituted adamantyl derivative represented by Chemical Formula 3 below or a pharmaceutically acceptable salt thereof.

[Chemical Formula 3]

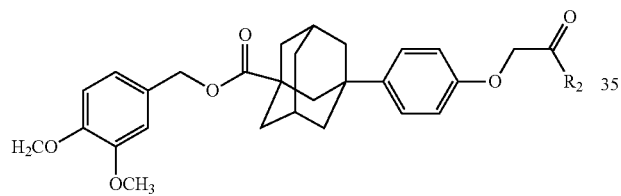

In Chemical Formula 3 above, $R^2$ is —(Y)—(CH$_3$)m or —(Y)—(CH$_2$)m-R$^4$, in which the Y is NH,

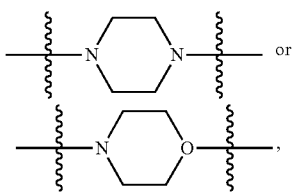

and the m is 0 or 1, and $R^4$ is each independently $C_1$ to $C_6$ straight or branched chain alkyl, unsubstituted or substituted $C_5$ to $C_{10}$ aryl, or unsubstituted or substituted $C_5$ to $C_9$ heteroaryl, in which the heteroaryl is 5 or 6-membered heteroaryl including one or more heteroatoms of N or O, and the substituted aryl or substituted heteroaryl may be substituted with one or more halogens, $C_1$ to $C_6$ straight or branched chain alkyl; $C_1$ to $C_6$ straight or branched chain haloalkyl; hydroxy; or $C_1$ to $C_6$ straight or branched chain alkoxy, in which, in the $R^2$,

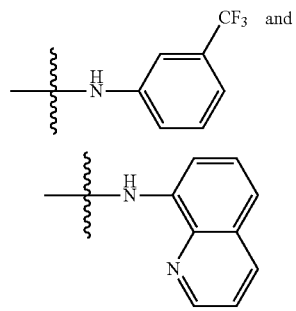

may be excluded.

More preferably, in Chemical Formula 3 above, the $R^2$ may be a disubstituted adamantyl derivative or a pharmaceutically acceptable salt thereof selected from the group consisting of:

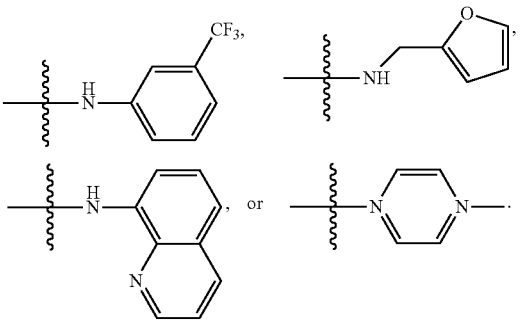

Preferably, a disubstituted adamantyl derivative or a pharmaceutically acceptable salt thereof may be a disubstituted adamantyl derivative represented by Chemical Formula 4 below or a pharmaceutically acceptable salt thereof.

[Chemical Formula 4]

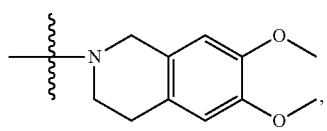 [SMILES: *N1CCc2cc(OC)c(OC)cc2C1]

In Chemical Formula 4 above, $R^1$ is —(X)—(CH$_2$)n-R$^3$ or in which the X is O, NH, or

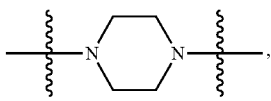

and the n is 0, 1 or 2, and

R³ is each independently C₁ to C₆ straight or branched chain alkyl, unsubstituted or substituted C₅ to C₁₀ aryl, or unsubstituted or substituted C₅ to C₉ heteroaryl, in which the heteroaryl is 5 or 6-membered heteroaryl including one or more heteroatoms of N or O, and the substituted aryl or substituted heteroaryl may be substituted with one or more halogens, C₁ to C₆ straight or branched chain alkyl; C₁ to C₆ straight or branched chain haloalkyl; hydroxy; or C₁ to C₆ straight or branched chain alkoxy.

More preferably, in Chemical Formula 4 above, the R¹ may be a disubstituted adamantyl derivative or a pharmaceutically acceptable salt thereof selected from the group consisting of:

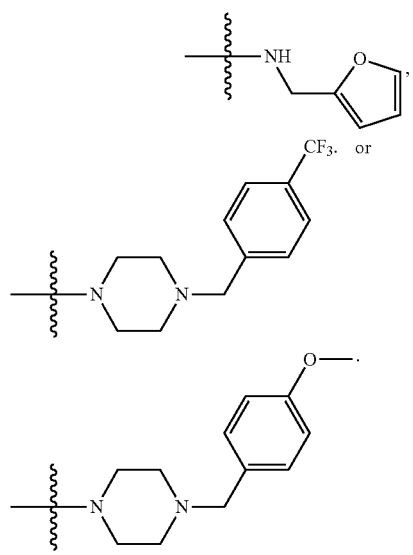

Preferably, a disubstituted adamantyl derivative or a pharmaceutically acceptable salt thereof may be a disubstituted adamantyl derivative represented by Chemical Formula 5 below or a pharmaceutically acceptable salt thereof.

[Chemical Formula 5]

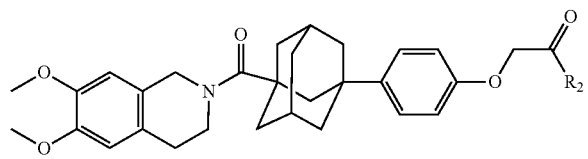

In Chemical Formula 5 above,

R² is —(Y)—(CH₃)m or —(Y)—(CH₂)m-R⁴, in which the Y is NH,

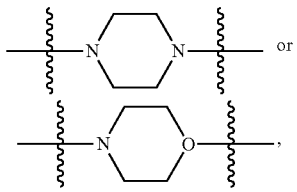

and the m is 0 or 1, and

R⁴ is each independently C₁ to C₆ straight or branched chain alkyl, unsubstituted or substituted C₅ to C₁₀ aryl, or unsubstituted or substituted C₅ to C₉ heteroaryl, in which the heteroaryl is 5 or 6-membered heteroaryl including one or more heteroatoms of N or O, and the substituted aryl or substituted heteroaryl may be substituted with one or more halogens, C₁ to C₆ straight or branched chain alkyl; C₁ to C₆ straight or branched chain haloalkyl; hydroxy; or C₁ to C₆ straight or branched chain alkoxy, in which, in the R²,

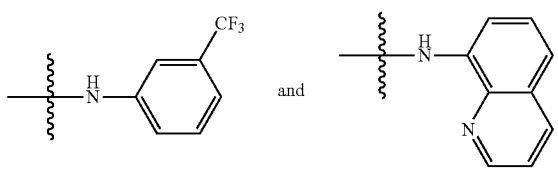 [SMILES: *Nc1cccc(C(F)(F)F)c1 ; *Nc1cccc2cccnc12]

may be excluded.

More preferably, in Chemical Formula 5 above, the R² may be a disubstituted adamantyl derivative or a pharmaceutically acceptable salt thereof selected from the group consisting of:

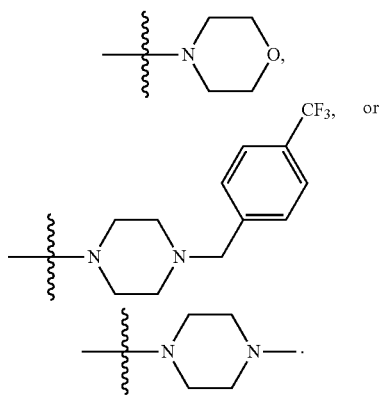

Most preferably, the disubstituted adamantyl derivative according to an embodiment of the present invention may be any one or more of the following:

Methyl-3-(2-(4-(3-((methoxy) carbonyl) adamantane-1-yl) phenoxy)acetamido)benzoate (10a);

Methyl-3-(2-(4-(4-((4-methoxybenzyloxy) carbonyl) adamantane-1-yl)phenoxy)acetamido)benzoate (10b);

Methyl-3-(2-(4-(4-((3,4-dimethoxybenzyloxy)carbonyl) adamantane-1-yl)phenoxy)acetamido)benzoate (10c);

Methyl-3-(2-(4-(2-((3,4-dimethoxyphenethoxy)carbonyl) adamantane-1-yl)phenoxy)acetamido)benzoate (10d);

Methyl-3-(2-(4-(3-((furan-2-ylmethoxy) carbonyl) adamantane-1-yl)phenoxy)acetamido)benzoate (10e);

Methyl-3-(2-(4-(3-methylcarbamoyl-adamantan-1-yl)phenoxy)acetamido)benzoate (10f);

Methyl-3-(2-(4-(3-benzylcarbamoyl-adamantan-1-yl)phenoxy)acetamido)benzoate (10g);

Methyl-3-(2-(4-(3-(furan-2-ylmethylcarbamoyl)-adamantan-1-yl) phenoxy) acetamido)benzoate (10h);

Methyl-3-(2-(4-(3-(pyridin-2-ylcarbamoyl)-adamantan-1-yl)phenoxy)acetamido)benzoate (10i);

Methyl-3-(2-(4-(3-(6,7-dimethoxy-1,2,3,4-tetrahydroisoquinoline-2-carbonyl)-adamantan-1-yl)phenoxy)acetamido)benzoate (10j);

3,4-Dimethoxybenzyl-2-(4-(2-oxo-2-(3-(trifluoromethyl) phenylamino) ethoxy)phenyl) adamantane-1-ylcarboxylae (14a);

3,4-Dimethoxybenzyl-2-(4-(2-oxo-2-(quinolin-8-ylamino) ethoxy)phenyl) adamantane-1-ylcarboxylate (14b);

3,4-Dimethoxybenzyl-2-(4-(2-(furan-2-ylmethylamino)-2-oxoethoxy)phenyl) adamantane-1-ylcarboxylate (14c);

3,4-Dimethoxybenzyl-2-(4-(2-(4-methylpiperazin-1-yl)-2-oxoethoxy)phenyl) adamantane-1-ylcarboxylate (14d);

N-(Furan-2-ylmethyl)-5-(4-(2-(4-methylpiperazin-1-yl)-2-oxoethoxy)phenyl) adamantan-1-yl-carboxamide (17a);

1-(4-Methylpiperazin-1-yl)-2-(4-(5-(4-(4-(trifluoromethyl) benzyl) piperazine-1-carbonyl) adamantan-1-yl-) phenoxy) ethanone (17b);

2-(4-(5-(4-(4-Methoxybenzyl) piperazine-1-carbonyl) adamantan-1-yl) phenoxy)-1-(4-methylpiperazin-1-yl) ethanone (17c);

2-(4-(3-(6,7-Dimethoxy-1,2,3,4-tetrahydroisoquinoline-2-carbonyl) adamantan-1-yl) phenoxy)-1-morpholinoethanone (21a);

2-(4-(3-(6,7-Dimethoxy-1,2,3,4-tetrahydroisoquinoline-2-carbonyl) adamantan-1-yl) phenoxy)-1-(4-methylpiperazin-1-yl) ethanone (21b); and 2-(4-(3-(6,7-Dimethoxy-1,2,3,4-tetrahydroisoquinoline-2-carbonyl) adamantan-1-yl) phenoxy)-1-(4-(4-(trifluoromethyl)benzyl) piperazin-1-yl) ethanone (21c) (LW1564).

The symbol "Ca-b" or "Ca to Cb" attached to a substituent as used herein means that the number of carbon atoms contained in the substituent is a to b.

As used herein, "$C_1$ to $C_6$ straight or branched chain alkyl" means a linear or branched saturated hydrocarbon group having 1 to 6 carbon atoms. Examples include, but are not limited to, methyl, ethyl, propyl, butyl, 1-methylethyl, diethyl or dimethyl and the like.

As used herein, "$C_1$ to $C_6$ straight or branched chain alkoxy" is an OR group in which R is a $C_{1-6}$ alkyl group. Examples include, but are not limited to, methoxy, ethoxy, propoxy, butoxy, 1-methylethoxy, 1,1-dimethylethoxy, and the like.

As used herein, "halogen" is fluorine, bromine, chlorine or iodine.

As used herein, "haloalkyl" means an alkyl substituted with one or more halogen atoms.

The disubstituted adamantyl derivative represented by Chemical Formula 1 of an embodiment of the present invention may be used in the form of a pharmaceutically acceptable salt. As used herein, the term "pharmaceutically acceptable" refers to a compound or composition within a medical criteria that is safe for use in contact with the tissues of a biological subject, such as a human, without toxicity, irritation, and other problems or complications inherent in unreasonable risks. In an embodiment of the present invention, the salt may be preferably an acid addition salt formed by a pharmaceutically acceptable free acid. The acid addition salt is obtained from an inorganic acid such as hydrochloric acid, nitric acid, phosphoric acid, sulfuric acid, hydrobromic acid, hydroiodic acid, nitrous acid or phosphorous acid; a non-toxic organic acid such as aliphatic mono and dicarboxylate, phenyl-substituted alkanoate, hydroxy alkanoate and alkanedioate, an aromatic acid, aliphatic and aromatic sulfonic acid; or an organic acid such as acetic acid, benzoic acid, citric acid, lactic acid, maleic acid, gluconic acid, methanesulfonic acid, 4-toluenesulfonic acid, tartaric acid, and fumaric acid. Such pharmaceutically non-toxic salt includes sulfate, pyrosulfate, bisulfate, sulfite, bisulfite, nitrate, phosphate, monohydrogen phosphate, dihydrogen phosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexane-1,6-dioate, benzoate, chlorobenzoate, methylbenzoate, dinitrobenzoate, hydroxybenzoate, methoxybenzoate, phthalate, terephthalate, benzene sulfonate, toluene sulfonate, chlorobenzene sulfonate, xylene sulfonate, phenylacetate, phenylpropionate, phenylbutyrate, citrate, lactate, βhydroxybutyrate, glycolate, maleate, tartrate, methanesulfonate, propanesulfonate, naphthalene-1-sulfonate, naphthalene-2-sulfonate, or mandelate.

The acid addition salt according an embodiment of the present invention may be prepared by the conventional method, for example, by dissolving a compound in an excessive amount of an aqueous acid solution and then precipitating the resulting salts using water-miscible organic solvent, for example, methanol, ethanol, acetone, or acetonitrile. Further, the acid addition salt may be prepared by heating an equimolar amount of the compound and an acid or alcohol in water and then evaporating the mixture to dryness, or by suction filtration of the precipitated salt.

In addition, the pharmaceutically acceptable metal salt may be prepared using a base. Salts derived from suitable bases may include, but are not limited to, alkali metals such as sodium and potassium, alkaline earth metals such as magnesium, and ammonium. An alkali metal or alkali earth metal salt is obtained by, for example, dissolving a compound in an excessive amount of an alkali metal hydroxide or alkali earth metal hydroxide solution, filtering an undissolved compound salt, and evaporating and drying the filtrate. Here, the metal salt considered suitable for pharmaceutical use is a sodium salt, a potassium salt or a calcium salt. Further, a silver salt corresponding thereto is obtained by reacting a salt of an alkali metal or alkali earth metal with a suitable silver salt (for example, silver nitrate).

Furthermore, the present invention includes not only the disubstituted adamantyl derivative of Chemical Formula 1 above and pharmaceutically acceptable salt thereof, but also all possible solvates, hydrates, isomers, and the like that may be prepared therefrom.

More specifically, the compounds of an embodiment of the present invention contain asymmetric or chiral centers, and therefore exist in different stereoisomeric forms. It is intended that all stereoisomeric forms of the compounds of the invention, including but not limited to, diastereomers, enantiomers and atropisomers, as well as mixtures thereof such as racemic mixtures, form part of the present invention. A stereoisomer is referred to as an enantiomer, and a mixture of such isomers is often called an enantiomeric mixture. A 50:50 mixture of enantiomers is referred to as a racemic-mixture or a racemate.

In an embodiment of the present disclosure, "diastereomer" refers to a stereoisomer with two or more centers of chirality and whose molecules are not mirror images of one another. Diastereomers have different physical properties, such as melting points, boiling points, spectral properties, and reactivity. Mixtures of diastereomers may become separated under high resolution analytical procedures such as electrophoresis and chromatography.

In an embodiment of the present disclosure, "enantiomers" refer to two stereoisomers of a compound which are non-superimposable mirror images of one another.

In addition, an embodiment of the present invention provides a method for preparing a disubstituted adamantyl derivative, characterized in that the compound represented by Chemical Formula 1 is prepared according to the following reaction formula:

[Chemical Formula 1]

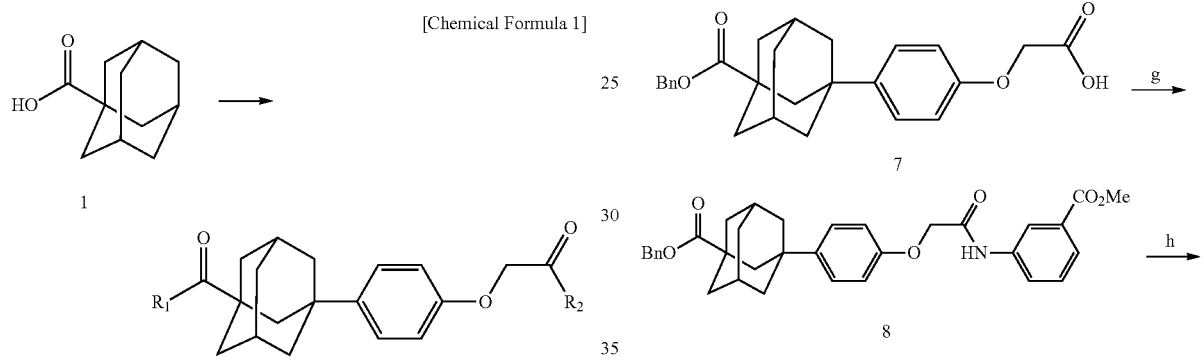

(In the chemical formula, $R^1$ and $R^2$ are the same as defined herein.)

More specifically, there is provided a method for preparing a disubstituted adamantyl derivative, characterized in that the compound represented by Chemical Formula 2 is prepared according to the following reaction formula:

[Chemical Formula 2]

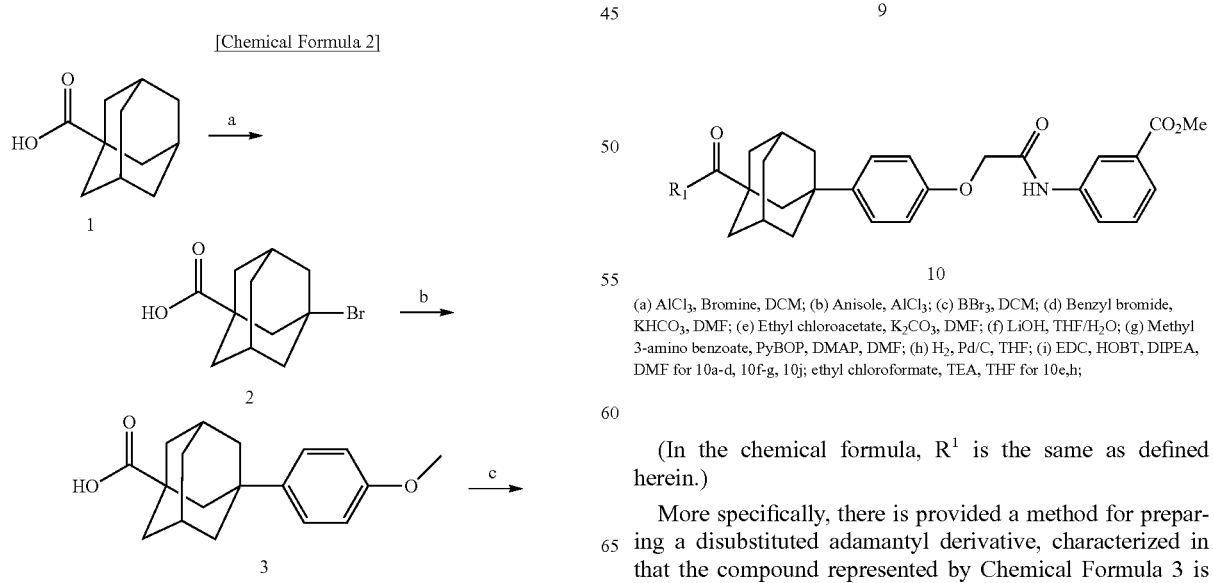

(a) AlCl₃, Bromine, DCM; (b) Anisole, AlCl₃; (c) BBr₃, DCM; (d) Benzyl bromide, KHCO₃, DMF; (e) Ethyl chloroacetate, K₂CO₃, DMF; (f) LiOH, THF/H₂O; (g) Methyl 3-amino benzoate, PyBOP, DMAP, DMF; (h) H₂, Pd/C, THF; (i) EDC, HOBT, DIPEA, DMF for 10a-d, 10f-g, 10j; ethyl chloroformate, TEA, THF for 10e,h;

(In the chemical formula, $R^1$ is the same as defined herein.)

More specifically, there is provided a method for preparing a disubstituted adamantyl derivative, characterized in that the compound represented by Chemical Formula 3 is prepared according to the following reaction formula:

[Chemical Formula 3]

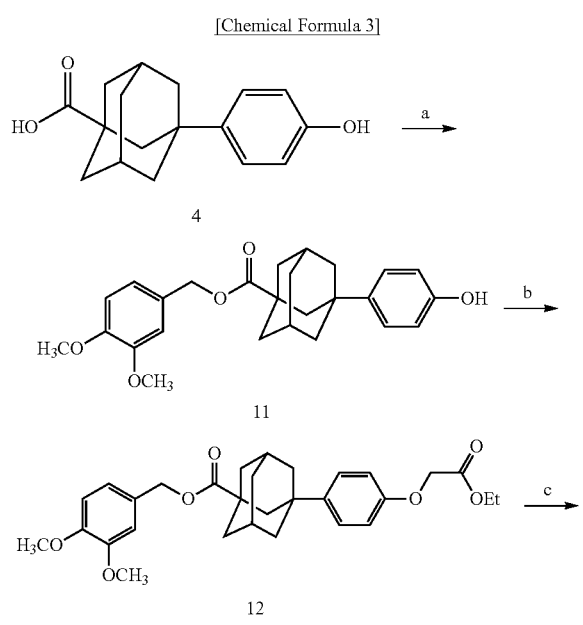

(a) 3,4-Dimethoxybenzyl bromide, K₂CO₃, DMF; (b) ethyl chloroacetate, K₂CO₃, DMF; (c) LiOH, THF/H₂O; (d) corresponding amine, EDC, HOBT, DIPEA, DMF.

(In the chemical formula, $R^2$ is the same as defined herein.)

More specifically, there is provided a method for preparing a disubstituted adamantyl derivative, characterized in that the compound represented by Chemical Formula 4 is prepared according to the following reaction formula:

[Chemical Formula 4]

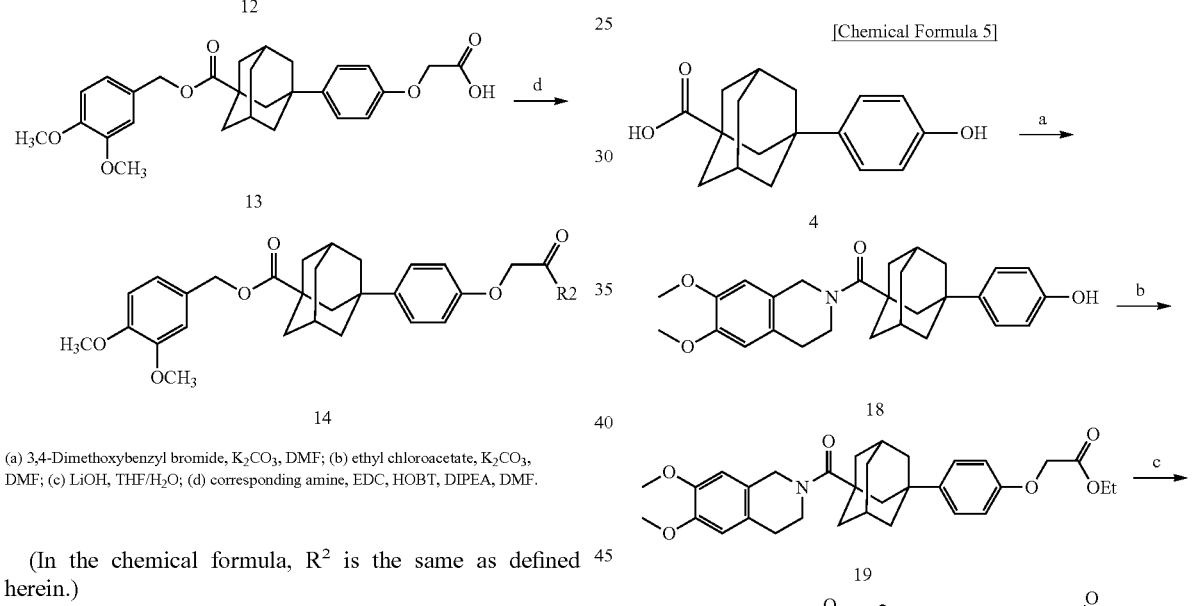

(a) 1-Methyl piperazine, EDC, HOBT, DIPEA, DMF;
(b) Pd/C, methanol;
(c) corresponding amines, EDC, HOBT, DIPEA, DMF.

(In the chemical formula, $R^1$ is the same as defined herein.)

More specifically, there is provided a method for preparing a disubstituted adamantyl derivative, characterized in that the compound represented by Chemical Formula 5 is prepared according to the following reaction formula:

[Chemical Formula 5]

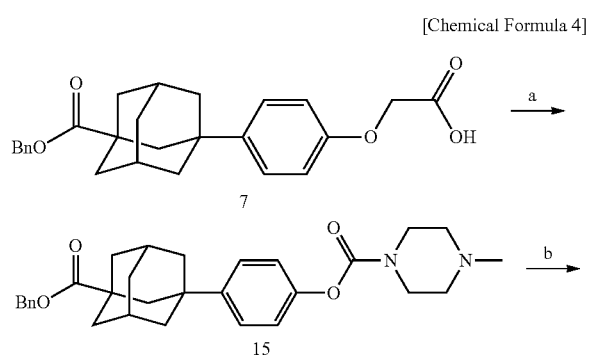

(a) 6,7-dimethoxy-1,2,3,4-tetrahydroisoquinoline, EDC, HOBT, DIPEA, DMF; (b) Ethyl chloroacetate, K₂CO₃, DMF; (c) LiOH, THF/H₂O; (d) corresponding amines, EDC, HOBT, DIPEA, DMF.

(In the chemical formula, $R^2$ is the same as defined herein.)

The method for preparing the disubstituted adamantyl derivative of an embodiment of the present invention is not limited to the above method. In addition, even in the case according to the above reaction formula, the reaction may be performed by selectively changing reagents that do not affect the reaction in addition to the reagents described above.

In addition, an embodiment of the present invention provides an anticancer pharmaceutical composition containing the disubstituted adamantyl derivative or the pharmaceutical acceptable salt thereof as an active ingredient.

In an embodiment of the present invention, the pharmaceutical composition may be an anticancer pharmaceutical composition for solid cancer.

The solid cancer includes, for example, colon cancer, lung cancer, liver cancer, stomach cancer, breast cancer, colorectal cancer, bone cancer, pancreatic cancer, head or neck cancer, uterine cancer, ovarian cancer, rectal cancer, esophageal cancer, small intestine cancer, perianal cancer, colorectal cancer, fallopian tube carcinoma, Endometrial carcinoma, cervical cancer, vaginal carcinoma, vulvar carcinoma, Hodgkin's disease, prostate cancer, fibrosarcoma, bladder cancer, kidney cancer, ureter cancer, renal cell carcinoma, renal pelvic carcinoma, central nervous system tumor, etc., but is not limited thereto.

As used herein, the term "anticancer" covers any prevention or treatment of cancer, and means inhibiting, delaying the incidence of cancer, and further inhibiting or stopping the progression of cancer, slowing the progression rate, mitigating and alleviating symptoms, etc., in a biological subject (for example, a human or an animal).

In addition, an embodiment of the present invention provides a cancer treatment method including administering a disubstituted adamantyl derivative represented by Chemical Formula 1 above or a pharmaceutical acceptable salt thereof in a therapeutically effective amount to a patient in need of anticancer treatment. In addition, there is provided a use of a disubstituted adamantyl derivative represented by Chemical Formula 1 above or a pharmaceutical acceptable salt thereof in the preparation of a cancer treatment preparation. In addition, there is provided a use of a disubstituted adamantyl derivative represented by Chemical Formula 1 above or a pharmaceutically acceptable salt thereof for treating cancer.

As used herein, the term "effective amount" refers to an amount of a compound of an embodiment of the present invention that treats or prevents a particular disease or condition, ameliorates, attenuates or eliminates a particular disease or symptoms of condition, or prevents or delays the onset of one or more symptoms of a particular disease or condition disclosed herein. As used herein, the therapeutically effective amount of the drug may suppress tumor growth; suppress HIF-1 activation and growth of cancer cells; suppress mitochondrial respiration; alleviate or treat the symptoms of complications from cancer; slow and suppress (preferably alleviate) the progression rate of cancer; and prevent cancer exacerbation. The effective amount may be determined depending on the type of patient's illness, severity, drug activity, drug sensitivity, administration time, administration route and excretion rate, duration of treatment, factors including co-administered drugs, and other factors well known in the medical field.

As used herein, the term "patient" is not limited, and is preferably a mammal including a human.

A content of the disubstituted adamantyl derivative of Chemical Formula 1 above or the pharmaceutically acceptable salt thereof in the composition of an embodiment of the present invention may be appropriately adjusted according to a symptom of a disease, the degree of progression of the symptom, and a patient's condition, and for example, the content thereof may be 0.0001 to 99.9 wt %, or 0.001 to 50 wt % based on the total weight of the composition, but is not limited thereto. The content ratio is a value based on the dry amount from which a solvent is removed.

The pharmaceutical composition according to an embodiment of the present invention may further include a suitable carrier, excipient, and diluent which are commonly used in the preparation of pharmaceutical compositions. The excipient may be, for example, one or more selected from the group consisting of a diluent, a binder, a disintegrant, a lubricant, an adsorbent, a humectant, a film-coating material, and a controlled release additive.

The pharmaceutical composition according to an embodiment of the present invention may be used by being formulated, according to commonly used methods, into a form such as powders, granules, sustained-release-type granules, enteric granules, liquids, eye drops, elixirs, emulsions, suspensions, spirits, troches, aromatic water, limonades, tablets, sustained-release-type tablets, enteric tablets, sublingual tablets, hard capsules, soft capsules, sustained-release-type capsules, enteric capsules, pills, tinctures, soft extracts, dry extracts, fluid extracts, injections, capsules, perfusates, or a preparation for external use, such as plasters, lotions, pastes, sprays, inhalants, patches, sterile injectable solutions, or aerosols. The preparation for external use may have a formulation such as creams, gels, patches, sprays, ointments, plasters, lotions, liniments, pastes, or cataplasmas.

As the carrier, the excipient, and the diluent that may be included in the pharmaceutical composition according to an embodiment of the present invention, lactose, dextrose, sucrose, oligosaccharides, sorbitol, mannitol, xylitol, erythritol, maltitol, starch, acacia rubber, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate, and mineral oil may be used.

For formulation, commonly used diluents or excipients such as fillers, thickeners, binders, wetting agents, disintegrants, and surfactants are used.

As additives of tablets, powders, granules, capsules, pills, and troches according to an embodiment of the present invention, excipients such as corn starch, potato starch, wheat starch, lactose, white sugar, glucose, fructose, D-mannitol, precipitated calcium carbonate, synthetic aluminum silicate, calcium monohydrogen phosphate, calcium sulfate, sodium chloride, sodium hydrogen carbonate, purified lanolin, microcrystalline cellulose, dextrin, sodium alginate, methyl cellulose, sodium carboxymethylcellulose, kaolin, urea, colloidal silica gel, hydroxypropyl starch, hydroxypropyl methylcellulose 1928, 2208, 2906, 2910, propylene glycol, casein, calcium lactate, and Primojel®; and binders such as gelatin, Arabic gum, ethanol, agar powder, cellulose acetate phthalate, carboxymethylcellulose, calcium carboxymethylcellulose, glucose, purified water, sodium caseinate, glycerin, stearic acid, sodium carboxymethylcellulose, sodium methylcellulose, methylcellulose, microcrystalline cellulose, dextrin, hydroxycellulose, hydroxypropyl starch, hydroxymethylcellulose, purified shellac, starch, hydroxypropyl cellulose, hydroxypropyl methylcellulose, polyvinyl alcohol, and polyvinylpyrrolidone may be used, and disintegrants such as hydroxypropyl methylcellulose, corn starch, agar powder, methylcellulose, bentonite, hydroxypropyl starch, sodium carboxymethylcellulose, sodium alginate, calcium carboxymethylcellulose, calcium citrate, sodium lauryl sulfate, silicic anhydride, 1-hydroxypropylcellulose, dextran, ion-exchange resin, polyvinyl acetate, formaldehyde-treated casein and gelatin, alginic acid, amylose, guar gum, sodium bicarbonate, polyvinylpyrrolidone, calcium phosphate, gelled starch, Arabic gum, amylopectin, pectin, sodium polyphosphate, ethyl cellulose, white sugar, magnesium aluminum silicate, a di-sorbitol solution, and light anhydrous silicic acid; and lubricants such as calcium stearate, magnesium stearate, stearic acid, hydrogenated vegetable oil, talc, lycopodium powder, kaolin, Vaseline, sodium stearate, cacao butter, sodium salicylate, magnesium salicylate, polyethylene glycol 4000, 6000, liquid paraffin, hydrogenated soybean oil (Lubri wax), aluminum stearate, zinc stearate, sodium lauryl sulfate, magnesium oxide, Macrogol, synthetic aluminum silicate, silicic anhydride, higher fatty acids, higher alcohols, silicone oil, paraffin oil, polyethylene glycol fatty acid ether, starch, sodium chloride, sodium acetate, sodium oleate, dl-leucine, and light anhydrous silicic acid may be used.

As additives of liquids according to an embodiment of the present invention, water, dilute hydrochloric acid, dilute sulfuric acid, sodium citrate, monostearic acid sucrose, polyoxyethylene sorbitol fatty acid esters (twin esters), polyoxyethylene monoalkyl ethers, lanolin ethers, lanolin esters, acetic acid, hydrochloric acid, ammonia water, ammonium carbonate, potassium hydroxide, sodium hydroxide, prolamine, polyvinylpyrrolidone, ethylcellulose, and sodium carboxymethylcellulose may be used.

In syrups according to an embodiment of the present invention, a white sugar solution, other sugars or sweeteners, and the like may be used, and as necessary, a fragrance, a colorant, a preservative, a stabilizer, a suspending agent, an emulsifier, a viscous agent, or the like may be used.

In emulsions according to the present invention, purified water may be used, and as necessary, an emulsifier, a preservative, a stabilizer, a fragrance, or the like may be used.

In suspensions according to the present invention, suspending agents such as acacia, tragacanth, methylcellulose, carboxymethylcellulose, sodium carboxymethylcellulose, microcrystalline cellulose, sodium alginate, hydroxypropyl methylcellulose 1828, 2906, 2910, and the like may be used, and as necessary, a surfactant, a preservative, a stabilizer, a colorant, and a fragrance may be used.

Injections according to the present invention may include: solvents such as distilled water for injection, a 0.9% sodium chloride solution, Ringer's solution, a dextrose solution, a dextrose+sodium chloride solution, PEG, lactated Ringer's solution, ethanol, propylene glycol, non-volatile oil-sesame oil, cottonseed oil, peanut oil, soybean oil, corn oil, ethyl oleate, isopropyl myristate, and benzene benzoate; cosolvents such as sodium benzoate, sodium salicylate, sodium acetate, urea, urethane, monoethylacetamide, butazolidine, propylene glycol, the Tween series, amide nicotinate, hexamine, and dimethylacetamide; buffers such as weak acids and salts thereof (acetic acid and sodium acetate), weak bases and salts thereof (ammonia and ammonium acetate), organic compounds, proteins, albumin, peptone, and gums; isotonic agents such as sodium chloride; stabilizers such as sodium bisulfite ($NaHSO_3$) carbon dioxide gas, sodium metabisulfite ($Na_2S_2O_5$), sodium sulfite ($Na_2SO_3$), nitrogen gas ($N_2$), and ethylenediamine tetraacetic acid; sulfating agents such as 0.1% sodium bisulfide, sodium formaldehyde sulfoxylate, thiourea, disodium ethylenediaminetetraacetate, and acetone sodium bisulfite; a pain relief agent such as benzyl alcohol, chlorobutanol, procaine hydrochloride, glucose, and calcium gluconate; and suspending agents such as sodium CMC, sodium alginate, Tween 80, and aluminum monostearate.

In suppositories according to the present invention, bases such as cacao butter, lanolin, Witepsol, polyethylene glycol, glycerogelatin, methylcellulose, carboxymethylcellulose, a mixture of stearic acid and oleic acid, Subanal, cottonseed oil, peanut oil, palm oil, cacao butter+cholesterol, lecithin, lanette wax, glycerol monostearate, Tween or span, imhausen, monolan (propylene glycol monostearate), glycerin, adeps solidus, buytyrum Tego-G, cebes Pharma 16, hexalide base 95, cotomar, Hydrokote SP, S-70-XXA, S-70-XX75 (S-70-XX95), Hydrokote 25, Hydrokote 711, idropostal, massa estrarium A, AS, B, C, D, E, I, T, masa-MF, masupol, masupol-15, neosuppostal-N, paramount-B, supposiro OSI, OSIX, A, B, C, D, H, L, suppository base IV types AB, B, A, BC, BBG, E, BGF, C, D, 299, suppostal N, Es, Wecoby W, R, S, M, Fs, and tegester triglyceride matter (TG-95, MA, 57) may be used.

Solid preparations for oral administration include tablets, pills, powders, granules, capsules, and the like, and such solid preparations are formulated by mixing the composition with at least one excipient, e.g., starch, calcium carbonate, sucrose, lactose, gelatin, and the like. In addition to simple excipients, lubricants such as magnesium stearate and talc are also used.

Examples of liquid preparations for oral administration include suspensions, liquids for internal use, emulsions, syrups, and the like, and these liquid preparations may include, in addition to simple commonly used diluents, such as water and liquid paraffin, various types of excipients, for example, a wetting agent, a sweetener, a fragrance, a preservative, and the like. Preparations for parenteral administration include an aqueous sterile solution, a non-aqueous solvent, a suspension, an emulsion, a freeze-dried preparation, and a suppository. Non-limiting examples of the non-aqueous solvent and the suspension include propylene glycol, polyethylene glycol, a vegetable oil such as olive oil, and an injectable ester such as ethyl oleate.

The pharmaceutical composition according to an embodiment of the present invention may be administered as an individual therapeutic agent or in combination with other therapeutic agents, may be administered sequentially or simultaneously with conventional therapeutic agents, and may be administered in a single dose or multiple doses. For example, the pharmaceutical composition of an embodiment of the present invention may be used alone or in combination with methods using surgery, radiation therapy, hormone therapy, chemotherapy, and biological response modifiers. It is important to administer the composition in a minimum amount that may obtain the maximum effect without any side effects, in consideration of all the aforementioned factors, and this may be easily determined by those of ordinary skill in the art.

The pharmaceutical composition of an embodiment of the present invention may be administered to a subject via various routes. All administration methods may be predicted, and the pharmaceutical composition may be administered via, for example, oral administration, subcutaneous injection, intraperitoneal administration, intravenous injection, intramuscular injection, intrathecal (space around the spinal cord) injection, sublingual administration, administration via the buccal mucosa, intrarectal insertion, intravaginal insertion, ocular administration, intra-aural administration, intranasal administration, inhalation, spraying via the mouth or nose, transdermal administration, percutaneous administration, or the like.

The pharmaceutical composition of the present invention is determined depending on the type of a drug, which is an active ingredient, along with various related factors such as a disease to be treated, administration route, the age, gender, and body weight of a patient, and the severity of diseases.

In an embodiment of the present invention, the dosage may vary depending on a patient's condition, age, weight, gender and weight, the degree of disease, drug form, administration route and time, and may be appropriately selected by those of ordinary skill in the art. For example, the composition may be administered in an amount of 0.01 to 200 mg/kg/day, according to the determination of a doctor or pharmacist, a predetermined time interval may be divided several times a day, preferably 1 to 3 times a day, and administered through an oral or parenteral route.

Hereinafter, the present invention will be described in detail with reference to Preparation Examples, Examples and Experimental Examples.

However, the following Preparation Examples, Examples and Experimental Examples specifically illustrate the present invention, and the content of the present invention is not limited by the Preparation Examples, Examples and Experimental Examples.

PREPARATION EXAMPLES

Preparation Example: Synthesis of Compound Having HIF-1α Suppressive Activity

As the HIF-1α inhibitor according to an embodiment of the present invention, non-limiting examples of the compound used as an active ingredient of the pharmaceutical composition include the following compounds, isomers thereof, and pharmaceutically acceptable salts thereof. The following compounds according to an embodiment of the present invention were synthesized by appropriately changing the reactants and/or starting materials of a known method.

Hereinafter, a detailed description will follow.

In order to develop novel HIF-1α inhibitors, various disubstituted adamantyl derivatives were prepared by chemical modification at the adamantyl site of LW6. The synthesis method of the new compound is described in Reaction Formula S1-4. Product 2 was synthesized by bromination of 1-adamantane carboxylic acid 1 with bromine in acetic acid, and Friedel-Crafts alkylation of the intermediate 2 with anisole to give ether product 3 in good yield. Demethylation of product 3 with boron tribromide (BBr$_3$) and subsequent chemo-selective protection of product 4 with benzyl bromide gave product 5 under basic conditions, which was further alkylated with ethyl chloroacetate to produce product 6 in good yield. Hydrolysis of the product 6 with lithium hydroxide (LiOH) gave the carboxylic acid product 7, and then coupling with methyl 3-amino benzoate gave the amide derivative product 8 in good yield. The precursors for the synthesis of the target adamantyl derivatives 10a-j were regenerated by removal of the benzyl group of product 8 by catalytic hydrogenation in the presence of palladium on carbon. Carboxylic acid compound 9 could be reacted with alcohols and amines to give esters (10a-e) and amide derivatives (10f-j), respectively. Products 10a-d, f, g and j were synthesized using the coupling agent Hydroxybenzotriazole (HOBt) and EDC·HCl, whereas the other coupled products 10e and h were synthesized using ethylchloroformate and triethylamine (TEA) (Reaction Formula S1). As shown in Reaction Formula S2, the product 4 was treated with 3,4-dimethoxy benzyl bromide in the presence of potassium carbonate (K$_2$CO$_3$) to produce the phenolic ester product 11, which was further alkylated with ethyl chloroacetate to produce product 12 in good yield.

Then, base-mediated hydrolysis of product 12 gave carboxylic acid 13. Finally, the corresponding amides 14a-d were prepared via EDC·HCl- and HOBt-mediated coupling with various commercially available amines (Reaction Formula S2). Likewise, the carboxylic acid intermediate 7 was reacted with 1-methyl piperazine in the presence of EDC·HCl and HOBt to give the amide derivative 15. Catalytic hydrogenation of 15 in the presence of palladium on carbon gave the corresponding carboxylic acid product 16. The amide derivatives (17a-c) were respectively prepared after combining with various amines (Reaction Formula S3). Based on the synthesis profile of 14a-d, as shown in Reaction Formula S4, the ester moiety of the carboxylic acid of product 11 was replaced with an amide to give 21a-c. Product 4 under amide coupling conditions produces intermediate 18, which was then alkylated with ethylchloro acetate to produce product 19 in good yield. Hydrolysis of product 19 with LiOH gave product 20, which was then coupled with various commercially available amines to give disubstituted adamantyl derivatives 21a-c (Reaction Formula S4).

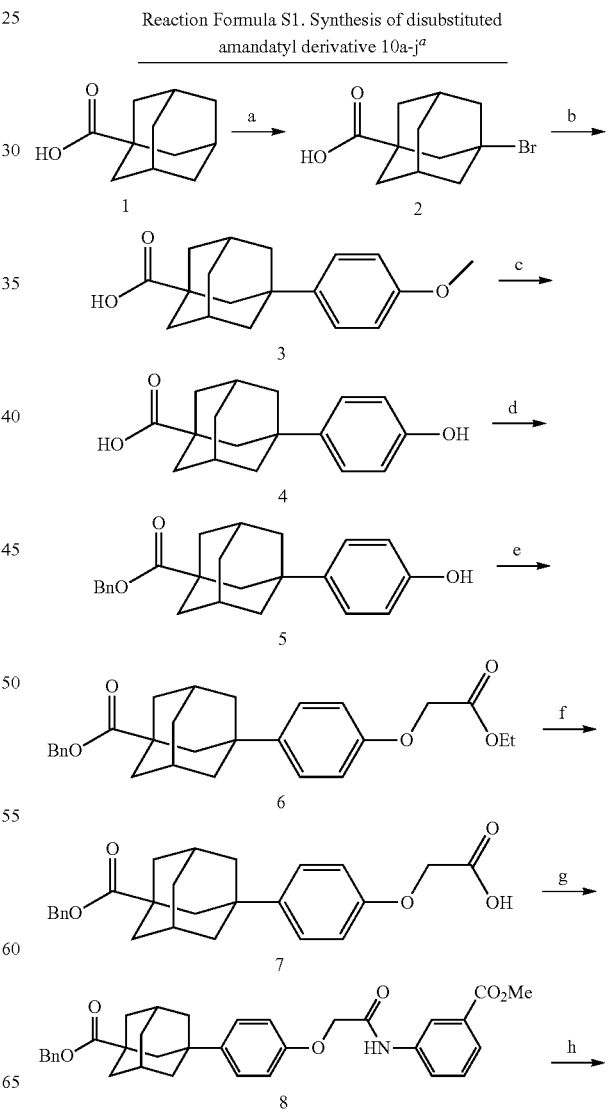

Reaction Formula S1. Synthesis of disubstituted amandatyl derivative 10a-j$^a$

-continued

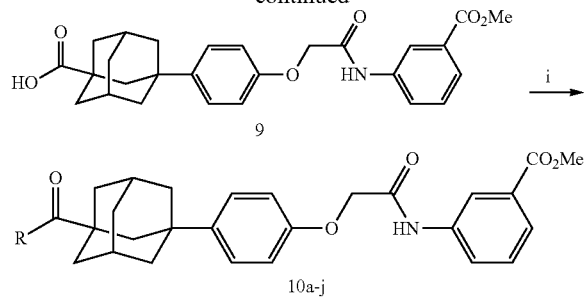

9

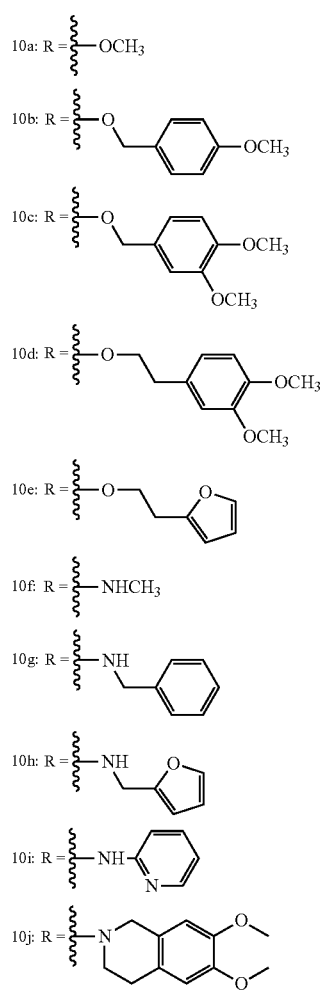

10a-j

*a* Reagants and conditions: (a) AlCl₃, Bromine, DCM; (b) Anisole, AlCl₃; (c) BBr₃, DCM; (d) Benzyl bromide, KHCO₃, DMF; (e) Ethyl chloroacetate, K₂CO₃, DMF; (f) LiOH, THF/H₂O; (g) Methyl-3-amino benzoate, PyBOP, DMAP, DMF; (h) H₂, Pd/C, THF; (i) EDC, HOBT, DIPEA, DMF for 10a-d, 10f-g, 10j; ethyl chloroformate, TEA, THF for 10e,h;

-continued

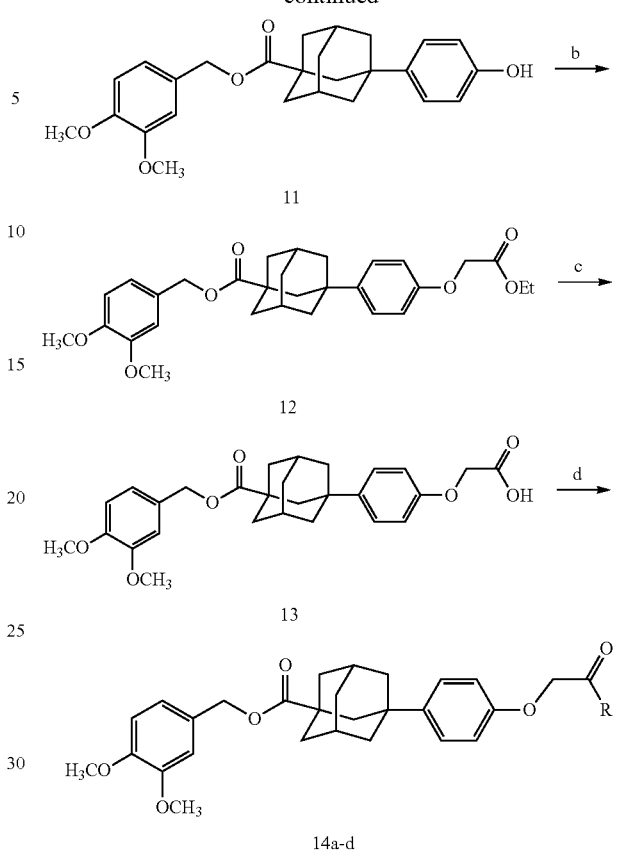

14a-d

*a* Reagants and conditions: (a) 3,4-Dimethoxybenzyl bromide, K₂CO₃, DMF; (b) ethyl chloroacetate, K₂CO₃, DMF; (c) LiOH, THF/H₂O; (d) correspondingamine, EDC, HOBT, DIPEA, DMF.

Reaction Formula S2. Synthesis of disubstituted amandatyl derivative 14a-d*a*

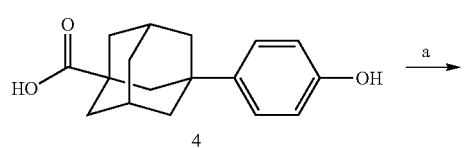

4

Reaction Formula S3. Synthesis of disubstituted amandatyl derivative 17a-c*a*

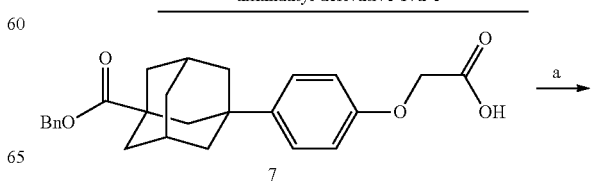

7

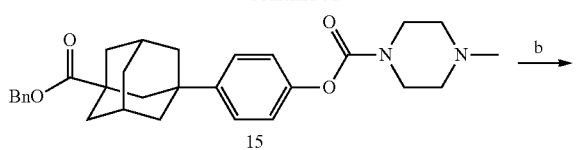

15

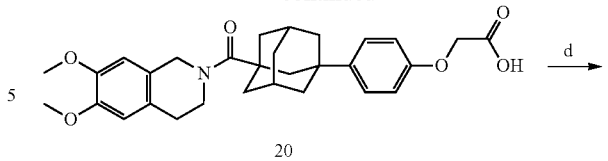

20

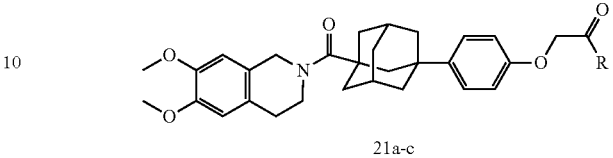

21a-c

<sup>a</sup> Reagants and conditions: (a) 6,7-dimethoxy-1,2,3,4-tetrahydroisoquinoline, EDC, HOBT, DIPEA, DMF; (b) ethyl chloroacetate, K$_2$CO$_3$, DMF; (c) LiOH, THF/H$_2$O; (d) correspondingamines, EDC, HOBT, DIPEA, DMF.

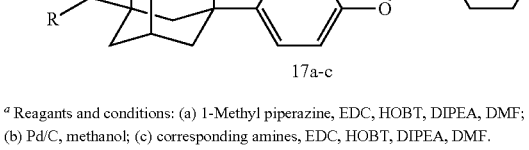

17a-c

<sup>a</sup> Reagants and conditions: (a) 1-Methyl piperazine, EDC, HOBT, DIPEA, DMF; (b) Pd/C, methanol; (c) corresponding amines, EDC, HOBT, DIPEA, DMF.

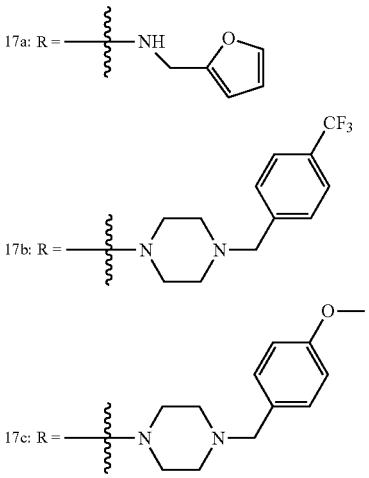

Reaction Formula S4. Synthesis of disubstituted amandatyl derivative 21a-c<sup>a</sup>

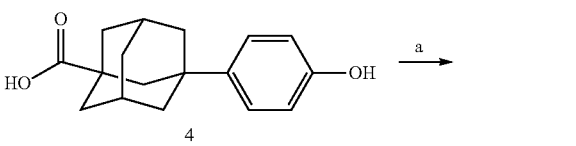

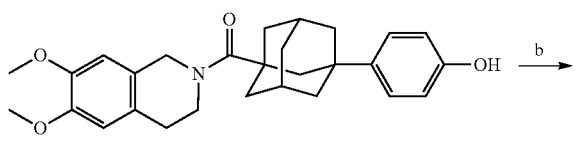

EXAMPLES

Example 1. Synthesis of Compounds 2 to 9

The synthesis process of compounds 2 to 9 used in the reaction formulas is as described below.

Compound 2:3-Bromoadamantane-1-carboxylic acid (2)

AlCl$_3$ (4.80 g, 36.10 mmol) was placed in a two-necked round flask equipped with a reflux condenser and argon. The flask was stirred in a low temperature reactor. Bromine (17.10 mL, 33.29 mmol) was added at −5° C. and stirred for 15 minutes. Then 1-adamantane carboxylic acid (5.00 g, 27.70 mmol) was added to the flask and stirred at −5° C. for 1 hour and at room temperature for 48 hours. The reaction was diluted with chloroform. Excess bromine was treated with sodium pyrosulphite until complete discoloration occurred. The organic layer was dried over anhydrous magnesium sulfate (anhydrous MgSO$_4$), filtered and concentrated. The residue was recrystallized from hexane to give (2) as a white solid (6.67 g, yield 93%). $^1$H-NMR (400 MHZ, DMSO-d$_6$) δ (s, 1H), 2.36 (s, 2H), 2.26-2.13 (m, 6H), 1.79 (d, J=2.8 Hz, 4H), 1.68-1.60 (m, 2H).

Compound 3:3-(4-Methoxyphenyl)-adamantane-1-carboxylic acid (3)

Aluminum chloride (5.14 g, 38.58 mmol) was suspended in 52 mL of anisole, and compound 2 (5.00 g, 19.29 mmol) was added at −10° C. The reaction mixture was stirred at room temperature for 24 hours, then ice and concentrated HCl were added dropwise. The mixture was extracted with EA and isolated. The organic layer was dried over anhydrous MgSO$_4$ and concentrated under reduced pressure. The concentrate was recrystallized from hexane to give (3) as a white solid (5.20 g, yield 94%). $^1$H-NMR (400 MHZ, DMSO-d$_6$) δ (s, 1H), 7.27-7.24 (m, 2H), 6.88-6.84 (m, 2H), 3.71 (s, 3H), 2.13 (s, 2H), 1.90-1.77 (m, 10H), 1.66 (s, 2H).

Compound 4:3-(4-Hydroxyphenyl)-adamantane-1-carboxylic acid (4)

To a DCM solution of compound 3 (2.00 g, 6.98 mmol), a 1.0 M solution of BBr$_3$ (17.40 mL, 17.45 mmol) diluted in DCM was added at −10° C. under argon. The reaction solution was stirred at room temperature until the starting material disappeared (monitored by TLC). The organic layer was dried over anhydrous MgSO$_4$ and concentrated to give (4) as a white solid (1.80 g, 94% yield). $^1$H-NMR (400 MHz, DMSO-d$_6$) δ 1H), 9.11 (s, 1H), 7.13 (d, J=9.2 Hz, 2H), 6.69 (d, J=8.8 Hz, 2H), 2.12 (s, 2H), 1.83-1.75 (m, 10H), 1.65 (s, 2H).

Compound 5:3-(4-Hydroxyphenyl)-adamantane-1-carboxylic acid benzyl ester (5)

Benzyl bromide (1.12 g, 6.61 mol) was added to a mixture of compound 4 (1.50 g, 5.50 mmol) and KHCO$_3$ (0.66 g, 6.61 mol) in 20 mL of DMF. The reaction mixture was heated at 40° C. for 4 hours, and then saturated NaHCO$_3$ was added dropwise. The mixture was extracted with EA and isolated. The organic layer was dried over anhydrous MgSO$_4$ and concentrated under reduced pressure. The concentrate was purified by column chromatography on silica gel to give (5) as a white solid (1.75 g, 87% yield). $^1$H-NMR (400 MHZ, CDCl$_3$) δ 7.358J=J=10H, 1.69 (s, 2H).

Compound 6: 3-(4-Ethoxycarbonylmethoxyphenyl)-adamantane-1-carboxylic acid benzyl ester (6)

Ethyl chloro acetate (0.67 g, 5.50 mmol) was added to a mixture of compound 5 (1.0 g, 2.75 mmol) and potassium carbonate (1.14 g, 8.27 mmol) in 10 mL of DMF. The reaction mixture was stirred at room temperature overnight and then saturated NaHCO$_3$ was added dropwise. The mixture was extracted with EA and dried over anhydrous MgSO$_4$. The mixture was filtered and concentrated under reduced pressure. The concentrate was purified by column chromatography on silica gel to give (6) as a white solid (1.05 g, 85% yield). $^1$H-NMR (400 MHz, DMSO-d$_6$) 7.39-7.31 (m, 5H), 7.26 (d, J=8.4 Hz, 2H), 6.84 (d, J=8.8 Hz, 2H), 5.00 (s, 2H), 4.72 (s, 2H), 4.16 (q, J=7.1 Hz, 2H), 2.15 (s, 2H), 1.90-1.79 (m, 10H), 1.67 (s, 2H), 1.21 (t, J=7.0 Hz, 3H).

Compound 7:3-(4-Carboxymethoxyphenyl)-adamantane-1-carboxylic acid benzyl ester (7)

Compound 6 (0.70 g, 1.56 mmol) was dissolved in 7 mL of THF/H$_2$O (1:1). Lithium hydroxide (0.26 g, 6.24 mmol) was added, and after stirring at room temperature for 90 minutes, 10% HCl was added dropwise. The mixture was extracted with EA and isolated. The organic layer was dried over anhydrous MgSO$_4$ and concentrated under reduced pressure to obtain the concentrate, which was purified by column chromatography on silica gel to give (7) as a white solid (0.60 g, 92% yield). $^1$H-NMR (400 MHZ, DMSO-d$_6$) 12.93 (s, 1H), 7.37-7.31 (m, 5H), 7.26 (d, J=8.4 Hz, 2H), 6.84 (d, J=8.8 Hz, 2H), 5.09 (s, 2H), 4.61 (s, 2H), 2.15 (s, 2H), 1.98-1.75 (m, 10H), 1.67 (s, 2H).

Compound 8:3-{4-[(3-Methoxycarbonylphenylcarbamoyl)-methoxy]-phenyl}-adamantane-1-carboxylic acid benzyl ester (8)

A mixture of compound 7 (0.73 g, 1.74 mmol), 3-aminobenzoic acid methyl ester (0.52 g, 3.47 mmol), PyBOP (1.80 g, 3.47 mmol) and DMAP (0.42 g, 3.47 mmol) was dissolved in 20 mL of DMF in a solvent. After the reaction solution was stirred at room temperature overnight, 10% HCl was added dropwise. The mixture was extracted with EA and isolated. The organic layer was dried over anhydrous MgSO$_4$ and concentrated. The concentrate was purified by column chromatography on silica gel to give (8) as white crystals (0.68 g, 72.00%). $^1$H-NMR (400 MHZ, DMSO-d$_6$) δ (s, 1H), 8.33 (s, 1H), 7.90 (d, J=8.1 Hz, 1H), 7.68 (d, J=8.1 Hz, 1H), 7.48 (t, J=8.1 Hz, 1H), 7.40-7.33 (m, 5H), 7.30 (d, J=8.7 Hz, 2H), 6.94 (d, J=8.7 Hz, 2H), 5.09 (s, 2H), 4.69 (s, 2H), 3.86 (s, 3H), 2.16 (br, 2H), 1.92 (s, 2H), 1.86 (s, 4H), 1.81 (br, 4H), 1.68 (br, 2H).

Compound 9:3-{4-[(3-Methoxycarbonylphenylcarbamoyl)-methoxy]-phenyl}-adamantane-1-carboxylic acid (9)

Compound 8 (0.62 g, 1.12 mmol) was dissolved in 30 mL of THF and 10% Pd/C was added. The reaction mixture was stirred at room temperature under H$_2$ for 2 hours and filtered through a pad of celite. The solution was concentrated under reduced pressure to give (9) as 0.78 g of a white solid. $^1$H-NMR (400 MHZ, DMSO-d$_6$) δ1H), 10.31 (s, 1H), 8.33 (s, 1H), 7.90 (d, J=8.1 Hz, 1H), 7.67 (d, J=8.1 Hz, 1H), 7.48 (t, J=8.1 Hz, 1H), 7.30 (d, J=8.7 Hz, 2H), 6.94 (d, J=8.7 Hz, 2H), 4.69 (s, 2H), 3.85 (s, 3H), 2.14 (br, 2H), 1.87 (s, 2H), 1.80 (br, 8H), 1.66 (br, 2H).

Example 2. Synthesis of Compounds 10-1 to 10-10

According to Reaction Formula S1 Described Above, Compound 1 was Used as a Starting Material, and Compounds 2, 3, 4, 5, 6, 7, 8, and 9 were Used as Intermediates to Synthesize Compounds 10-1 to 10-10.

Compound 10-1: Methyl-3-(2-(4-(3-((methoxy) carbonyl) adamantane-1-yl)phenoxy)acetamido)benzoate (10a)

Compound 9 (0.31 g, 0.66 mmol), methyl alcohol (0.03 ml, 0.99 mmol), 1-(3-dimethylamino propyl)-3-hydrate (0.13 g, 0.99 mmol), HOBt (0.13 g, 0.99 mmol) and DIPEA (0.17 ml, 0.99 mmol) were dissolved in dimethylformamide at room temperature and stirred overnight. Upon completion of stirring, water was added to terminate the reaction, followed by extraction with EA. The extracted organic layer was dried over anhydrous MgSO$_4$ and then concentrated under reduced pressure. The concentrated reactant was purified by column chromatography on silica gel (DCM/EA) to give a white solid (0.37 g, 78%) as 10a. $^1$H-NMR (400 MHz, CDCl$_3$) 8.41 (s, 1H), 8.07 (s, 1H), 8.01 (d, J=8.4 Hz, 1H), 7.83 (d, J=8.0 Hz, 1H), 7.44 (t, J=8.0 Hz, 1H), 7.34 (d, J=8.8 Hz, 2H), 6.96 (d, J=8.8 Hz, 2H), 4.61 (s, 2H), 3.92 (s, 3H), 3.67 (s, 3H), 2.23 (s, 2H), 2.01 (s, 2H), 1.92-1.86 (m, 8H), 1.73 (s, 2H).

Compound 10-2: Methyl-3-(2-(4-(4-((4-methoxybenzyloxy) carbonyl) adamantane-1-yl)phenoxy) acetamido)benzoate (10b)

Compound 9 (0.31 g, 0.66 mmol), 4-methoxybenzoyl alcohol (0.12 ml, 0.99 mmol), EDC·HCl (0.19 g, 0.99 mmol), HOBt (0.13 g, 0.99 mmol) and DIPEA (0.17 ml, 0.99) mmol) were dissolved in dimethylformamide at room temperature and stirred overnight. Upon completion of stirring, water was added to terminate the reaction, followed by extraction with EA. The extracted organic layer was dried over anhydrous $MgSO_4$ and then concentrated under reduced pressure. The concentrated reactant was purified by column chromatography on silica gel (DCM/EA) to give the target compound 10b as a white solid (0.21 g, 54%). $^1$H-NMR (400 MHZ, $CDCl_3$) 8.49 (s, 1H), 8.10 (s, 1H), 7.99 (d, J=7.6 Hz, 1H), 7.81 (d, J=7.2 Hz, 1H), 7.41 (t, J=7.8 Hz, 1H), 7.31-7.25 (m, 4H), 6.90 (dd, J=8.8, 23.2 Hz, 4H), 5.22 (s, 2H), 4.58 (s, 2H), 3.89 (s, 3H), 3.78 (s, 3H), 2.21 (s, 2H), 2.03-1.85 (m, 10H), 1.71 (s, 2H).

Compound 10-3: Methyl-3-(2-(4-(4-((3,4-dimethoxybenzyloxy)carbonyl)adamantane-1-yl)phenoxy)acetamido)benzoate (10c)

Compound 9 (0.31 g, 0.66 mmol), 3,4-dimethoxy benzyl alcohol (0.14 ml, 0.99 mmol), EDC·HCl (0.19 g, 0.99 mmol), HOBt (0.13 g, 0.99 mmol) and DIPEA (0.17 ml, 0.99 mmol) were dissolved in dimethylformamide at room temperature and then stirred overnight. Upon completion of stirring, water was added to terminate the reaction, followed by extraction with EA. The extracted organic layer was dried over anhydrous $MgSO_4$ and concentrated under reduced pressure. The concentrated reactant was purified by column chromatography on silica gel (DCM/EA) to give the target compound 10c as a white solid (0.25 g, 63%). $^1$H-NMR (400 MHZ, $CDCl_3$) 8.38 (s, 1H), 8.07 (s, 1H), 8.01 (d, J=8.4 Hz, 1H), 7.83 (d, J=8.0 Hz, 1H), 7.45 (t, J=7.8 Hz, 1H), 7.33 (d, J=8.8 Hz, 2H), 6.96-6.83 (m, 5H), 5.06 (s, 2H), 4.61 (s, 2H), 3.93 (s, 3H), 3.88-3.87 (m, 6H), 2.23 (s, 2H), 2.03-1.73 (m, 10H), 1.57 (s, 2H).

Compound 10-4: Methyl-3-(2-(4-(2-((3,4-dimethoxyphenethoxy) carbonyl) adamantane-1-yl)phenoxy)acetamido)benzoate (10d)

Compound 9 (0.31 g, 0.66 mmol), 2-(3,4-dimethoxyphenyl) ethanol (0.18 g, 0.99 mmol), EDC·HCl (0.19 g, 0.99 mmol), HOBt (0.13 g, 0.99 mmol) and DIPEA (0.17 ml, 0.99 mmol) were dissolved in DMF at room temperature and stirred overnight. Upon completion of stirring, water was added to terminate the reaction, followed by extraction with EA. The extracted organic layer was dried over anhydrous $MgSO_4$ and then concentrated under reduced pressure. The concentrated reactant was purified by column chromatography on silica gel (DCM/EA) to give the target compound 10d as a white solid (0.36 g, 58%). $^1$H-NMR (400 MHZ, $CDCl_3$) 8.44 (s, 1H), 8.09 (s, 1H), 8.01 (d, J=8.4 Hz, 1H), 7.82 (d, J=8.0 Hz, 1H), 7.43 (t, J=8.0 Hz, 1H), 7.31 (d, J=8.8 Hz, 1H), 6.95 (d, J=8.8 Hz, 2H), 6.81-6.74 (m, 3H), 4.60 (s, 2H), 4.26 (t, J=6.8 Hz, 2H), 3.91 (s, 3H), 3.85-3.83 (m, 6H), 2.88 (t, J=7.0 Hz, 2H), 2.22 (s, 2H), 1.97-1.80 (m, 10H), 1.72 (s, 2H).

Compound 10-5: Methyl-3-(2-(4-(3-((furan-2-yl-methoxy) carbonyl) adamantane-1-yl)phenoxy)acetamido)benzoate (10e)

Compound 9 (60.0 mg, 0.13 mmol) was dissolved in tetrahydrofuran (THF), which was cooled to −10° C. The column was then loaded with 2-(bromomethyl) furan (0.02 ml, 0.17 mmol), ethyl chloro formate (0.02 ml, 15 mmol) and triethylamine (0.02 ml, 0.15 mmol). After the reaction mixture was stirred at room temperature for 30 minutes, water was poured to terminate the reaction. The reactant was extracted with EA, and the extracted organic layer was dried over $MgSO_4$ and then concentrated under reduced pressure. The concentrated reactant was purified by silica gel column chromatography (DCM/methanol) to obtain the target compound 10e as a white solid (49.0 mg, 70%). $^1$H-NMR (400 MHZ, $CDCl_3$) 8.51 (s, 1H), 8.10 (s, 1H), 7.99 (d, J=8.0 Hz, 1H), 7.81 (d, J=7.6 Hz, 1H), 7.43-7.39 (m, 2H), 7.30 (d, J=8.8 Hz, 2H), 6.93 (d, J=8.4 Hz, 2H), 6.36 (dd, J=2.2, 11.4 Hz, 2H), 5.05 (s, 2H), 4.59 (s, 2H), 3.90 (s, 3H), 2.21 (s, 2H), 1.99-1.84 (m, 10H), 1.70 (s, 2H).

Compound 10-6: Methyl-3-(2-(4-(3-methylcarbamoyl-adamantan-1-yl)phenoxy)acetamido)benzoate (10f)

EDC·HCl (80 mg, 0.42 mmol), HOBt (56 mg, 0.42 mmol) and DIPEA (0.15 mL, 0.87 mmol) were added to a solution of compound 9 (160 mg, 0.35 mmol) and methyl amine hydrochloride (0.02 g, 0.35 mmol) in DMF (5.0 mL). The reaction mixture was stirred at room temperature overnight, then the resulting mixture was diluted with EtOAc, and washed with water and brine. The organic layer was isolated, dried over anhydrous $MgSO_4$, filtered and concentrated in vacuo. The produced residue was purified by silica gel column chromatography (hexane:EA=6:4) to give 10f as a white solid (110 mg, 66.1% yield). $^1$H-NMR ($CDCl_3$, 400 MHz) 8.40 (s, 1H), 8.07 (s, 1H), 8.00 (dd, J=8.2, 1.4 Hz, 1H), 7.83 (d, J=7.8 Hz, 1H), 7.44 (t, J=8.0 Hz, 1H), 7.34 (d, J=8.4 Hz, 2H), 6.95 (d, J=9.2 Hz, 2H), 5.67 (s, 1H), 4.61 (s, 2H), 3.92 (s, 3H), 2.81 (d, J=4.4 Hz, 3H), 2.26 (s, 2H), 1.97-1.87 (m, 10H), 1.73 (s, 2H).

Compound 10-7: Methyl-3-(2-(4-(3-benzylcarbamoyl-adamantan-1-yl)phenoxy)acetamido)benzoate (10g)

EDC·HCl (80 mg, 0.42 mmol), HOBt (56 mg, 0.42 mmol) and DIPEA (0.15 mL, 0.87 mmol) were added to a solution of compound 9 (160 mg, 0.35 mmol) and benzyl amine (37 mg, 0.35 mmol) in DMF (5.0 mL). The reaction mixture was stirred at room temperature overnight, then the resulting mixture was diluted with EtOAc, and washed with water and brine. The organic layer was isolated, dried over anhydrous $MgSO_4$, filtered and concentrated in vacuo. The produced residue was purified by silica gel column chromatography (hexane:EA=6:4) to give 10g as a white solid (110 mg, 56.9% yield). $^1$H-NMR (400 MHZ, $CDCl_3$) 8.38 (s, 1H), 8.07 (s, 1H), 8.01 (d, J=8.4 Hz, 1H), 7.83 (d, J=8.0 Hz, 1H), 7.45 (t, J=8.0 Hz, 1H), 7.33 (t, J=7.6 Hz, 4H), 7.29-7.26 (m, 5H), 5.89 (s, 1H), 4.61 (s, 2H), 4.45 (d, J=5.2 Hz, 2H), 3.92 (s, 3H), 2.27 (s, 2H), 2.04-1.90 (m, 10H), 1.74 (s, 2H).

Compound 10-8: Methyl-3-(2-(4-(3-(furan-2-ylmethylcarbamoyl)-adamantan-1-yl) phenoxy) acetamido)benzoate (10h)

Triethylamine (0.022 mL, 0.155 mmol) was added to a solution of compound 9 (60 mg, 0.129 mmol) in 1 mL of THE, and the mixture was cooled to −10° C. Then, ethyl chloroformate (0.016 mL, 0.168 mmol) was added and stirred at −10° C. for 30 minutes. Then furfurylamine (0.015 mL, 0.155 mmol) was added to the solution and allowed to warm to room temperature. The reaction solution was stirred at room temperature for an additional 30 minutes, and the solvent was evaporated under reduced pressure. The residue was purified by prep-TLC to give 10h (49 mg, yield 70%) as a pale yellow solid. $^1$H-NMR (400 MHZ, CDCl$_3$) δ (s, 1H), 8.07 (s, 1H), 8.01 (dd, J=1.2-8.4 Hz, 1H), 7.83 (d, J=8.0 Hz, 1H), 7.45 (t, J=8.0 Hz, 1H), 7.34 (d, J=8.8 Hz, 3H), 6.96 (d, J=9.2 Hz, 2H), 6.32 (t, J=2.4 Hz, 1H), 6.21 (d, J=3.2 Hz, 1H), 4.61 (s, 2H), 4.44 (d, J=5.2 Hz, 2H), 3.92 (s, 3H), 2.26 (s, 2H), 1.98 (s, 2H), 1.90-1.88 (m, 8H), 1.73 (s, 2H), 1.55 (s, 2H).

Compound 10-9: Methyl-3-(2-(4-(3-(pyridin-2-yl-carbamoyl)-adamantan-1-yl)phenoxy)acetamido)benzoate (10i)

DMF (0.5 mL) was added to a mixture of compound 9 (50 mg, 0.11 mmol), 2-aminopyridine (20 mg, 0.21 mmol), PyBOP (110 mg, 0.21 mmol) and DMAP (26 mg, 0.216 mmol). Then, the reaction solution was stirred at room temperature overnight, and then 10% HCl was added dropwise. The mixture was extracted with EA and the combined organic layers were dried over anhydrous MgSO$_4$. The filtrate was concentrated under reduced pressure, and the residue was purified by prep-TLC (n-hexane:EA=1:1) to give 10i as a yellow solid (30 mg, yield 52%). $^1$H-NMR (300 MHz, DMSO-d$_6$) δ1H), 9.78 (s, 1H), 8.33 (d, J=2.1 Hz, 1H), 8.31 (s, 1H), 8.06 (d, J=8.7 Hz, 1H), 7.90 (d, J=7.8 Hz, 1H), 7.56 (t, J=7.5 Hz, 1H), 7.67 (d, J=7.2 Hz, 1H), 7.48 (t, J=8.1 Hz, 1H), 7.36 (d, J=9 Hz, 2H), 7.09 (t, J=7.5 Hz, 1H), 6.96 (d, J=9 Hz, 2H), 4.69 (s, 2H), 3.85 (s, 3H), 2.18 (br, 2H), 2.04 (s, 2H), 1.94 (s, 3H), 1.89-1.69 (m, 7H).

Compound 10-10: Methyl-3-(2-(4-(3-(6,7-dimethoxy-1,2,3,4-tetrahydroisoquinoline-2-carbonyl)-adamantan-1-yl)phenoxy)acetamido)benzoate (10j)

EDC·HCl (80 mg, 0.42 mmol), HOBt (56 mg, 0.42 mmol) and DIPEA (0.15 mL, 0.87 mmol) were added to a solution of compound 20 (100 mg, 0.35 mmol) and 3-amino benzoic acid methyl ester (53 mg, 0.35 mmol) in DMF (5.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (hexane:EA=6:4) to give a white solid as 10j (107 mg, 48% yield). $^1$H-NMR (CDCl$_3$, 400 MHZ) 8.39 (s, 1H), 8.07 (s, 1H), 8.02 (d, J=8.0 Hz, 1H), 7.83 (d, J=7.6 Hz, 1H), 7.45 (t, J=7.8 Hz, 1H), 7.36 (d, J=8.8 Hz, 1H), 6.97 (d, J=8.4 Hz, 2H), 6.60 (d, J=5.2 Hz, 2H), 4.71 (s, 2H), 4.61 (s, 2H), 3.92 (s, 5H), 3.85 (s, 6H), 2.81 (s, 2H), 2.28 (s, 2H), 2.15-2.07 (m, 6H), 1.91 (s, 4H), 1.77 (s, 4H).

Example 3. Synthesis of Compounds 14-1 to 14-4

According to Reaction Formula S2 Described Above, Compound 4 was Used as a Starting Material, and Compounds 11, 12 and 13 were Used as Intermediates to Synthesize Compounds 14-1 to 14-4.

Compound 14-1: Compound 3,4-Dimethoxybenzyl-2-(4-(2-oxo-2-(3-(trifluoromethyl)phenylamino)ethoxy)phenyl) adamantane-1-ylcarboxylae (14a)

EDC·HCl (42 mg, 0.22 mmol), HOBt (29 mg, 0.22 mmol) and DIPEA (0.080 mL, 0.47 mmol) were added to a solution of compound 13 (90 mg, 0.19 mmol) and 3-(trifluoromethyl) aniline (33 mg, 0.20 mmol) in DMF (5.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (hexane:EA=6:4) to give a white solid as 14a (64 mg, 54% yield). $^1$H-NMR (CDCl$_3$, 400 MHZ) 8.39 (s, 1H), 7.87 (s, 1H), 7.82 (d, J=8.4 Hz, 1H), 7.48 (t, J=7.8 Hz, 1H), 7.41 (d, J=8.0 Hz, 1H), 7.33 (d, J=8.8 Hz, 2H), 6.95 (d, J=9.2 Hz, 2H), 6.91 (dd, J=8.4, 2.0 Hz, 1H), 6.85 (s, 1H), 6.84 (d, J=10.8 Hz, 1H), 5.05 (s, 2H), 4.61 (s, 2H), 3.88 (s, 3H), 3.87 (s, 3.87), 2.23 (s, 2H) 2.02-1.86 (m, 10H), 1.72 (s, 2H).

Compound 14-2:3,4-Dimethoxybenzyl-2-(4-(2-oxo-2-(quinolin-8-ylamino) ethoxy)phenyl) adamantane-1-ylcarboxylate (14b)

EDC·HCl (42 mg, 0.22 mmol), HOBt (29 mg, 0.22 mmol) and DIPEA (0.080 mL, 0.47 mmol) were added to a solution of compound 13 (90 mg, 0.19 mmol) and quinolin-8-amine (29 mg, 0.20 mmol) in DMF (5.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (hexane:EA=6:4) to give 14b as a white solid (79 mg, 61% yield). $^1$H-NMR (400 MHZ, CDCl$_3$) 10.97 (s, 1H), 8.86 (dd, J=1.4-4.2 Hz, 1H), 7.56 (d, J=1.6 Hz, 1H), 7.55 (s, 1H), 7.47 (q, J=4.1 Hz, 1H), 7.33 (d, J=8.4 Hz, 2H), 7.08 (d, J=8.4 Hz, 2H), 6.91 (d, J=10.0 Hz, 1H), 6.84 (d, J=8.0 Hz, 2H), 5.05 (s, 2H), 4.73 (s, 2H), 3.88 (s, 6H), 2.23 (s, 2H), 2.04-1.87 (m, 10H), 1.72 (s, 2H); $^{13}$C-NMR (100 MHz, CDCl$_3$) 177.1, 167.0, 155.5, 148.9, 148.8, 143.9, 143.9, 138.8, 136.2, 133.8, 128.9, 128.0, 127.2, 126.2, 122.2, 121.7, 120.7, 116.8, 114.9, 111.3, 111.0, 68.4, 66.0, 55.9, 55.8, 44.3, 42.2, 41.9, 38.1, 36.0, 35.6, 28.7.

Compound 14-3:3,4-Dimethoxybenzyl-2-(4-(2-(furan-2-ylmethylamino)-2-oxoethoxy)phenyl) adamantane-1-ylcarboxylate (14c)

EDC·HCl (42 mg, 0.22 mmol), HOBt (29 mg, 0.22 mmol) and DIPEA (0.080 mL, 0.47 mmol) were added to compound 13 (90 mg, 0.19 mmol) and furan-2-yl-methanamine (20 mg, 0.20 mmol) in DMF (5.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (hexane:EA=6:4) to give 14c as a white solid (57 mg, 54% yield). $^1$H-NMR (400 MHZ, CDCl$_3$) 7.35 (s, 1H), 7.29 (d, J=1.6 Hz, 2H), 6.91-6.82 (m, 5H), 6.32 (q, J=1.6 Hz, 1H), 6.22 (d, J=3.2 Hz, 1H), 5.05 (s, 2H), 4.53 (d, J=6.0 Hz, 2H), 4.49 (s, 2H), 3.87 (d, J=2.4 Hz, 6H), 2.22 (s, 2H), 2.00 (s, 2H), 1.97-1.88 (m, 4H), 1.85 (d, J=1.6 Hz, 2H), 1.71 (s, 2H).

Compound 14-4:3,4-Dimethoxybenzyl-2-(4-(2-(4-methylpiperazin-1-yl)-2-oxoethoxy)phenyl) adamantane-1-ylcarboxylate (14d)

EDC·HCl (42 mg, 0.22 mmol), HOBt (29 mg, 0.22 mmol) and DIPEA (0.080 mL, 0.47 mmol) were added to a solution of compound 13 (90 mg, 0.19 mmol) and 1-methylpiperazine (20 mg, 0.20 mmol) in DMF (5.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (hexane:EA=6:4) to give 14d as a white solid (50 mg, 47% yield). $^1$H-NMR (400 MHZ, CDCl$_3$) 7.26 (d, J=8.8 Hz, 2H), 6.89-6.83 (m, 5H), 5.05 (s, 2H), 4.65 (s, 2H), 3.87 (s, 6H), 3.61 (d, J=23.2 Hz, 4H), 2.39 (s, 4H), 2.29 (s, 3H), 2.21 (s, 2H), 2.01-1.85 (m, 10H), 1.71 (s, 2H).

Example 4. Synthesis of Compounds 17-1 to 17-3

According to Reaction Formula S3 Described Above, Compound 7 was Used as a Starting Material, and Compounds 15 and 16 were Used as Intermediates to Synthesize Compounds 17-1 to 17-3.

Compound 17-1: N-(Furan-2-ylmethyl)-5-(4-(2-(4-methylpiperazin-1-yl)-2-oxoethoxy)phenyl) adamantan-1-yl-carboxamide (17a)

EDC·HCl (50 mg, 0.26 mmol), HOBt (35 mg, 0.26 mmol) and DIPEA (0.90 mL, 0.52 mmol) were added to a solution of compound 16 (90 mg, 0.21 mmol) and furan-2-yl-methanamine (25 mg, 0.26 mmol) in DMF (3.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (DCM:MeOH=1:9) to give 17a as a white solid (0.30 mg, 29% yield). $^1$H-NMR (CDCl$_3$, 400 MHZ) 7.33 (s, 1H), 7.29 (s, 1H), 7.25 (s, 1H), 6.87 (d, J=3.7 Hz, 2H), 6.31-6.29 (m, 1H), 6.19 (d, J=3.6 Hz, 1H), 5.96 (s, 1H), 4.64 (s, 2H), 4.42 (d, J=5.2 Hz, 2H), 3.63 (t, J=4.8 Hz, 2H), 3.57 (t, J=5.0 Hz, 2H), 2.38-2.36 (m, 4H), 2.28 (s, 3H), 2.23 (s, 2H), 1.95 (s, 2H), 1.88-1.85 (m, 8H), 1.71 (s, 2H).

Compound 17-2:1-(4-Methylpiperazin-1-yl)-2-(4-(5-(4-(4-(trifluoromethyl)benzyl) piperazine-1-carbonyl) adamantan-1-yl-) phenoxy) ethanone (17b)

EDC·HCl (50 mg, 0.26 mmol), HOBt (35 mg, 0.26 mmol) and DIPEA (0.90 mL, 0.52 mmol) were added to a solution of compound 16 (90 mg, 0.21 mmol) and 1-(4-(trifluoromethyl)benzyl) piperazine (49 mg, 0.35 mmol) in DMF (3.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (DCM:MeOH=1:9) to give 17b as a white solid (25 mg, 19% yield). $^1$H-NMR (CDCl$_3$, 400 MHZ) 7.57 (d, J=8.0 Hz, 2H), 7.45 (d, J=8.4 Hz, 2H), 7.26 (d, J=8.8 Hz, 2H), 4.67 (s, 2H), 3.70-3.54 (m, 10H), 2.43-2.37 (m, J=3.3 Hz, 8H), 2.29 (s, 3H), 2.23 (s, 2H), 2.06-2.00 (m, 6H), 1.85 (s, 4H), 1.71 (s, 2H).

Compound 17-3:2-(4-(5-(4-(4-Methoxybenzyl) piperazine-1-carbonyl) adamantan-1-yl) phenoxy)-1-(4-methylpiperazin-1-yl) ethanone (17c)

EDC·HCl (50 mg, 0.26 mmol), HOBt (35 mg, 0.26 mmol) and DIPEA (0.90 mL, 0.52 mmol) were added to a solution of compound 16 (90 mg, 0.21 mmol) and 1-(4-methoxybenzyl) piperazine (53 mg, 0.26 mmol) in DMF (3.0 mL). The reaction mixture was stirred at room temperature overnight, then the resulting mixture was diluted with EtOAc, and washed with water and brine. The organic layer was isolated, dried over anhydrous MgSO$_4$, filtered and concentrated in vacuo. The produced residue was purified by silica gel column chromatography (DCM:MeOH=1:9) to give 17c as a white solid (37 mg, 30% yield). $^1$H-NMR (CDCl$_3$, 400 MHz) 7.26 (d, J=8.0 Hz, 2H), 7.23 (d, J=8.8 Hz, 2H), 6.90 (d, J=8.4 Hz, 2H), 6.86 (d, J=8.8 Hz, 2H), 4.66 (s, 2H), 3.80 (s, 3H), 3.70-3.66 (m, 6H), 3.61 (t, J=4.8 Hz, 2H), 3.46 (s, 2H), 2.42 (s, 8H), 2.31 (s, 3H), 2.23 (s, 2H), 2.06-1.99 (m, 6H), 1.85 (s, 4H), 1.71 (s, 2H).

Example 5. Synthesis of Compounds 19 and 20

The Synthesis Process of Compounds 19 and 20 Used in the Reaction Formulas Above is as Described Below.

Compound 19: {4-[3-(6,7-Dimethoxy-3,4-dihydro-1H-isoquinoline-2-carbonyl)-adamantan-1-yl]-phenoxy}-acetic acid ethyl ester (19)

Compound 15 (2.26 g, 6.30 mmol) was dissolved in acetonitrile and triethylamine (2.25 g, 0.02 mol) and 50% PPAA (4.81 g, 7.57 mmol) were added at room temperature. The mixture was stirred for 30 minutes, and 6,7-dimethoxy-1,2,3,4-tetrahydroisoquinoline hydrochloride (1.74 g, 7.57 mmol) was added. The reaction solution was then stirred at room temperature overnight and evaporated under reduced pressure. The reaction mixture was purified by column chromatography on silica gel to give compound 19 as a white solid (2.21 g, yield 66%). $^1$H-NMR (400 MHZ, DMSO-d$_6$) δ (d, J=8.7 Hz, 2H), 6.84 (d, J=9 Hz, 2H), 6.83 (s, 1H), 6.70 (s, 1H), 4.73 (s, 2H), 4.64 (s, 2H), 4.16 (q, J=6.3 Hz, 2H), 3.81 (q, J=5.7 Hz, 2H), 3.71 (s, 3H), 3.70 (s, 3H)), 2.69 (q, J=5.1 Hz, 2H), 2.17 (br, 2H), 1.95-1.86 (m, 7H), 1.78~1.67 (m, 5H), 1.21 (t, J=7.5 Hz, 3H).

Compound 20: {4-[3-(6,7-Dimethoxy-3,4-dihydro-1H-isoquinoline-2-carbonyl)-adamantan-1-yl]-phenoxy}-acetic acid (20)

Compound 19 (2.21 g, 4.14 mmol) was dissolved in a solution of THF and H$_2$O, lithium hydroxide (0.26 g, 6.21 mmol) was added at room temperature, stirred for 1 hour, and then 10% HCl was added dropwise. The filtrate was evaporated under reduced pressure, and the solid was washed with n-hexane to give product 20, a white solid (2.07 g). $^1$H-NMR (400 MHZ, DMSO-d$_6$) 7.29 (d, J=8.7 Hz, 2H), 6.83 (d, J=8.1 Hz, 2H), 6.81 (s, 1H), 6.70 (s, 1H), 4.64 (s, 2H), 4.62 (s, 2H), 3.81 (q, J=5.1 Hz, 2H), 3.71 (s, 3H), 3.70 (s, 3H), 2.69 (q, J=5.7 Hz, 2H)), 2.17 (br, 2H), 1.99-1.88 (m, 8H), 1.78-1.66 (m, 4H).

Example 6. Synthesis of Compounds 21-1 to 21-3

According to Reaction Formula S1 Described Above, Compound 7 was Used as a Starting Material, and Compounds 15 and 16 were Used as Intermediates to Synthesize Compounds 21-1 to 21-3.

Compound 21-1:2-(4-(3-(6,7-Dimethoxy-1,2,3,4-tetrahydroisoquinoline-2-carbonyl) adamantan-1-yl) phenoxy)-1-morpholinoethanone (21a)

EDC·HCl (191 mg, 0.35 mmol), HOBt (135 mg, 0.35 mmol) and DIPEA (0.129 mL, 0.60 mmol) were added to a solution of compound 20 (150 mg, 0.29 mmol) and morpholine (313 mg, 0.35 mmol) in DMF (5.0 mL). The reaction mixture was stirred at room temperature overnight, then the resulting mixture was diluted with EtOAc, and washed with water and brine. The organic layer was isolated, dried over anhydrous $MgSO_4$, filtered and concentrated in vacuo. The produced residue was purified by silica gel column chromatography (DCM:MeOH=1:9) to give 21a as a white solid (81 mg, 48% yield). $^1$H-NMR (400 MHZ, $CDCl_3$) δ (d, J=2.4 Hz, 2H), 7.28 (d, J=3.2 Hz, 2H), 6.60 (d, J=6.4 Hz, 2H), 4.71 (s, 2H), 4.67 (s, 2H), 3.92-3.88 (m, 2H), 3.85 (s, 4H), 3.67-3.60 (m, 9H), 2.80 (t, J=6.4 Hz, 2H), 2.26 (s, 2H), 2.13-2.02 (m, 6H), 1.89-1.86 (m, 4H), 1.75 (s, 2H).

Compound 21-2: 2-(4-(3-(6,7-Dimethoxy-1,2,3,4-tetrahydroisoquinoline-2-carbonyl) adamantan-1-yl) phenoxy)-1-(4-methylpiperazin-1-yl) ethanone (21b)

EDC·HCl (191 mg, 0.35 mmol), HOBt (135 mg, 0.35 mmol) and DIPEA (0.129 mL, 0.60 mmol) were added to compound 20 (150 mg, 0.29 mmol) and 1-methylpiperazine (100 mg, 0.35 mmol) in DMF (5.0 mL). The reaction mixture was stirred at room temperature overnight, then the resulting mixture was diluted with EtOAc, and washed with water and brine. The organic layer was isolated, dried over anhydrous $MgSO_4$, filtered and concentrated in vacuo. The produced residue was purified by silica gel column chromatography (DCM:MeOH=1:9) to give a white solid as 21b (80 mg, 45% yield). $^1$H-NMR (400 MHZ, $CDCl_3$) δ (d, J=6.8 Hz, 2H), 6.90 (d, J=8.8 Hz, 2H), 6.60 (d, J=6.2 Hz, 2H), 4.71 (s, 2H), 4.66 (s, 2H), 3.89 (s, 2H), 3.85 (s, 6H), 3.62 (d, J=22.4 Hz, 4H), 2.80 (s, 2H), 2.40 (s, 4H), 2.29 (s, 3H), 2.26 (s, 2H), 2.13-2.02 (m, 6H), 1.89 (s, 4H), 1.75 (s, 2H).

Compound 21-3: 2-(4-(3-(6,7-Dimethoxy-1,2,3,4-tetrahydroisoquinoline-2-carbonyl) adamantan-1-yl) phenoxy)-1-(4-(4-(trifluoromethyl)benzyl) piperazin-1-yl) ethanone (21c) (LW1564)

EDC·HCl (191 mg, 0.35 mmol), HOBt (135 mg, 0.35 mmol) and DIPEA (0.129 mL, 0.60 mmol) were added to a solution of compound 20 (150 mg, 0.29 mmol) and 1-(4-(trifluoromethyl)benzyl) piperazine (71 mg, 0.29 mmol) in DMF (5.0 mL). The reaction mixture was stirred at room temperature overnight, then the resulting mixture was diluted with EtOAc, and washed with water and brine. The organic layer was isolated, dried over anhydrous $MgSO_4$, filtered and concentrated in vacuo. The produced residue was purified by silica gel column chromatography (DCM: MeOH=1:9) to give LW1564 (21c) as a white solid (0.123 mg, 57% yield). $^1$H-NMR (400 MHZ, $CDCl_3$) δ (d, J=8.0 Hz, 2H) 7.44 (d, J=8.0 Hz, 2H), 7.29 (d, J=8.8 Hz, 2H), 6.89 (d, J=8.4 Hz, 2H), 6.60 (d, J=6.0 Hz, 2H), 4.71 (s, 2H), 4.66 (s, 2H), 3.90 (t, J=5.8 Hz, 2H), 3.85 (d, J=2.0 Hz, 6H), 3.64 (s, 2H), 3.59 (t, J=4.8 Hz, 2H), 3.55 (s, 2H), 2.80 (t, J=5.4 Hz, 2H), 2.44 (s, 4H)), 2.26 (s, 2H), 2.13-2.05 (m, 6H), 1.89 (d, J=2.4 Hz, 4H), 1.76 (s, 2H).

Experimental Examples

Screening of HIF-1 Inhibitors by HRE-Luciferase Assay

HCT116 cells stably expressing the HRE-dependent luciferase reporter were treated with the disubstituted adamantyl derivative prepared in the above example under hypoxic conditions for 12 hours before measuring luciferase activity.

In HCT116 cells treated with disubstituted adamantyl derivatives, luciferase activity was investigated using HRE-luciferase assay. The HRE-luciferase reporter assay was performed as previously described using the luciferase assay system (Promega, Madison, WI, USA) according to the manufacturer's instructions (Naik, R. et al. Synthesis and Structure-Activity Relationship of (E)Phenoxyacrylic Amide Derivatives as Hypoxia-Inducible Factor (HIF) 1α Inhibitors. J. Med. Chem. 55, 10564-1057 (2012)). Luciferase activity was measured using a Victor X light luminescence reader (PerkinElmer, Boston, MA, USA).

As a result, the activity exhibited by the disubstituted adamantyl derivative is shown in Table 1 below.

TABLE 1

| Code No. | structure | | HRE $IC_{50}$ (μM) |
|---|---|---|---|
| | $R_4$ | $R_1$ | |
| 10a | —OCH$_3$ | —NH—C$_6$H$_4$—CF$_3$ | 18.3 |
| 10b | —O—CH$_2$—C$_6$H$_4$—OCH$_3$ | —NH—C$_6$H$_4$—CF$_3$ | >20 |
| 10c | —O—CH$_2$—C$_6$H$_3$(OCH$_3$)—OCH$_3$ | —NH—C$_6$H$_4$—CF$_3$ | 2.37 |

TABLE 1-continued

| Code No. | R₄ | R₁ | HRE IC$_{50}$(μM) |
|---|---|---|---|
| 10d | -O-CH₂CH₂-(3,4-dimethoxyphenyl) | -NH-(3-CF₃-phenyl) | >20 |
| 10e | -O-CH₂-(2-furyl) | -NH-(3-CF₃-phenyl) | 6.4 |
| 10f | -NHCH₃ | -NH-(3-CF₃-phenyl) | 16.6 |
| 10g | -NH-CH₂-phenyl | -NH-(3-CF₃-phenyl) | 1.3 |
| 10h | -NH-CH₂-(2-furyl) | -NH-(3-CF₃-phenyl) | 3.0 |
| 10i | -NH-(2-pyridyl) | -NH-(3-CF₃-phenyl) | 2.4 |
| 10j | -N-(6,7-dimethoxy-1,2,3,4-tetrahydroisoquinolin-2-yl) | -NH-(3-CF₃-phenyl) | 1.3 |
| 14a | -O-CH₂-(3,4-dimethoxyphenyl) | -NH-(3-CF₃-phenyl) | >20 |
| 14b | -O-CH₂-(3,4-dimethoxyphenyl) | -NH-(quinolin-8-yl) | >20 |

TABLE 1-continued
| Code No. | R₄ | R₁ | HRE IC$_{50}$(μM) |
|---|---|---|---|
| 14c | 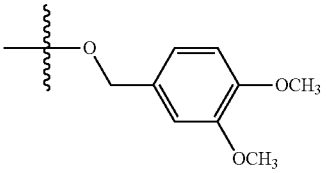 [SMILES: *OCc1ccc(OC)c(OC)c1] | 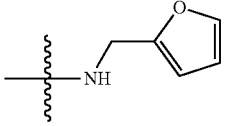 [SMILES: *NCc1ccco1] | 22.5 |
| 14d | 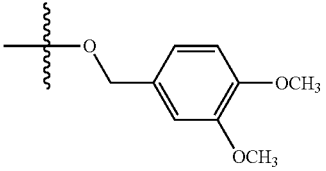 | 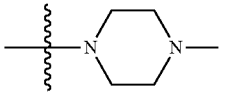 | 1.67 |
| 17a | 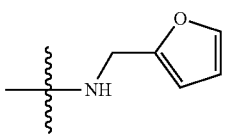 | 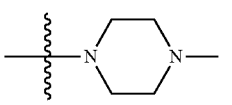 [SMILES: *N1CCN(C)CC1] | >20 |
| 17b | 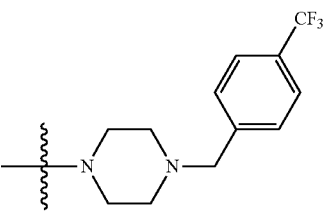 [SMILES: *N1CCN(Cc2ccc(C(F)(F)F)cc2)CC1] | 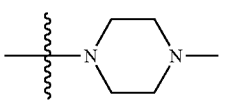 | 2.19 |
| 17c | 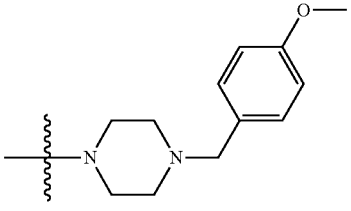 [SMILES: *N1CCN(Cc2ccc(OC)cc2)CC1] | 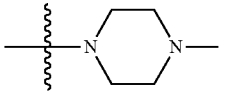 | 9.53 |
| 21a | 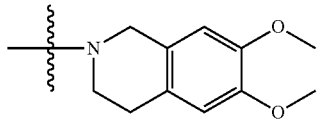 | 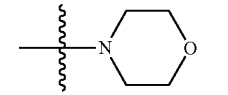 | 5.43 |
| 21b | 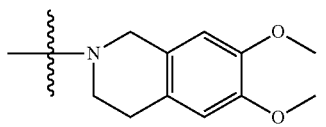 [SMILES: *N1CCc2cc(OC)c(OC)cc2C1] | 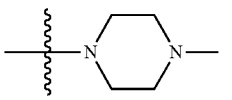 | 9.51 |
| 21c (LW1564) | 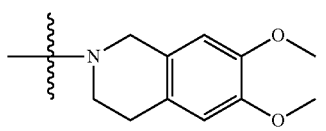 [SMILES: *N1CCc2cc(OC)c(OC)cc2C1] | 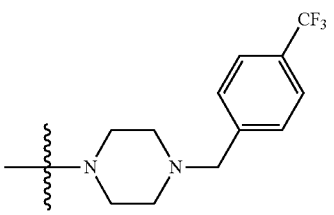 [SMILES: *N1CCN(Cc2ccc(C(F)(F)F)cc2)CC1] | 1.10 |
Values are the means of three experiments.

LW1564 (Compound 21-3) Suppresses HIF-1 Activation and Proliferation of Cancer Cells.

Figure 1C:
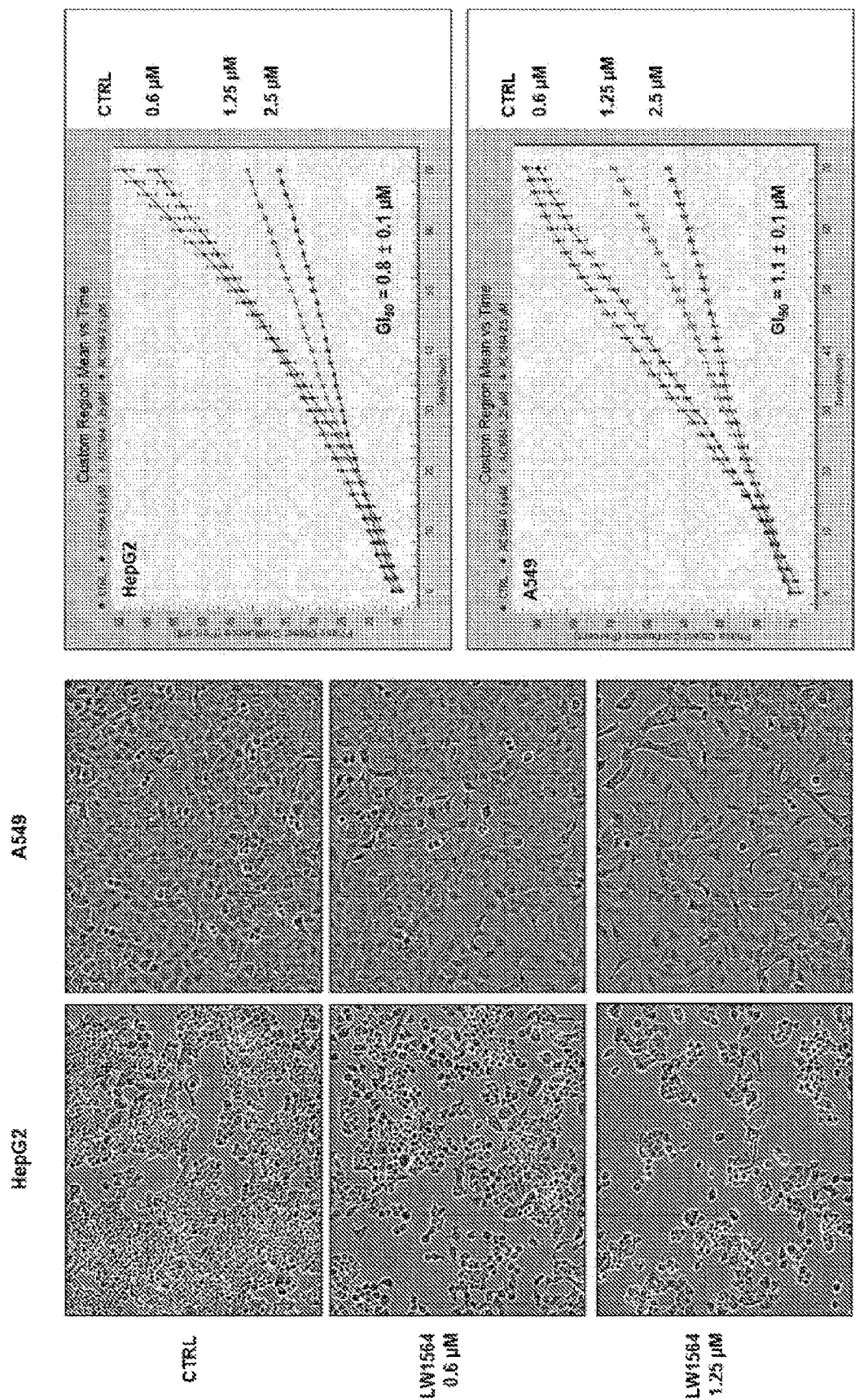

Among the newly synthesized adamantyl compounds, it was evaluated how compound 21c (LW1564, Compound 21-3), FIG. 1A) affected proliferation suppression of various cancer cells. Human breast cancer cells (MCF7), human cervical cancer cells (HeLa), human colorectal cancer cells (HCT116, HCT15, LoVo, SW480, SW620 and WiDr), human fibrosarcoma cells (HT1080), human gastric cancer cells (NCI-N87, NUGC3 and SNU484), human liver cancer cells (HepG2, HT17, Huh7, SHJ1 and SK-Hep1), human lung cancer cells (A549 and H1299), human pancreatic cancer cells (AsPC1 and MIA-PaCa2) and normal lung fibroblasts (CCD-34Lu and WI-38) were purchased from the American Type Culture Collection (Manassas, Virginia, USA) or KRIBB Cell Line Bank (Daejeon). For cell culture, cells were cultured in a DMEM medium (Gibco, Grand Island, New York, USA) supplemented with 5% (v/v) fetal bovine serum (WelGENE, Daegu, Korea) and 100 U/ml penicillin and 100 µg/ml streptomycin (Gibco). Cells were maintained at 37° C. in a humidified incubator with 5% $CO_2$, and hypoxia and a multi-gas incubator (Sanyo, Osaka, Japan) was adjusted to 1% $O_2$, 94% $N_2$ and 5% $CO_2$. Cell viability was determined by methylene blue colorimetric assay as described in the "Chou, T. C. Theoretical basis, experimental design, and computerized simulation of synergism and antagonism in drug combination studies. *Pharmacol. Rev.* 58, 621-681 (2006)." After treatment with LW1564 (compound 21-3), cells were fixed with 4% formaldehyde (Sigma-Aldrich) and washed 3 times with PBS. After staining with methylene blue (Sigma-Aldrich), the cells were washed with water. The dye was eluted with 0.1% HCl (v/v) and quantified at 600 nm on a Molecular Devices EMax (Molecular Devices, CA, USA). It was found that LW1564 (compound 21-3) suppressed the proliferation of various cancer cells ($GI_{50}$=0.4 to 4.6 M), and had no effect on the growth of normal cells, CCD-34Lu and WI-38 ($GI_{50}$>20 µM) (FIG. 1B). Then, the effect of LW1564 (compound 21-3) on cell proliferation was investigated using a live cell imaging system, IncuCyte ZOOM (Essen Bioscience, Ann Arbor, MI, USA). LW1564 (compound 21-3) induced proliferation inhibition of HepG2 and A549 cells in a dose-dependent manner (FIG. 1C).

LW1564 (Compound 21-3) Suppresses HIF-1α Accumulation in Cancer Cells.

Figure 2A:
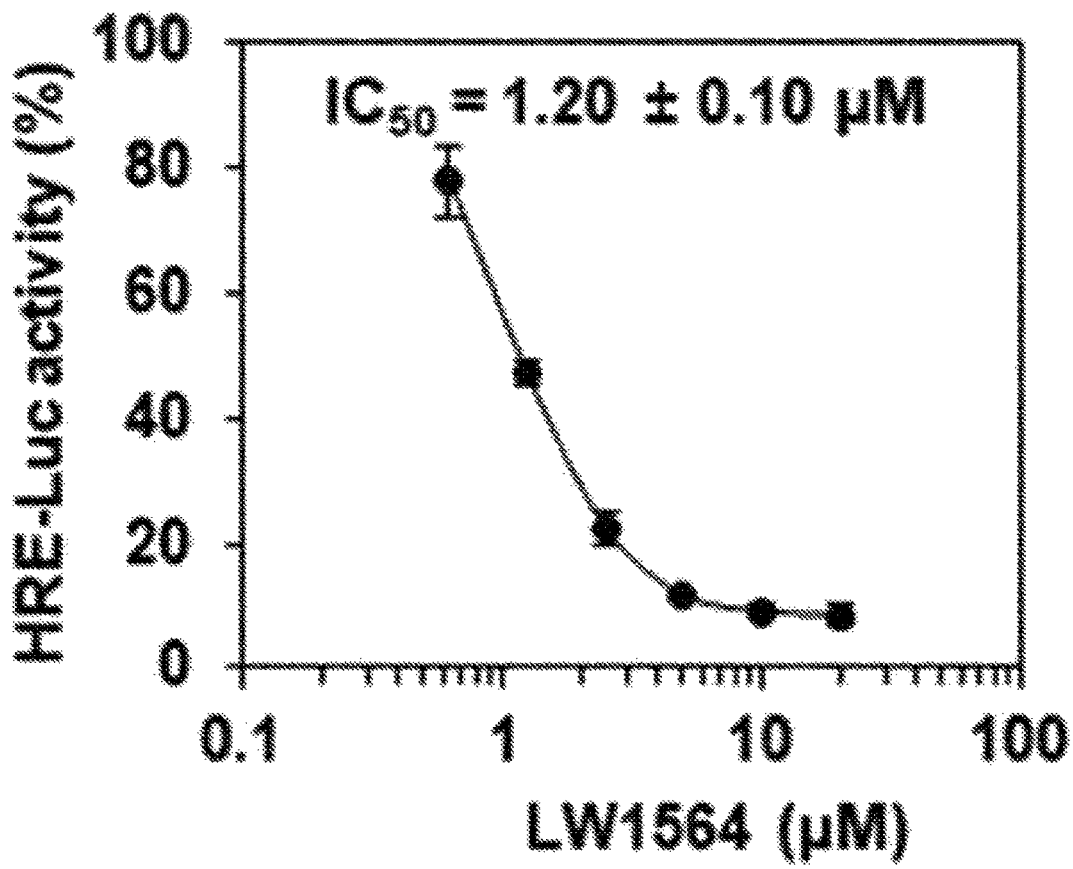
FIGS. 2A to 2E are diagrams illustrating the effect of LW1564 (Compound 21-3) in suppressing HIF-1α accumulation in cancer cells.
Figure 2B:
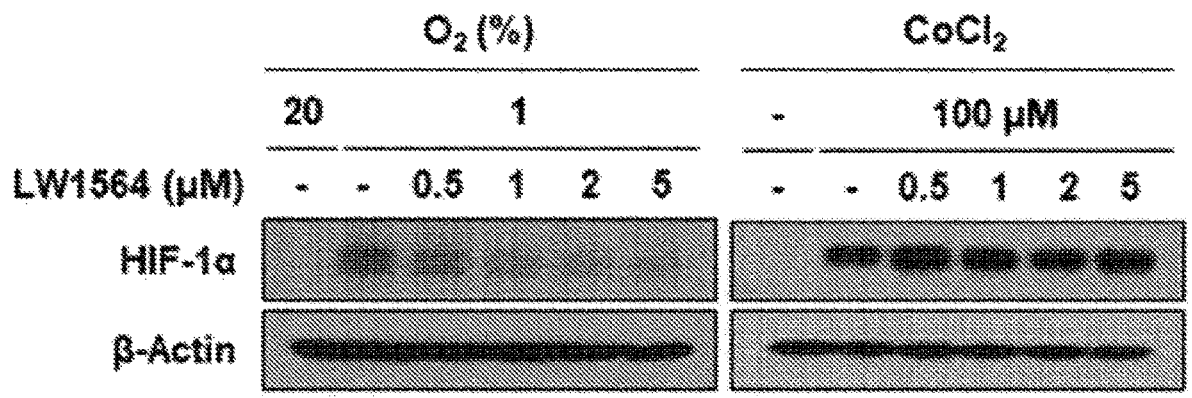

In the presence of oxygen, when the proline residue of the oxygen-dependent degradation (ODD) domain of HIF-1α is hydroxylated by prolyl hydroxylase (PHD), HIF-1α degradation is promoted by binding to Von Hippel-Lindau syndrome (VHL) associated with VCB-Cul2 E3 ligase that induces proteolysis. Under hypoxic conditions, proline hydroxylation does not occur and the amount of HIF-1α protein increases. First, HIF-1α activity was investigated using HRE-luciferase assay in HepG2 cells treated with LW1564 (compound 21-3). The HRE-luciferase reporter assay was performed as previously described using the luciferase assay system (Promega, Madison, WI, USA) according to the manufacturer's instructions (Naik, R. et al. Synthesis and Structure-Activity Relationship of (E)Phenoxyacrylic Amide Derivatives as Hypoxia-Inducible Factor (HIF) la Inhibitors. *J. Med. Chem.* 55, 10564-1057 (2012)). Luciferase activity was measured using a Victor X light luminescence reader (PerkinElmer, Boston, MA, USA). LW1564 (compound 21-3) reduced HIF-1α activity in HepG2 cells with an $IC_{50}$ of 1.2 µM (FIG. 2A). In addition, it was found that LW1564 (compounds 21-3) suppressed the accumulation of HIF-1α in a concentration-dependent manner under hypoxic conditions (FIG. 2B). Obviously, it was identified by the Western blot experiment that LW1564 (compound 21-3) did not affect HIF-la protein amount in the presence of cobalt chloride, so LW1564 increased the accumulation of HIF-1α by suppressing the activity of prolyl hydroxylase (FIG. 2B).

Figure 2C:
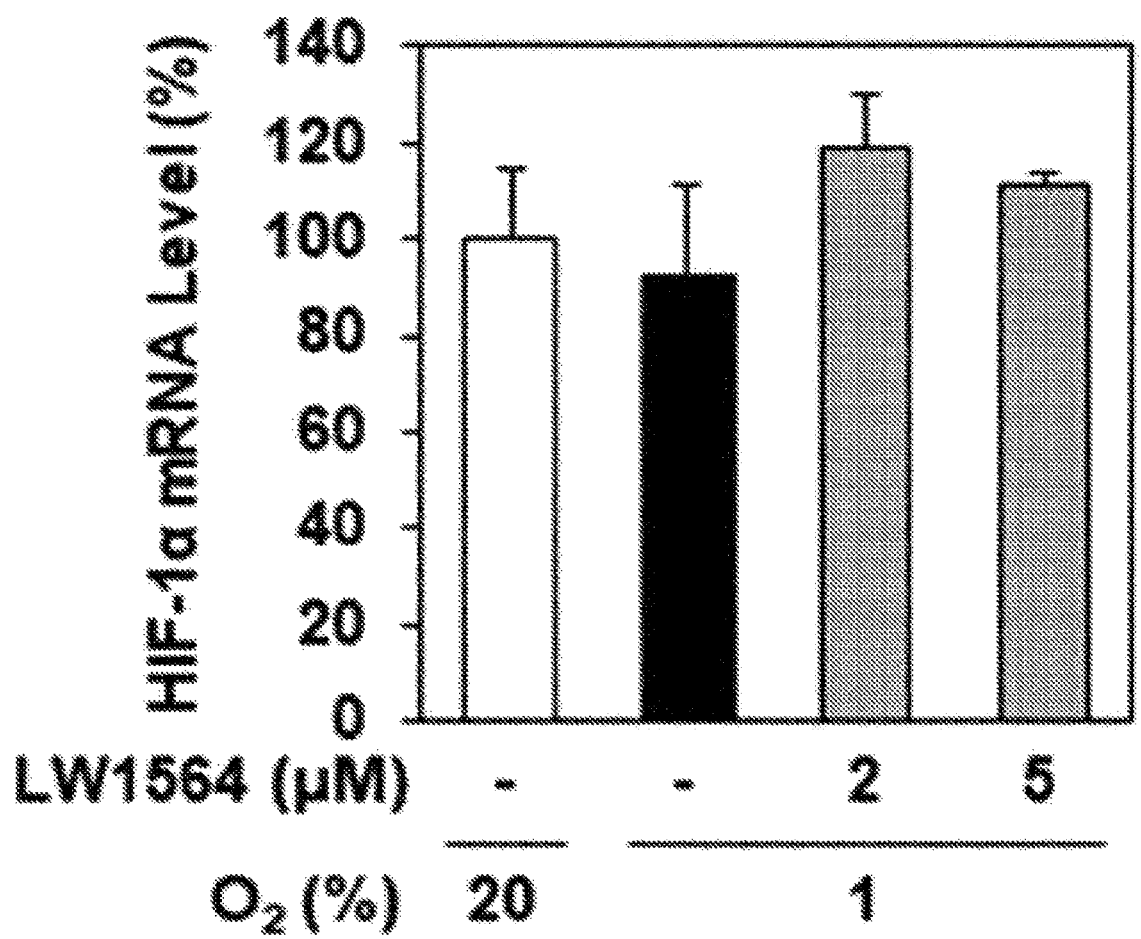
Figure 2D:
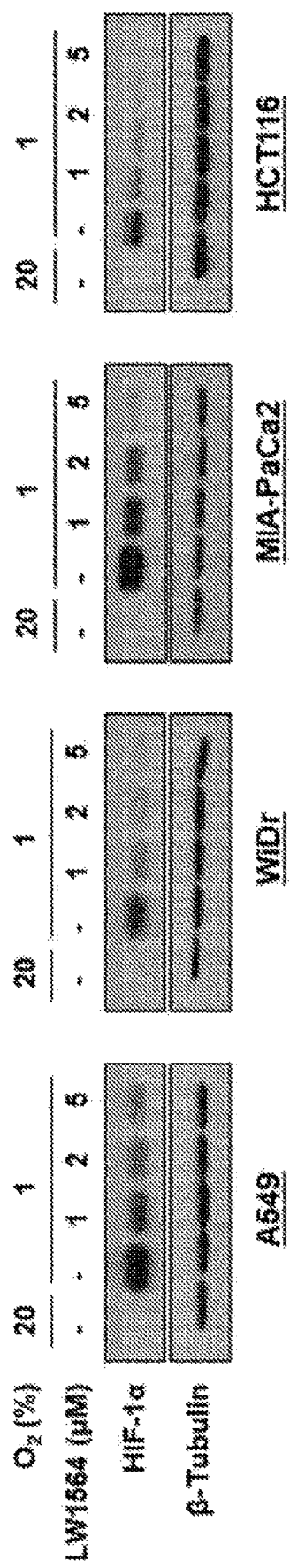

In addition, the amount of HIF-1α mRNA in LW1564-treated cells was investigated by a qPCR method. Total RNA was isolated using TRIzol reagent (Invitrogen), and cDNA was synthesized using TOPscript™ DryMIX (Enzynomics, Seoul, Korea). The HIF1A primer sequences are Fwd 5'-CTG ACC CTG CAC TCA ATC AAG-3' and Rev 5'-TGG GAC TAT TAG GCT CAG GTG-3. By observing no change in the amount of HIF-1α mRNA, it was identified that LW1564 (compound 21-3) suppressed hypoxia-mediated accumulation of HIF-1α during proteasome degradation, not transcription (FIG. 2C). Next, it was investigated whether LW1564 (compound 21-3) had a similar effect on HIF-1 degradation in other cancer cell lines. LW1564 (compound 21-3) significantly reduced HIF-1α protein accumulation, which increases under hypoxia state in various cancer cell lines, including A549, WiDr, MIA-CaCa2 and HCT116 (FIG. 2D).

Figure 2E:
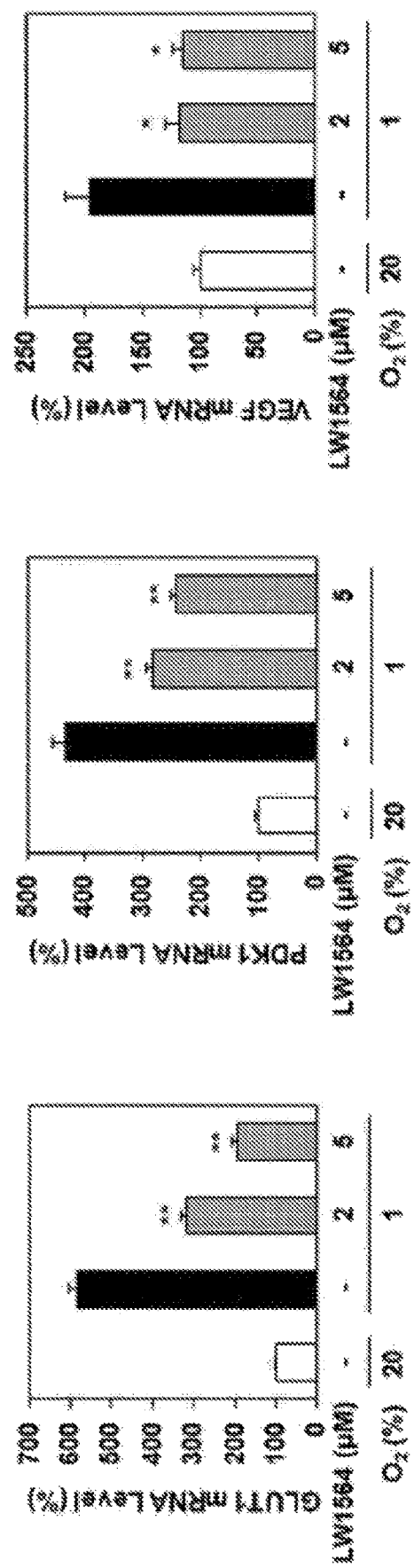

Next, mRNA levels of HIF-1 target genes GLUT1, PDK1 and VEGF were measured. The primer sequences were Fwd 5'-TTT GGC TAC AAC ACT GGA GTC-3' (SEQ ID NO: 1) and Rev 5'-CAT GCC CCC AAC AGA AAA GAT-3' (SEQ ID NO: 2) for GLUT1; Fwd 5'-CAG GAC AGC CAA TAC AAG TGG-3' (SEQ ID NO: 3) and Rev 5'-CAT TAC CCA GCG TGA CAT GAA-3' (SEQ ID NO: 4) for PDK1; Fwd 5'-CCT TGC TGC TCT ACC TCC AC-3' (SEQ ID NO: 5) and Rev 5'-ATG ATT CTG CCC TCC TCC TT-3' (SEQ ID NO: 6) for VEGFA; and Fwd 5'-CAT AGG AAG CTG GGA GCA AG-3' (SEQ ID NO: 7) and Rev 5'-GCC CTC CAA TCA GTC TTC TG-3' (SEQ ID NO: 8) for RPL13A. LW1564 (compound 21-3) decreased the mRNA amount of GLUT1, PDK1 and VEGF increased under hypoxia state in HepG2 cells (FIG. 2E). Taken together, it was identified that LW1564 (compound 21-3) suppressed HIF-1α accumulation through stimulated proteasome degradation, thereby reducing the mRNA expression of the target gene.

LW1564 (Compound 21-3) Reduces Oxygen Consumption by Suppressing Mitochondrial Respiration.

Compounds that suppress mitochondrial respiration promote degradation of HIF-1α by increasing cellular oxygen content. Accordingly, it was investigated whether LW1564 (compound 21-3) affected mitochondrial respiration by measuring the oxygen consumption rate (OCR). Oxygen consumption was measured using an Oxytherm Clark-type electrode system (Hansatech, Norfolk, UK) (Chou, T. C. Theoretical basis, experimental design, and computerized simulation of synergism and antagonism in drug combination studies. *Pharmacol. Rev.* 58, 621-681 (2006)). HepG2 cells ($2\times10^7$) were cultured with 2 µM LW1564 (compound 21-3) for 6 hours, collected, and then OCR was measured at 37° C. for 5 minutes with a thermoregulated controlled circulating system. For epidemiologic studies, digitonin-permeabilised HepG2 cells ($2\times10^7$) were read on a detection device containing 2 ml of respiratory buffer (0.25 M sucrose, 2 mM $KH_2PO_4$, 5 mM $MgCl_2$, 1 mM EDTA, 1 mM ADP, 20 mM MOPS, pH 7.4). The following substrates, which provide electrons to the components in the ETC, were then added: 5 mM sodium pyruvate, 5 mM sodium malate, 5 mM sodium succinate, 5 mM L-ascorbic acid and 0.2 mM N,N,N,N-tetra methyl-p-phenylenediamine (TMPD). Complex I, III and IV inhibitors (rotenone, antimycin A and KCN, respectively) were added to a final concentration of 1 µM.

Figure 3A:
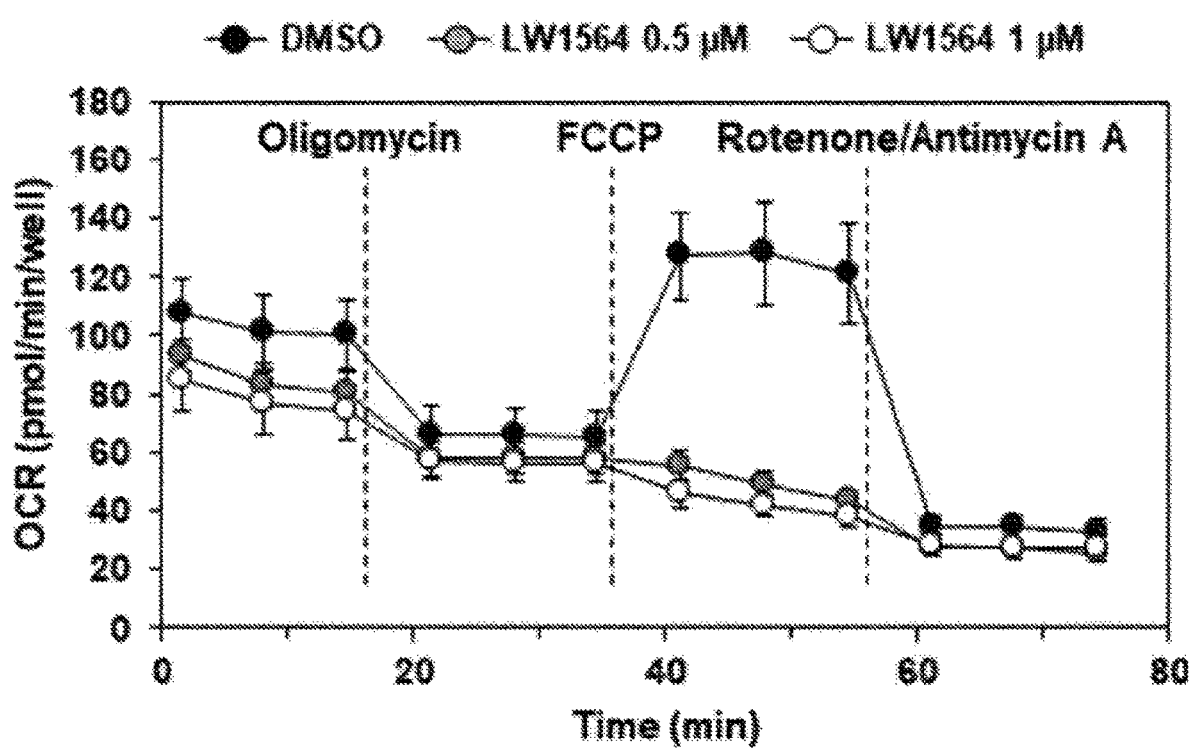
FIGS. 3A to 3D are diagrams illustrating that LW1564 (Compound 21-3) suppresses mitochondrial respiration in HepG2 cells.
Figure 3B:
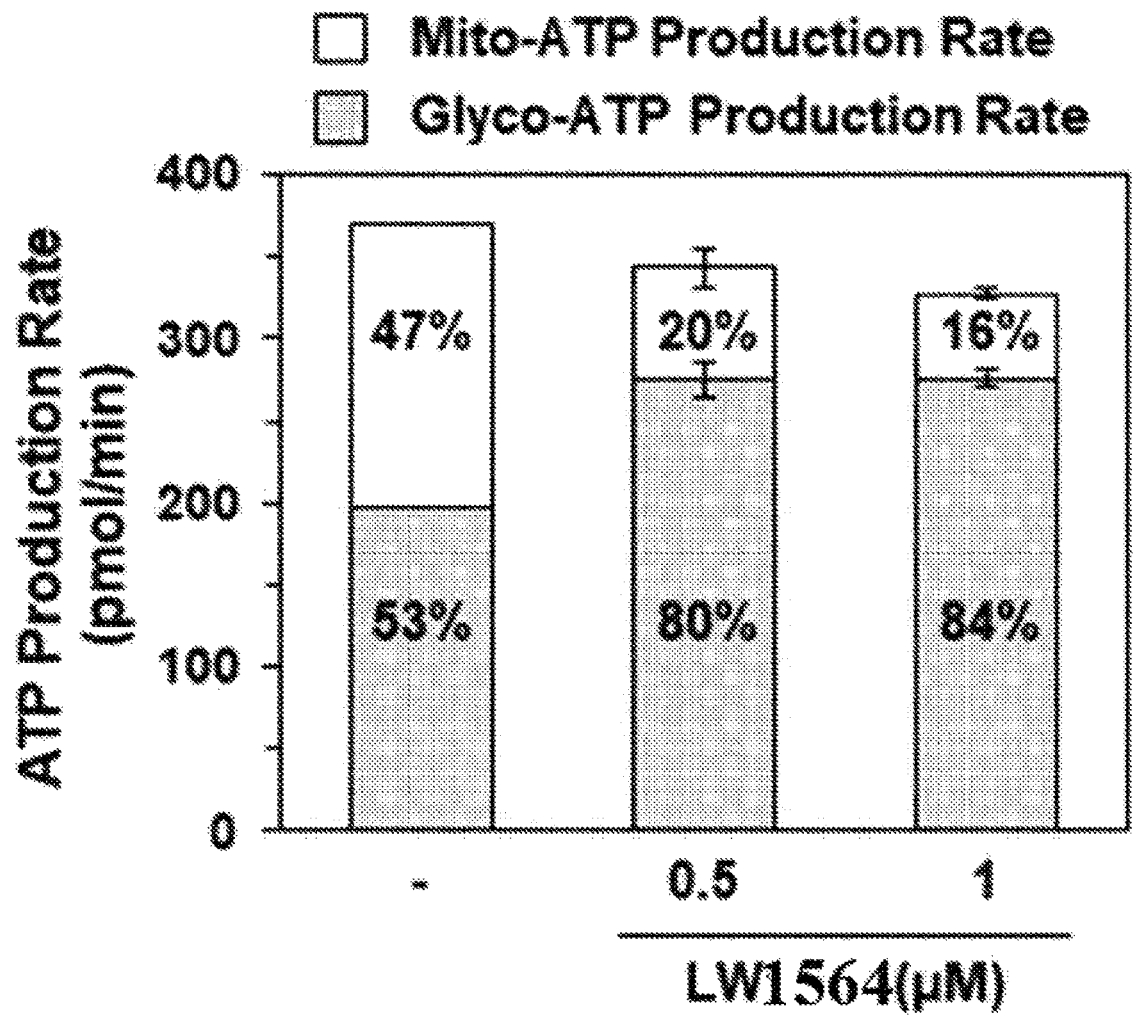
Figure 3C:
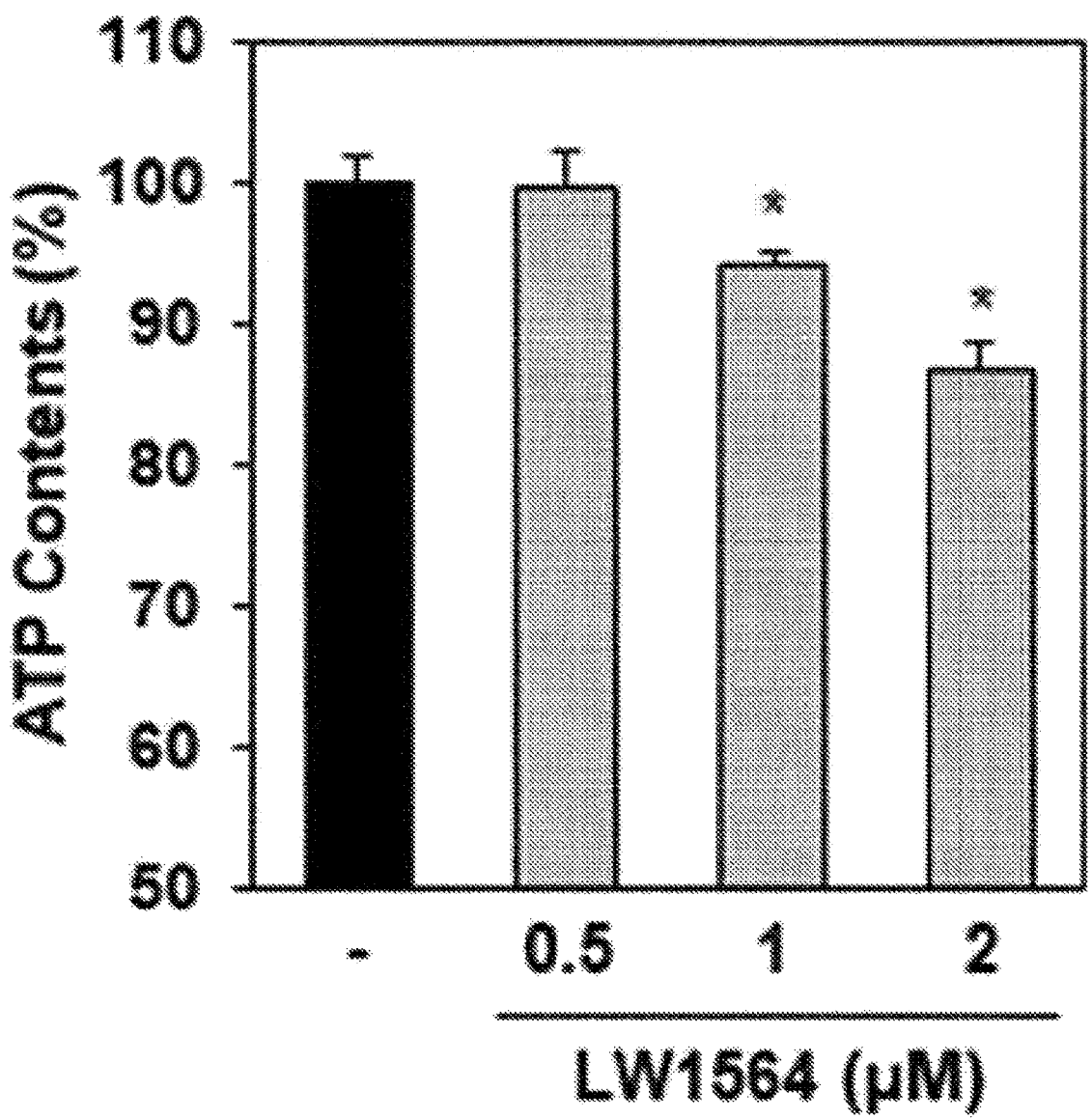

LW1564 (compound 21-3) significantly suppressed OCR at concentrations that suppressed HIF-1 accumulation (FIG. 3A), indicating suppression of mitochondrial respiration. Next, the effect of mitochondrial respiration on ATP production by oxidative phosphorylation was evaluated by comparing the amount of ATP produced by glycolysis decomposition and mitochondrial respiration in the presence of LW1564 (compound 21-3). ATP content was determined as described in "Chou, T. C. Theoretical basis, experimental design, and computerized simulation of synergism and antagonism in drug combination studies. *Pharmacol. Rev.* 58, 621-681 (2006)." After HepG2 cells were seeded and incubated with LW1564 (compound 21-3) for 6 hours, ATP content was measured using an ENLITEN® ATP assay kit (Promega, Madison, WI, USA) according to the manufacturer's instructions. Under normoxic conditions, HepG2 cells gained 47% of ATP by mitochondrial respiration and 53% by glycolysis decomposition. As expected, in cells treated with LW1564 (compound 21-3), mitochondrial-derived ATP production was significantly reduced (16%) and glycolysis-derived ATP production was increased (FIG. 3B). Compensatory upregulation of this degradation in response to suppression of oxidative phosphorylation occurred by AMPK activation, which was induced by a high AMP/ATP ratio. LW1564 (compound 21-3) slightly decreased total ATP production for a short period of time (FIG. 3B), but significantly decreased intracellular total ATP levels for a longer period (FIG. 3C). These data indicate that LW1564 (compound 21-3) reduces ATP production by inhibiting mitochondrial oxidative phosphorylation.

Figure 3D:
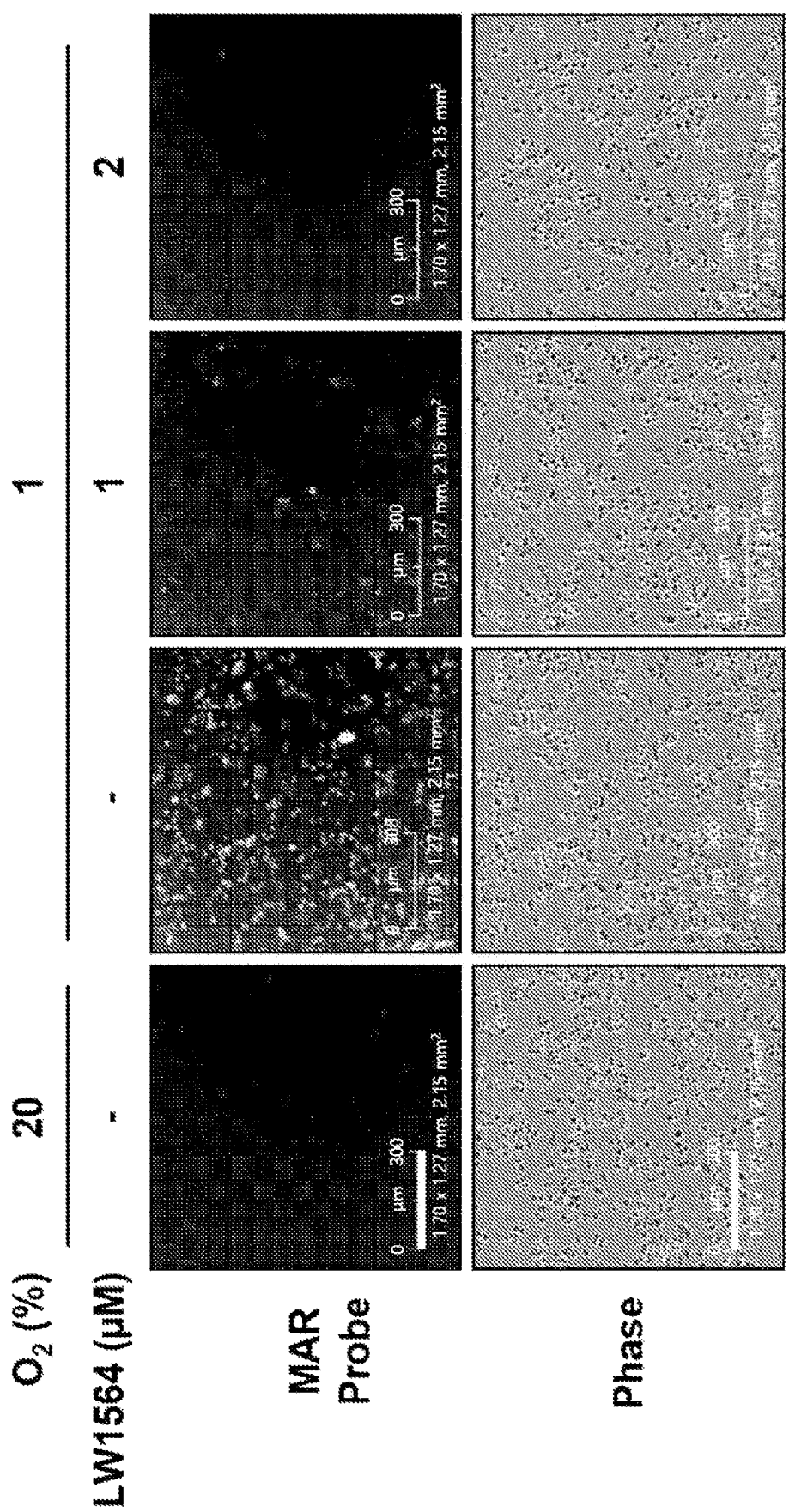

Since a decrease in mitochondrial respiration means an increase in the amount of intracellular oxygen, it was evaluated whether the amount of intracellular oxygen increased using MAR, an azo-based hypoxia probe that produces fluorescence under hypoxic conditions. Under hypoxic states, HepG2 cells were cultured with LW1564 (compound 21-3) for 6 hours, stained with 500 nM MAR according to the manufacturer's instructions (Chou, T. C. Theoretical basis, experimental design, and computerized simulation of synergism and antagonism in drug combination studies. *Pharmacol. Rev.* 58, 621-681 (2006)), and analyzed with an IncuCyte ZOOM® system (Essen BioScience, MI, USA). Under hypoxic conditions, LW1564 (compound 21-3) significantly reduced fluorescence in HepG2 cells, suggesting that the amount of intracellular oxygen increased due to decreased mitochondrial respiration (FIG. 3D).

LW1564 (Compound 21-3) Suppresses Complex I Activity in the Mitochondrial Electron Transport Chain.

Figure 4A:
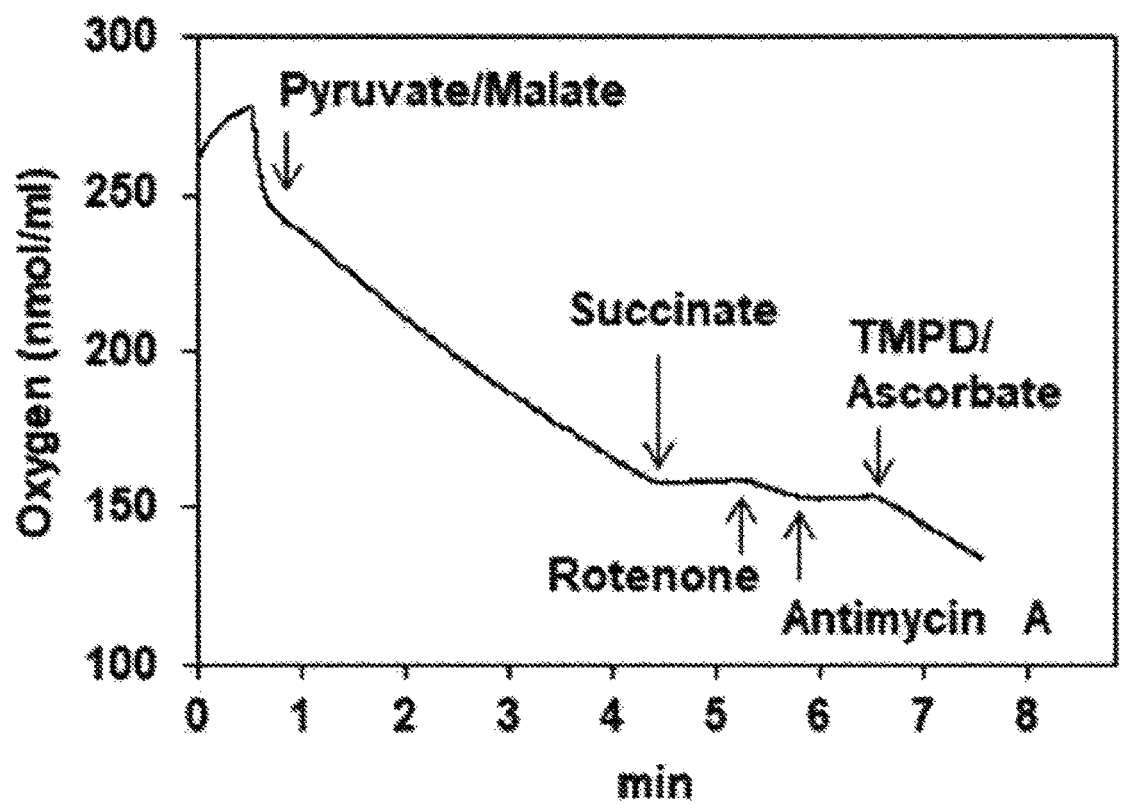
FIGS. 4A to 4D are diagrams illustrating that LW1564 (Compound 21-3) suppresses mitochondrial respiration by targeting Complex I in ETC. In (FIGS. 4A and. 4B), either 1 μM rotenone (Complex I activity inhibitor) (FIG. 4A) or 100 μM LW1564 (Compound 21-3) (FIG. 4B) was added to the cells.
Figure 4B:
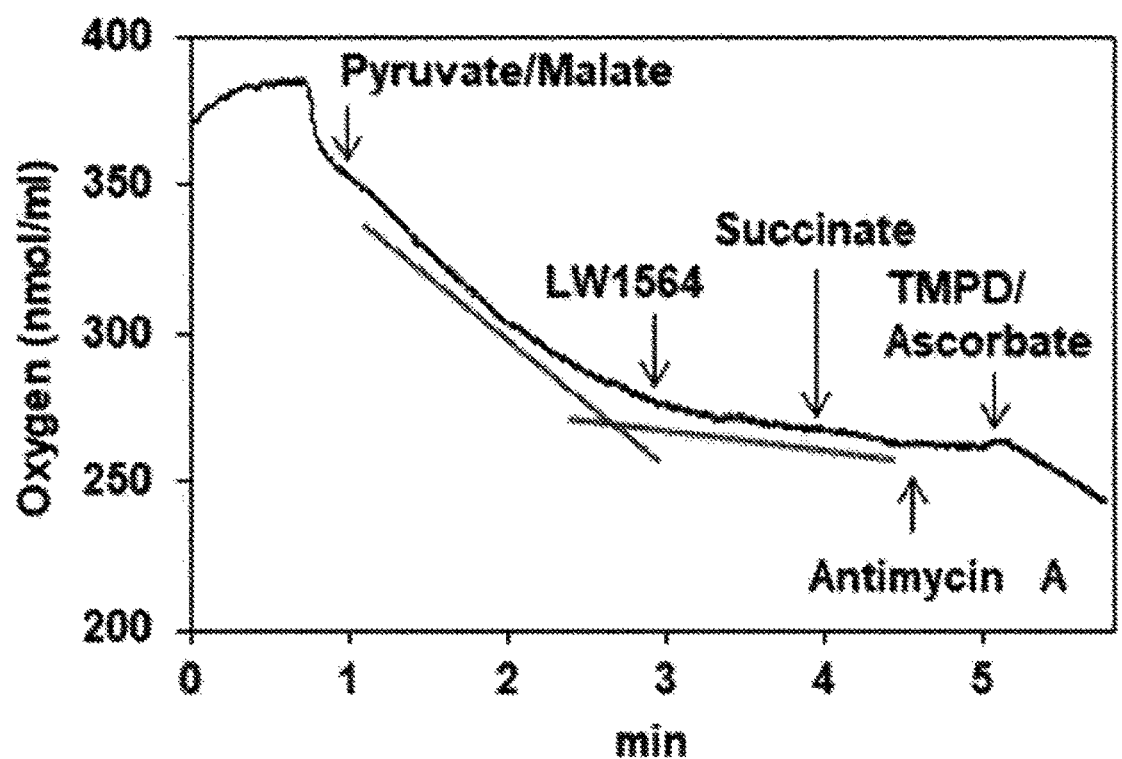
Figure 4C:
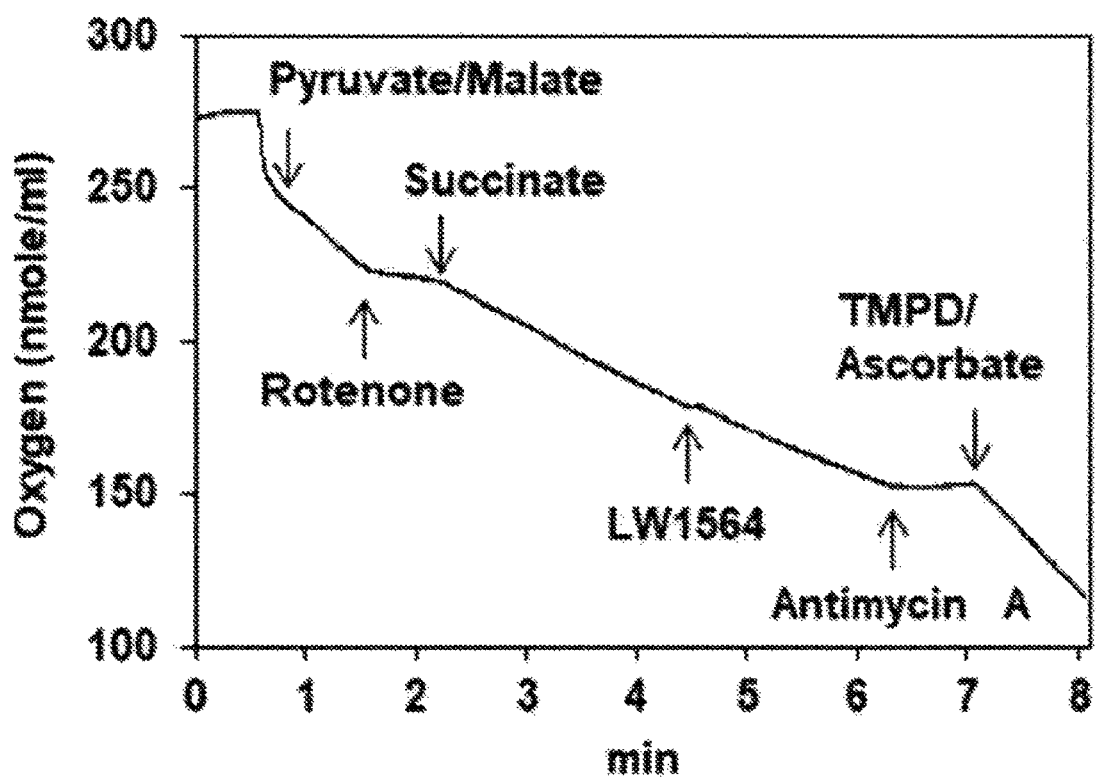
Figure 4D:
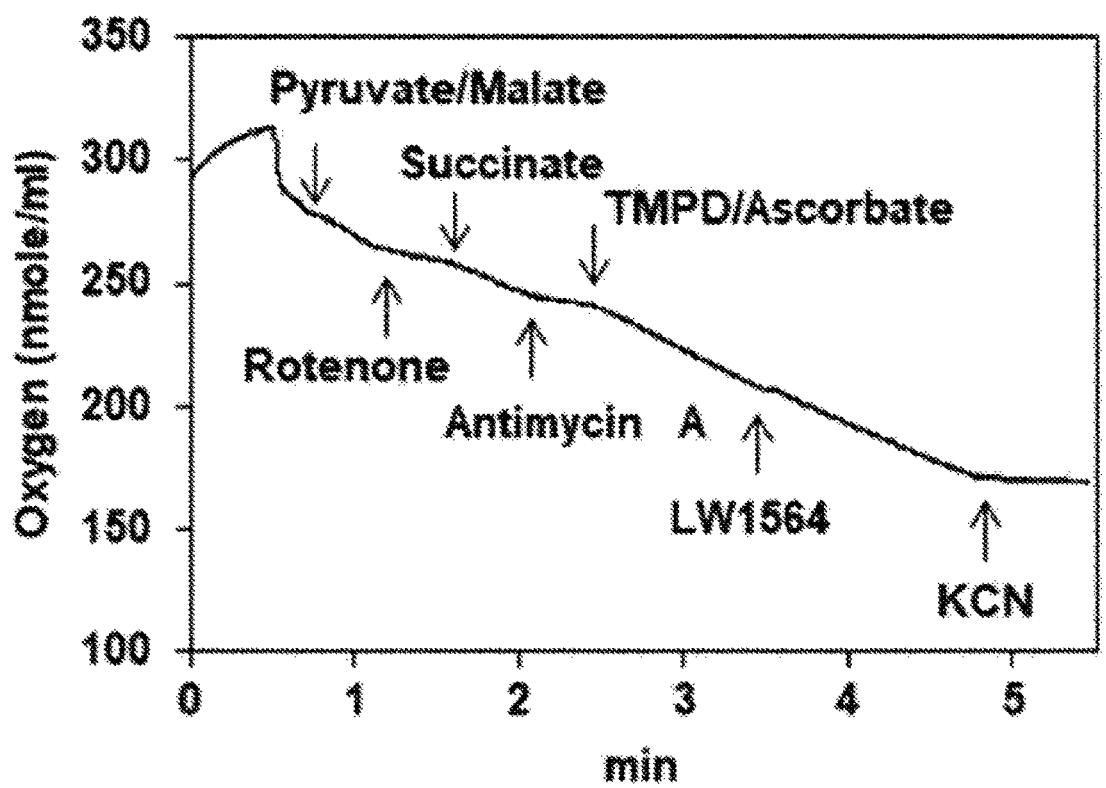

In order to elucidate the mechanism of action of LW1564 (compound 21-3) to reduce mitochondrial respiration in ETC, mitochondrial respiration assay was performed. Experiments were carried out by administering specific substrates and inhibitors to each complex to analyze the connected respiration process (FIG. 4A). Malate/pyruvate was added for electron transport of complex I to HepG2 cells, and rotenone, a well-known complex I inhibitor, was used as a positive control group to reduce oxygen consumption (FIG. 4A). LW1564 (compounds 21-3) reduced oxygen consumption by complex I, which was overcome by adding succinate to provide electrons directly to complex III (FIG. 4B). These results suggested that LW1564 (compound 21-3) was an inhibitor of mitochondrial electron transport complex I. It was then evaluated whether LW1564 (compounds 21-3) affected other ETC complexes. The present inventors treated cells administered with succinate or cytochrome c as electron source for ETC complex II and ascorbate/TMPD as electron source for complex IV with LW1564 (compound 21-3). It was identified that LW1564 (compound 21-3) did not affect the oxygen consumption rate in the presence of succinate (FIG. 4C) or ascorbate/TMPD (FIG. 4D). Accordingly, these results suggest that LW1564 (compound 21-3) suppresses mitochondrial respiration by suppressing mitochondrial ETC complex I only.

LW1564 (Compound 21-3) Activates AMPK Signaling and Suppresses Lipid Synthesis.

Figure 5A:
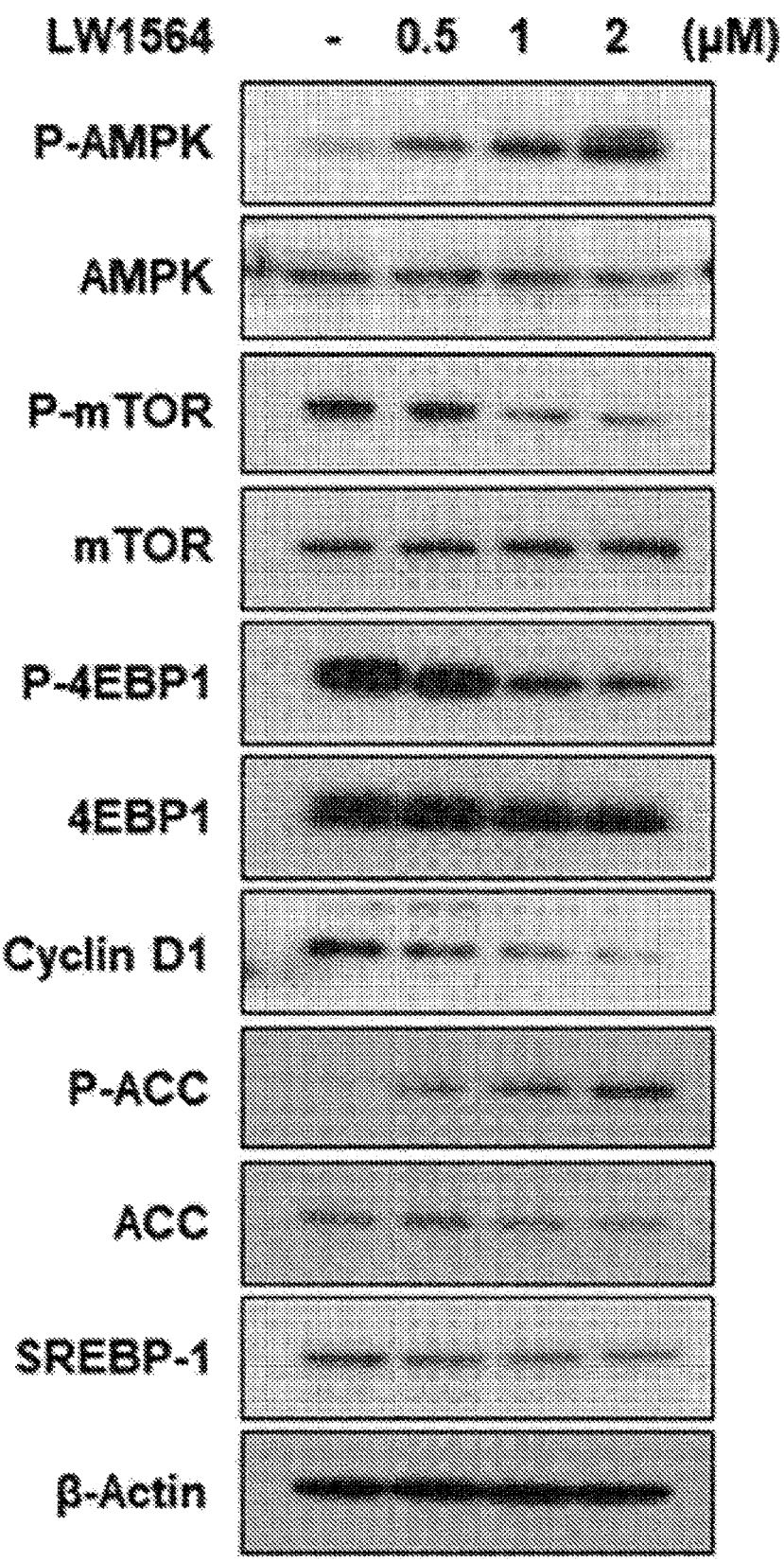
FIGS. 5A to 5D are diagrams illustrating that LW1564 (Compound 21-3) suppresses fatty acid accumulation by activating the AMPK pathway in HepG2 cells.
Figure 5B:
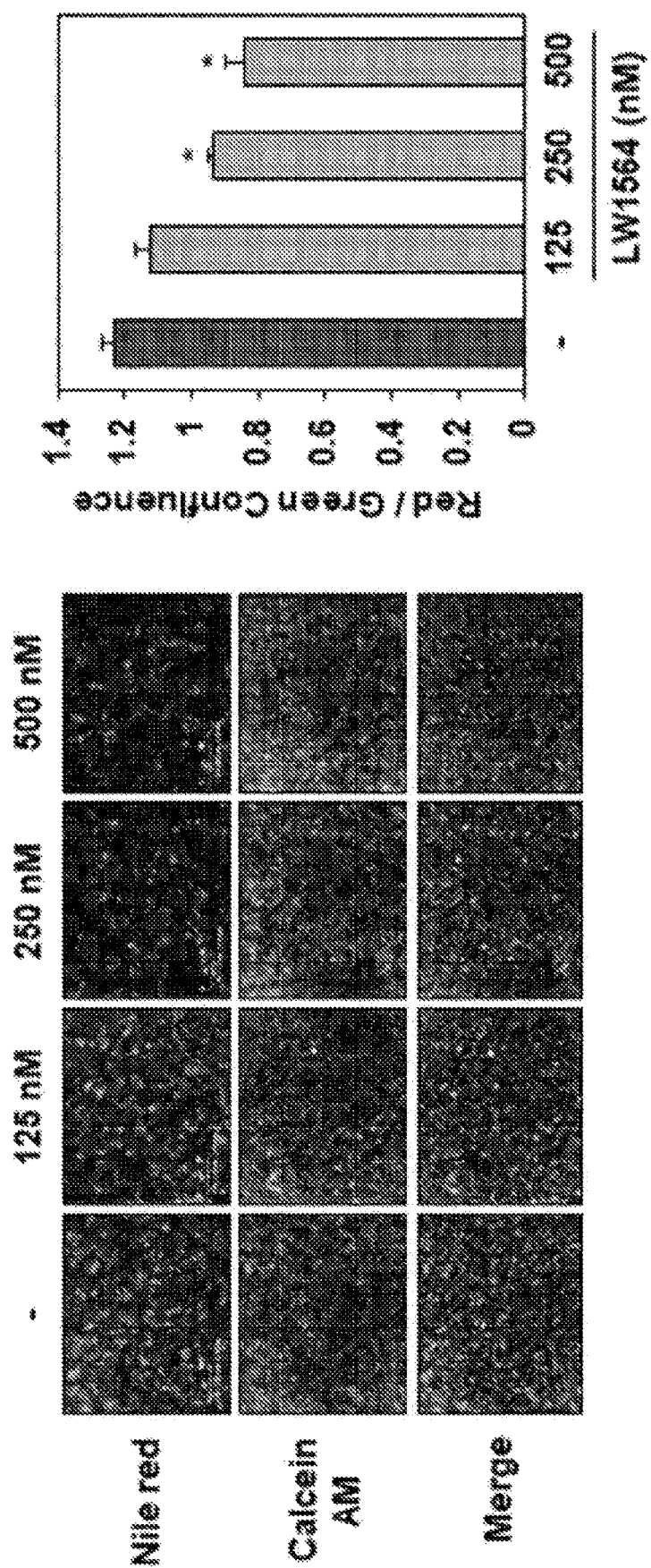

A significant decrease in total ATP content was observed in cells treated with LW1564 (compound 21-3) (FIG. 3C). Since these results indicate an increase in the AMP/ATP ratio, AMPK activation and downstream signaling events in HepG2 cells were investigated. Through western blot analysis, it was identified that LW1564 (compound 21-3) promoted phosphorylation of AMPK and its downstream protein, Acetyl-CoA carboxylase (ACC), in HepG2 cells (FIG. 5A). This result was interpreted as showing that activation of AMPK by LW1564 (compound 21-3), in a concentration-dependent manner, suppressed phosphorylation of mTOR and suppressed expression and/or activation of downstream proteins of mTOR, such as 4EBP1, cyclin D1 and sterol regulatory element binding protein 1 (SREBP-1). The increase in the amount of ACC phosphorylation and the decrease in the amount of SREBP-1 suggest that LW1564 (compound 21-3) may suppress lipid synthesis. In order to explore this possibility, the effect of LW1564 (compounds 21-3) on lipid synthesis using Nile red, a fluorescent probe that binds to hydrophobic molecules such as lipid droplets was evaluated. Nile red staining was performed as described in "1. Huang, D. et al. HIF-1-mediated suppression of acyl-CoA dehydrogenases and fatty acid oxidation is critical for cancer progression. *Cell Rep.* 8, 1930-1942 (2014)." HepG2 cells were treated with LW1564 (compound 21-3) for 24 hours and then stained with 200 nM Nile Red and 1 µM Calcein AM for 10 minutes. Data were collected and analyzed with an IncuCyte ZOOM® system (Essen BioScience). For normalization, cell viability was measured using a cell-permeant fluorescent dye, Calcein AM. As a result, it was identified that LW1564 (compound 21-3) reduced lipid accumulation in a concentration-dependent manner (FIG. 5B). Taken together, it was indicated that LW1564 (compounds 21-3) promoted anticancer effects in HepG2 cells through regulating the AMPK/mTOR signaling pathway and lipid synthesis.

LW1564 (Compound 21-3) Suppresses Glucose-Dependent Cancer Metabolism.

Figure 5C:
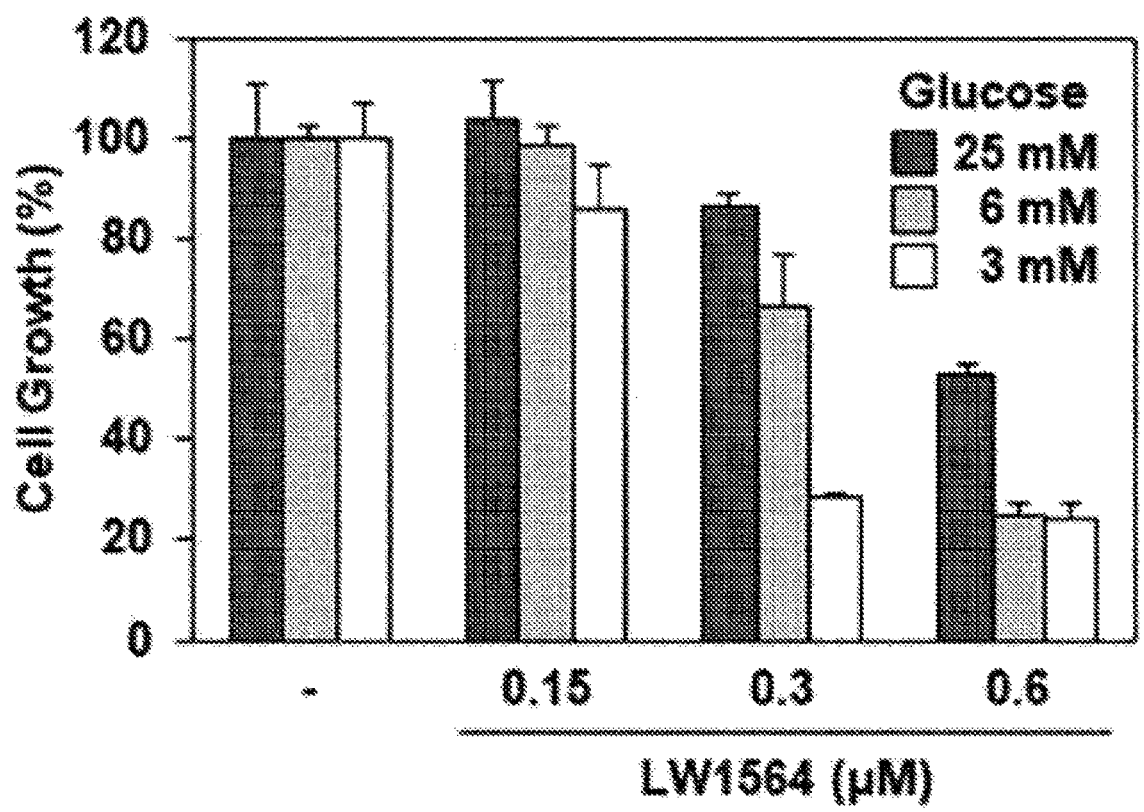
Figure 5D:
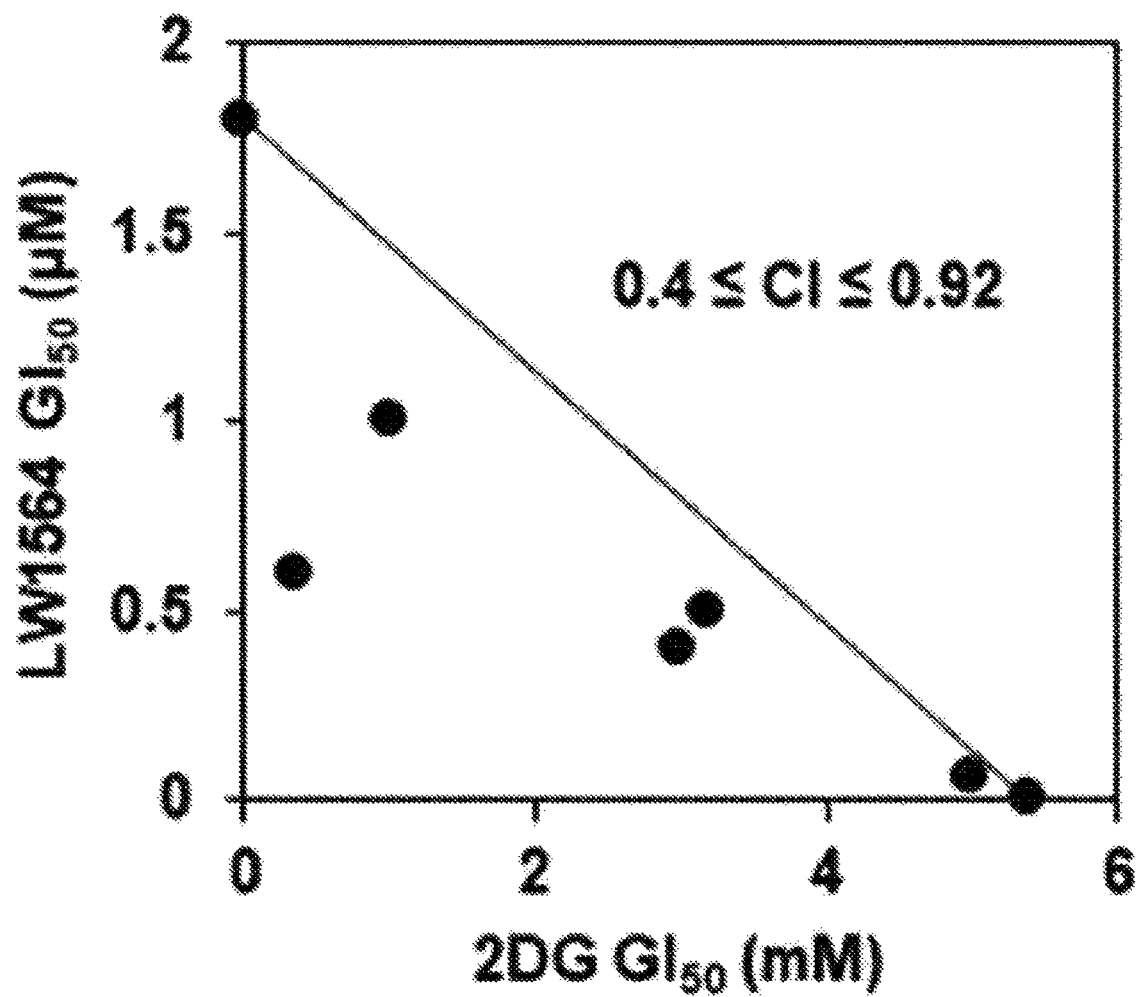

The glycolytic function is activated in many cancer cells. Accordingly, it was investigated whether LW1564 (compound 21-3) affected cancer cell proliferation according to glucose concentration. LW1564 (compound 21-3) showed a stronger cell proliferation suppression efficacy in cells in a medium with a low glucose concentration (3 mM) than in a medium with a high glucose concentration (25 mM) (FIG. 5C). Next, in order to investigate the combined effect of LW1564 (compound 21-3), a glucose analog and competitive glycolysis inhibitor, and 2-deoxy-D-glucose (2DG) on the proliferation of HepG2 cells, Combination Index (CI) and isobologram analysis were performed. The CI value quantitatively represents the correlation between two drugs through $GI_{50}$ analysis indicating the cell proliferation suppression concentration, and synergistic, additive and antagonistic effects are defined as CI<1, CI=1 and CI>1. As a result of the analysis, it was shown that LW1564 (compound 21-3)

and 2-DG had a synergistic efficacy (0.4≤CI≤0.92) in suppressing HepG2 cell proliferation (FIG. 5D). Accordingly, it is suggested that the combination treatment of LW1564 (compound 21-3) and a glycolysis inhibitor may exert better anticancer efficacy in liver cancer than LW1564 (compound 21-3) alone.

LW1564 (Compound 21-3) Suppresses Tumor Growth in a HepG2 Xenograft Mouse Model.

The present inventors have found that LW1564 (compound 21-3) suppressed the growth of HepG2 cells but did not affect the growth of normal cells (FIG. 1). In the HepG2 xenograft mouse model, the efficacy of LW1564 (compound 21-3) on tumor proliferation was investigated. All animal experiments were approved and performed according to the guidelines of the Institutional Animal Care and Use Committee of the Korea Research Institute of Bioscience & Biotechnology (Daejeon, Korea). Specific pathogen-free female nude mice (6 weeks old) were inoculated with HepG2 cells ($1\times10^7$) subcutaneously on the right flank. When tumor volumes reached 100 to 150 mm³, mice were randomly assigned to vehicle and LW1564 (compound 21-3) treatment groups (n=6). LW1564 (compound 21-3) (10 mg/kg) was administered intraperitoneally daily for 2 weeks. The tumor size was measured using a microcalliper, and the tumor volume was calculated using a standard volume: length×width²×0.5. Significant differences between the two groups were determined by Student's t-test.

Figure 6:
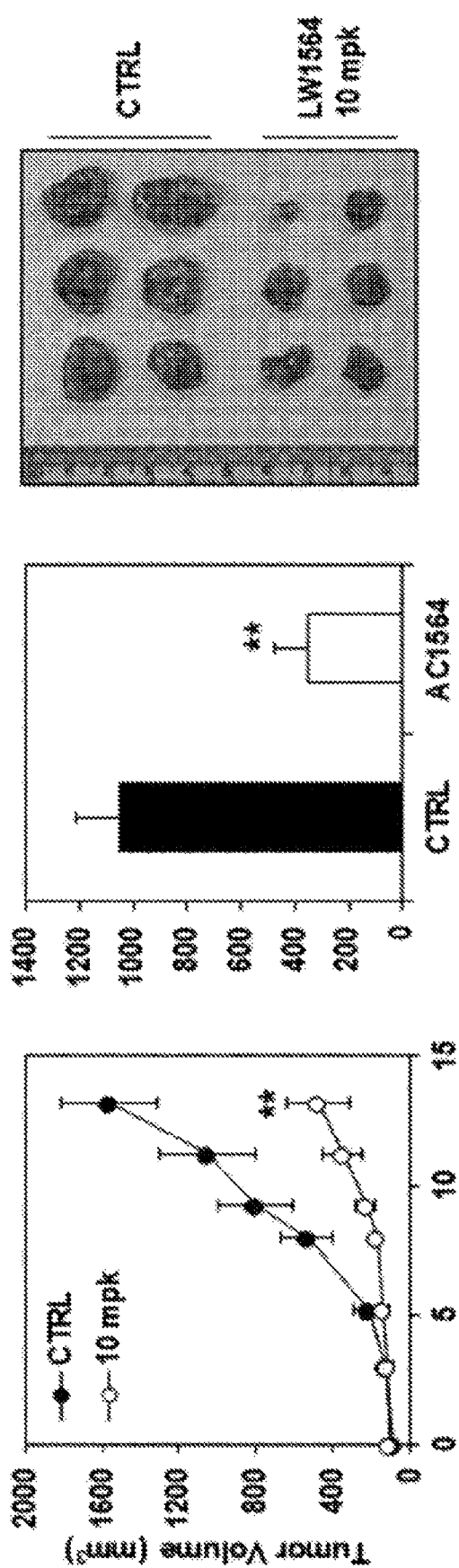
FIG. 6 illustrates the tumor proliferation suppression efficacy of LW1564 (Compound 21-3) in a HepG2 xenograft mouse model. (Left diagram in FIG. 6) illustrates the change in volume of control group and LW1564 (Compound 21-3) treated xenografted tumors over time;  P≤0.01, (Middle diagram in FIG. 6) illustrates the weight of the control group and LW1564 (Compound 21-3) treated xenografted tumors;  P≤0.01, and (right diagram in FIG. 6) illustrates a representative image of the tumor described in (left and middle diagrams in FIG. 6).

LW1564 (compound 21-3) showed a 67% reduction in tumor size in mice injected with an intraperitoneal injection (10 mg/kg) of LW1564 (compound 21-3) compared to the control group (left diagram of FIG. 6). In addition, it was identified that the weight (middle diagram of FIG. 6) and size (right diagram of FIG. 6) of the tumors removed from the mice administered with LW1564 (compound 21-3) were reduced. These results suggest that LW1564 (compound 21-3) may be developed as a powerful therapeutic agent for liver cancer patients.

TABLE 2

| | |
|---|---|
| g | Gram/s |
| Mg | Milligram/s |
| Mmol | Millimole |
| mL | Milliliter |
| h | Hour/s |
| min | Minute/s |
| z | Zussamen (together) |
| E | Eentegegen (opposite) |
| Fig. | Figure |
| Conc. | Concentrated |
| Dil. | Dilute |
| Sat. | Saturated |
| Aq. | Aqueous |
| ° C. | Degree Celsius |
| % | Percentage |
| R.T/r.t | Room Temperature |
| Expt. | Experiment |
| Temp. | Temperature |
| o | Ortho |
| m | Meta |
| p | Para |
| Psi | Pounds per square inch |
| Cat. | Catalytic |
| Atm. | Atmospheric |
| et al | et alia (and others) |
| TLC | Thin layer Chromatography |
| Calcd. | Calculated |

TABLE 3

| | |
|---|---|
| Ac | Acetyl |
| AlCl₃Ph | Aluminium chloridePhenyl |
| BBr₃ | Boron tribromide |
| Bn | Benzyl |
| t-Bu | tert-Butyl |
| DCM | Dichloromethane |
| Et₃N/TEAEDC | Triethylamine1-(3-Dimethylaminopropyl)-3-ethylcarbodiimide |
| AcOH | Acetic acid |
| MeOH | Methanol |
| EtOH | Ethanol |
| DMSO | Dimethyl sulfoxide |
| DMFDMAPDIPEA | N,N-Dimethylformamide4-DimethylaminopyridineN,N-Diisopropylethylamine |
| THF | Tetrahydrofuran |
| LiOH | Lithium hydroxide |
| Et | Ethyl |
| MeEANaHCO₃K₂CO₃KHCO₃PyBOP | MethylEthyl acetateSodium hydrogen carbonatePotassium carbonatePotassium hydrogen carbonateBenzotriazol-1-yl-oxytripyrrolidinophosphonium hexafluorophosphate |

INDUSTRIAL APPLICABILITY

The disubstituted adamantyl derivative according to an embodiment of the present invention is expected to be usefully used as a powerful therapeutic agent for cancer dependent on oxidative phosphorylation for producing ATP in mitochondria.

The invention claimed is:

1. A disubstituted adamantyl derivative represented by Chemical Formula 1 below or a pharmaceutically acceptable salt thereof:

[Chemical Formula 1]

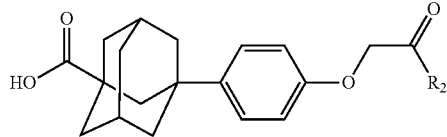

in Chemical Formula 1 above, $R^1$ is —(X)—(CH$_2$)n-$R^3$ or

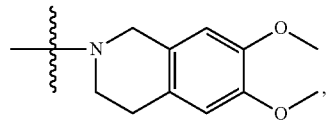

$R^2$ is —(Y)—(CH$_3$)m, —(Y)—(CH$_2$)m-$R^4$ or

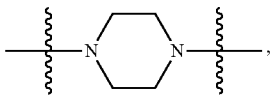

wherein the X is O, NH, or

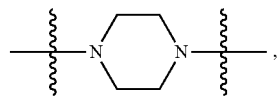

the Y is NH, or

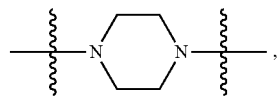

the n is 0, 1 or 2, and the m is 0 or 1, and $R^3$ or $R^4$ is each independently $C_1$ to $C_6$ straight or branched chain alkyl, unsubstituted or substituted $C_5$ to $C_{10}$ aryl, or unsubstituted or substituted $C_5$ to $C_9$ heteroaryl, and wherein the substituted aryl or substituted heteroaryl is substituted with one or more halogens, $C_1$ to $C_6$ straight or branched chain alkyl; $C_1$ to $C_6$ straight or branched chain haloalkyl;

hydroxy; or $C_1$ to $C_6$ straight or branched chain alkoxy, wherein, in the $R^2$,

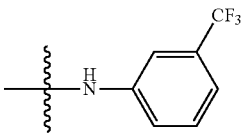 and 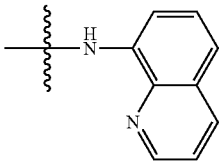

are excluded.

2. The disubstituted adamantyl derivative or the pharmaceutically acceptable salt thereof of claim 1, wherein:

the $R^1$ is —(X)—(CH$_2$)n-R$^3$ or

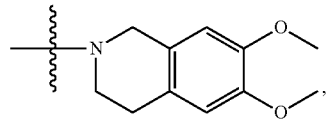 [SMILES: *N1CCc2cc(OC)c(OC)cc2C1]

$R^2$ is —(Y)—(CH$_3$)m, —(Y)—(CH$_2$)m-R$^4$ or

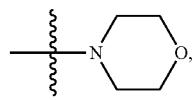

wherein the X is O, NH, or

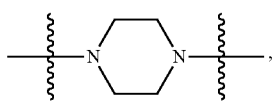

the Y is NH, or

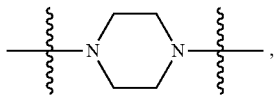 [SMILES: *N1CCN(*)CC1]

the n is 0, 1 or 2, and the m is 0 or 1, the $R^3$ is methyl, substituted or unsubstituted phenyl, or unsubstituted $C_5$ to $C_9$ heteroaryl, wherein the substituted phenyl is substituted with one or more halogens, $C_1$ to $C_6$ straight or branched chain alkyl; $C_1$ to $C_6$ straight or branched chain haloalkyl; hydroxy; or $C_1$ to $C_6$ straight or branched chain alkoxy, and the $R^4$ is substituted phenyl, or substituted or unsubstituted $C_5$ to $C_9$ heteroaryl, wherein the substituted phenyl or heteroaryl is substituted with $C_1$ to $C_6$ straight or branched chain haloalkyl, wherein, in the $R^2$,

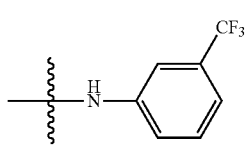 and 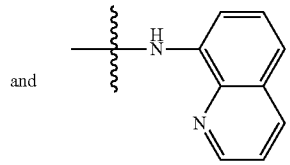

are excluded.

3. The disubstituted adamantyl derivative or the pharmaceutically acceptable salt thereof of claim 1, wherein:

the $R^1$ is

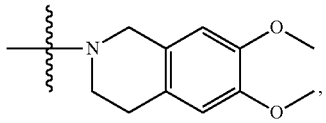 [SMILES: *N1CCc2cc(OC)c(OC)cc2C1]

$R^2$ is —(Y)—(CH$_3$)m, —(Y)—(CH$_2$)m-R$^4$ or

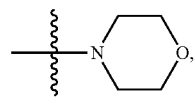

wherein the Y is NH, or

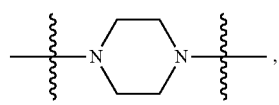

and the m is 1, and the $R^4$ is substituted phenyl, wherein the substituted phenyl is substituted with $C_1$ to $C_6$ straight or branched chain haloalkyl, wherein, in the $R^2$,

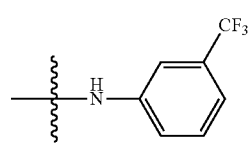 and 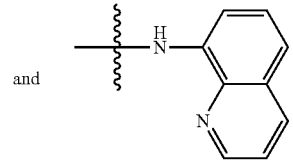

are excluded.

4. The disubstituted adamantyl derivative or the pharmaceutically acceptable salt thereof of claim 1, wherein a disubstituted adamantyl derivative or a pharmaceutically acceptable salt thereof is a disubstituted adamantyl derivative represented by Chemical Formula 3 below or a pharmaceutically acceptable salt thereof:

[Chemical Formula 3]

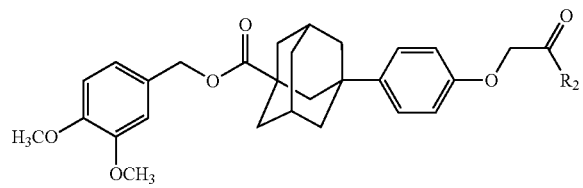

in Chemical Formula 3 above,

R² is —(Y)—(CH₃)m, —(Y)—(CH₂)m-R⁴ or

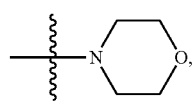

wherein the Y is NH, or

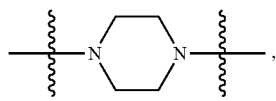

and the m is 0 or 1, and

R⁴ is each independently C₁ to C₆ straight or branched chain alkyl, unsubstituted or substituted C₅ to C₁₀ aryl, or unsubstituted or substituted C₅ to C₉ heteroaryl, wherein the substituted aryl or substituted heteroaryl is substituted with one or more halogens, C₁ to C₆ straight or branched chain alkyl; C₁ to C₆ straight or branched chain haloalkyl; hydroxy; or C₁ to C₆ straight or branched chain alkoxy, wherein, in the R²,

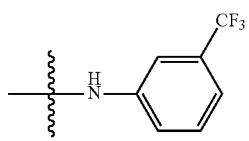 and 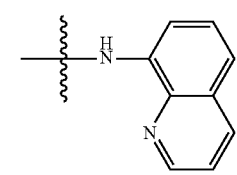

are excluded.

5. The disubstituted adamantyl derivative or the pharmaceutically acceptable salt thereof of claim 4, wherein the R² is a disubstituted adamantyl derivative or a pharmaceutically acceptable salt thereof selected from the group consisting of:

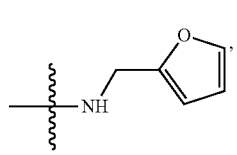 or 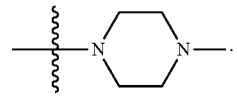

6. The disubstituted adamantyl derivative or the pharmaceutically acceptable salt thereof of claim 1, wherein a disubstituted adamantyl derivative or a pharmaceutically acceptable salt thereof is a disubstituted adamantyl derivative represented by Chemical Formula 4 below or a pharmaceutically acceptable salt thereof:

[Chemical Formula 4]

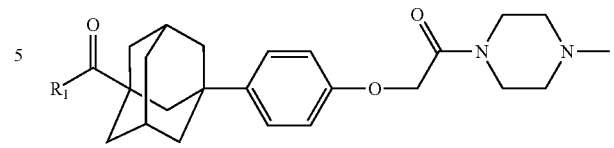

in Chemical Formula 4 above,

R¹ is —(X)—(CH₂)n-R³ or

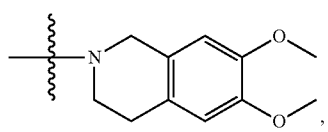

wherein the X is O, NH, or

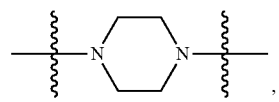 [SMILES: *N1CCN(*)CC1]

and the n is 0, 1 or 2, and

R³ is each independently C₁ to C₆ straight or branched chain alkyl, unsubstituted or substituted C₅ to C₁₀ aryl, or unsubstituted or substituted C₅ to C₉ heteroaryl, wherein the substituted aryl or substituted heteroaryl is substituted with one or more halogens, C₁ to C₆ straight or branched chain alkyl; C₁ to C₆ straight or branched chain haloalkyl; hydroxy; or C₁ to C₆ straight or branched chain alkoxy.

7. The disubstituted adamantyl derivative or the pharmaceutically acceptable salt thereof of claim 6, wherein the R¹ is a disubstituted adamantyl derivative or a pharmaceutically acceptable salt thereof selected from the group consisting of:

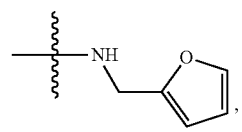

, or

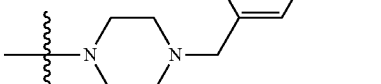

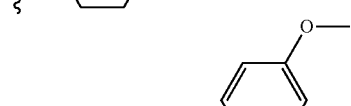

8. The disubstituted adamantyl derivative or the pharmaceutically acceptable salt thereof of claim 1, wherein a disubstituted adamantyl derivative or a pharmaceutically acceptable salt thereof is a disubstituted adamantyl derivative represented by Chemical Formula 5 below or a pharmaceutically acceptable salt thereof:

[Chemical Formula 5]

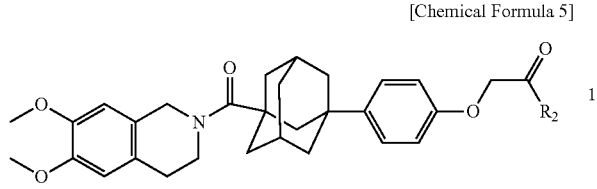

in Chemical Formula 5 above, $R^2$ is —(Y)—(CH$_3$)m, —(Y)—(CH$_2$)m-$R^4$ or

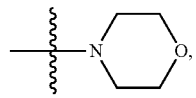

wherein the Y is NH, or

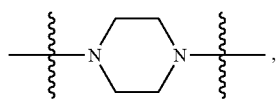

and the m is 0 or 1, and $R^4$ is each independently $C_1$ to $C_6$ straight or branched chain alkyl, unsubstituted or substituted $C_5$ to $C_{10}$ aryl, or unsubstituted or substituted $C_5$ to $C_9$ heteroaryl, wherein the substituted aryl or substituted heteroaryl is substituted with one or more halogens, $C_1$ to $C_6$ straight or branched chain alkyl; $C_1$ to $C_6$ straight or branched chain haloalkyl;

hydroxy; or $C_1$ to $C_6$ straight or branched chain alkoxy, wherein, in the $R^2$,

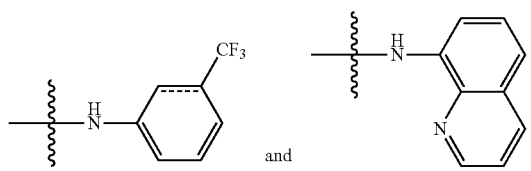

are excluded.

9. The disubstituted adamantyl derivative or the pharmaceutically acceptable salt thereof of claim 8, wherein the $R^2$ is a disubstituted adamantyl derivative or a pharmaceutically acceptable salt thereof selected from the group consisting of:

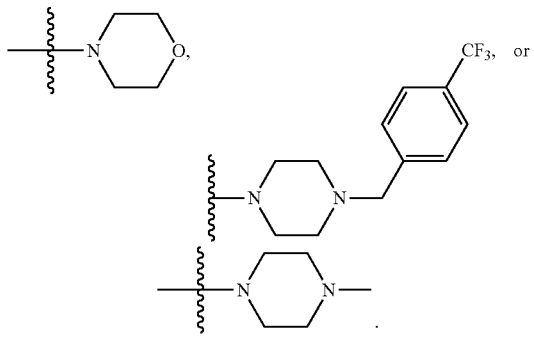

10. The disubstituted adamantyl derivative or the pharmaceutically acceptable salt thereof of claim 1, wherein the disubstituted adamantyl derivative is selected from the group consisting of the following compounds:
   3,4-Dimethoxybenzyl-2-(4-(2-(furan-2-ylmethylamino)-2-oxoethoxy)phenyl) adamantane-1-ylcarboxylate (14c);
   3,4-Dimethoxybenzyl-2-(4-(2-(4-methylpiperazin-1-yl)-2-oxoethoxy)phenyl) adamantane-1-ylcarboxylate (14d);
   N-(Furan-2-ylmethyl)-5-(4-(2-(4-methylpiperazin-1-yl)-2-oxoethoxy)phenyl) adamantan-1-yl-carboxamide (17a);
   1-(4-Methylpiperazin-1-yl)-2-(4-(5-(4-(4-(trifluoromethyl)benzyl) piperazine-1-carbonyl) adamantan-1-yl-) phenoxy) ethanone (17b);
   2-(4-(5-(4-(4-Methoxybenzyl) piperazine-1-carbonyl) adamantan-1-yl) phenoxy)-1-(4-methylpiperazin-1-yl) ethanone (17c);
   2-(4-(3-(6,7-Dimethoxy-1,2,3,4-tetrahydroisoquinoline-2-carbonyl) adamantan-1-yl) phenoxy)-1-morpholino-ethanone (21a);
   2-(4-(3-(6,7-Dimethoxy-1,2,3,4-tetrahydroisoquinoline-2-carbonyl) adamantan-1-yl) phenoxy)-1-(4-methylpiperazin-1-yl) ethanone (21b); and
   2-(4-(3-(6,7-Dimethoxy-1,2,3,4-tetrahydroisoquinoline-2-carbonyl) adamantan-1-yl) phenoxy)-1-(4-(4-(trifluoromethyl)benzyl) piperazin-1-yl) ethanone (21c) (LW1564).

11. An anticancer pharmaceutical composition containing a disubstituted adamantyl derivative or a pharmaceutically acceptable salt thereof of claim 1 as an active ingredient.

12. The pharmaceutical composition of claim 11, wherein the pharmaceutical composition is an anticancer pharmaceutical composition for solid cancer.

13. The pharmaceutical composition of claim 12, wherein the solid cancer is selected from the group consisting of breast cancer, cervical cancer, rectal cancer, fibrosarcoma, gastric cancer, liver cancer, lung cancer and pancreatic cancer.

14. A cancer treatment method including administering a disubstituted adamantyl derivative represented by Chemical Formula 1 of claim 1 or a pharmaceutically acceptable salt thereof in a therapeutically effective amount to a patient in need of anticancer treatment.

* * * * *